US012494050B2

(12) United States Patent
Zia et al.

(10) Patent No.: US 12,494,050 B2
(45) Date of Patent: Dec. 9, 2025

(54) SYSTEMS AND METHODS FOR SURGICAL DATA CLASSIFICATION

(71) Applicant: Intuitive Surgical Operations, Inc., Sunnyvale, CA (US)

(72) Inventors: Aneeq Zia, Atlanta, GA (US); Kiran Bhattacharyya, Atlanta, GA (US); Anthony Jarc, Johns Creek, GA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 301 days.

(21) Appl. No.: 18/035,095

(22) PCT Filed: Nov. 18, 2021

(86) PCT No.: PCT/US2021/059954
§ 371 (c)(1),
(2) Date: May 2, 2023

(87) PCT Pub. No.: WO2022/109177
PCT Pub. Date: May 27, 2022

(65) Prior Publication Data
US 2023/0326193 A1    Oct. 12, 2023

Related U.S. Application Data

(60) Provisional application No. 63/116,907, filed on Nov. 22, 2020.

(51) Int. Cl.
*G06V 10/80* (2022.01)
*A61B 34/37* (2016.01)
(Continued)

(52) U.S. Cl.
CPC ............ *G06V 10/811* (2022.01); *A61B 34/37* (2016.02); *G06V 10/764* (2022.01); *G06V 10/82* (2022.01); *G16H 40/63* (2018.01); *G06V 2201/03* (2022.01)

(58) Field of Classification Search
CPC .... G06V 10/811; G06V 10/764; G06V 10/82; G06V 2201/03; G06V 20/44; G06V 40/28; A61B 34/37; G16H 40/63
See application file for complete search history.

(56) References Cited

U.S. PATENT DOCUMENTS 9,283,675 B2   3/2016  Hager et al.
9,754,221 B1 * 9/2017  Nagaraja ................ G06N 3/045
(Continued)

FOREIGN PATENT DOCUMENTS

WO    WO-2016149794 A1    9/2016

OTHER PUBLICATIONS

C. Chen, R. Jafari and N. Kehtarnavaz, "Fusion of depth, skeleton, and inertial data for human action recognition," 2016 IEEE International Conference on Acoustics, Speech and Signal Processing (ICASSP), Shanghai, China, 2016, pp. 2712-2716, doi: 10.1109/ICASSP.2016.7472170. (Year: 2016).*

(Continued)

*Primary Examiner* — Sun M Li
(74) *Attorney, Agent, or Firm* — Foley & Lardner LLP

(57) ABSTRACT

Various of the disclosed embodiments are directed to computer-implemented systems and methods for recognizing surgical tasks from surgical data, In some embodiments an ensemble model configured to receive video data, kinematics data, and system event data from the surgical theater may be implemented. The ensemble model may implement modular streams for processing the data, facilitating predictions even when less than all the data types are available. In some embodiments, smoothing operations may help facilitate more accurate prediction results, Various of the embodiments may be employed in real-time during surgery, providing predictions at per-second intervals.

20 Claims, 20 Drawing Sheets

(51) Int. Cl.
  *G06V 10/764* (2022.01)
  *G06V 10/82* (2022.01)
  *G16H 40/63* (2018.01)

(56) References Cited

U.S. PATENT DOCUMENTS

| | | | | |
|---|---|---|---|---|
| 9,788,907 | B1 | 10/2017 | Alvi et al. | |
| 12,164,599 | B1* | 12/2024 | Roth | G06V 10/82 |
| 2013/0218340 | A1* | 8/2013 | Hager | B25J 9/1671 700/257 |
| 2018/0137643 | A1* | 5/2018 | Wang | G06V 10/40 |
| 2018/0268584 | A1* | 9/2018 | Bobovich | G06V 10/764 |
| 2020/0170710 | A1* | 6/2020 | Rus | G16H 20/40 |
| 2020/0250398 | A1* | 8/2020 | Courtiol | G06V 10/82 |
| 2022/0270750 | A1 | 8/2022 | Grantcharov et al. | |
| 2023/0368530 | A1* | 11/2023 | Wang | G06V 10/82 |

OTHER PUBLICATIONS

Imran, J., Raman, B. Evaluating fusion of RGB-D and inertial sensors for multimodal human action recognition. J Ambient Intell Human Comput 11, 189-208 (2020). https://doi.org/10.1007/s12652-019-01239-9 (Year: 2020).*

A New Classification Approach for Robotic Surgical Tasks Recognition, by Mehrdad J. Bani, and Shoele Jamali, arXiv: 1707.09849v1 [cs. RO] Jul. 12, 2017 (Year: 2017).*

Y. Qin et al., "Temporal Segmentation of Surgical Sub-tasks through Deep Learning with Multiple Data Sources," 2020 IEEE International Conference on Robotics and Automation (ICRA), Paris, France, 2020, pp. 371-377, doi: 10.1109/ICRA40945.2020.9196560. (Year: 2020).*

S. Albasri, M. Popescu and J. Keller, "Surgery Task Classification Using Procrustes Analysis," 2019 IEEE Applied Imagery Pattern Recognition Workshop (AIPR), Washington, DC, USA, 2019, pp. 1-6, doi: 10.1109/AIPR47015.2019.9174566. (Year: 2019).*

Spain SL, Barrett JC. Strategies for fine-mapping complex traits. Hum Mol Genet. Oct. 15, 2015;24(R1):R111-9. doi: 10.1093/hmg/ddv260. Epub Jul. 8, 2015. PMID: 26157023; PMCID: PMC4572002. (Year: 2015).*

Brynolfsson. P., et al., "Haralick Texture Features from Apparent Diffusion Coefficient (ADC) MRI Images Depend on Imaging and Pre-processing Parameters," Scientific Reports, Jun. 2017, vol. 7(1): 4041. Retrieved from [URL: https://www.nature.com/articles/#41598-017-04151-4.pdf] on Jul. 6, 2023. 11 pages.

"Caffe", framework webpage [URL: https://caffe.berkeleyvision.org/] as of Nov. 18, 2020. Retrieved from Internet Archive Wayback Machine [URL: https://web.archive.org/web/20201118052534/ http://caffe.berkeleyvision.org/] on May 8, 2023, 02 pages.

Carreira, J., et al., "Quo Vadis, Action Recognition? A New Model and the Kinetics Dataset," Computer Vision and Pattern Recognition, 2017, pp. 6298-6308. Retrieved from [URL: https://openaccess.thecvf.com/content_cvpr_2017/papers/Carreira_Quo Vadis_Action_CVPR_2017_paper.pdf] on Jul. 6, 2023, 10 pages.

Castellano, G., et al., "Texture Analysis of Medical Images," indicated as corresponding to Clinical Radiology, Dec. 2004, vol. 59 (12), pp. 1061-1069. Retrieved from [URL: http://facweb.cs.depaul.edu/research/vo/medix/2011/papers/Source2.pdf] on Jul. 6, 2023. 09 pages.

Chawla, N.V., et al. "SMOTE: Synthetic Minority Over-sampling Technique." arXiv preprint arXiv:1106.1813 (2011), though indicated as appearing earlier in Journal of Artificial Intelligence Research, 2002, pp. 321-357. Retrieved from [URL: https://arxiv.org/pdf/1106.1813.pdf] on Jul. 6, 2023, 37 pages.

Chen, C., et al., "Fusion of Depth, Skeleton, and Inertial Data for Human Action Recognition" as received in connection with the International Search Report and Written Opinion for Application No. PCT/US2021/059954) mailed Feb. 25, 2022 as reference XP32901096Al, identified as appearing in 2016 IEEE International Conference on Acoustics, Speech and Signal Processing (ICASSP), IEEE, Mar. 20, 2016, pp. 2712-2716, 05 pages.

"Scikit-learn Machine Learning in Python" toolset webpage [URL: https://scikit-learn.org/stable/] as of Nov. 19, 2020. Retrieved from Internet Archive Wayback Machine [URL: https://web.archive.org/web/20201119151816/https://scikit-learn.org/stable/] on May 10, 2023, 01 page.

Cohen, W., et al., "Stacked Sequential Learning," indicated as published in 2005 at [URL: https://www.ijcai.org/proceedings/2005/] retrieved Jul. 21, 2023. Retrieved from [URL: https://www.ijcal.org/Proceedings/05/Papers/0378.pdf] on Jul. 21, 2023. 06 pages.

Donahue, J., et al., "Long-term Recurrent Convolutional Networks for Visual Recognition and Description." arXiv preprint arXiv:1411.4389v4 (2016). Retrieved from [URL: https://arxiv.org/pdf/1411.4389.pdf] on Jul. 20, 2023, 14 pages.

Flouty, E., et al., "FaceOff: Anonymizing Videos in the Operating Rooms." arXiv preprint arXiv:1808.04440 (2018). Retrieved from [URL: https://arxiv.org/pdf/1808.04440] on Jul. 6, 2023, 08 pages.

Haralick, R.M., et al., "Textoral Features for Image Classification," 1973, indicated as reprinted from IEEE Transactions on Systems, Man, and Cybernetics, Nov. 1973, vol. 3(6), pp. 610-621. Retrieved from [URL: http://haraliok.org/journals/TexturalFeatures.pdf] on Jul. 6, 2023, 12 pages.

He, K., et al. "Identity Mappings in Deep Residual Networks." Sep. 2016, In European Conference on Computer Vision (pp. 630-645). Springer. Retrieved from [URL: https://link.springer.com/content/pdf/10.1007/978-3-319-46493-0_38.pdf?pdf=inline9%20link] on Jul. 21, 2023, 16 pages.

"Hmmlearn" library webpage [URL: https://hmmlearn.readthedocs.io/en/latest/], as of Nov. 12, 2020. Retrieved from Internet Archive Wayback Machine [URL: https://web.archive.org/web/20201112033228/https://hmmlearn.readthedocs.io/en/latest/] on Jul. 23, 2023, 01 page.

Hu, M-K., "Visual Pattern Recognition by Moment Invariants," indicated as appearing in IRE Transactions on Information Theory, 1962, vol. 8(2), pp. 179-187. Retrieved from [URL: https://www.cs.utexas.edu/~grauman/courses/spring2011/psets/pset5/huMoments.pdf] on Jul. 6, 2023, 09 pages.

Imran, J., et al., "Evaluating Fusion of RGB-D and Inertial Sensors for Multimodal Human Action Recognition," as received in connection with the International Search Report and Written Opinion for Application No. PCT/US2021/059954 (P06384-WO) mailed Feb. 25, 2022, as reference XP36883188Al, identified as appearing in Journal of Ambient Intelligence and Humanized Computing, Springer Berlin Heidelberg, vol. 11 (1). Feb. 12, 2019, pp. 189-208. 20 pages.

International Preliminary Report on Patentability for Application No. PCT/US2021/059954, mailed Jun. 1, 2023, 10 pages.

International Search Report and Written Opinion for Application No. PCT/US2021/059954, mailed Feb. 25, 2022, 13 pages.

Issenhuth, T., et al. "Face detection in the operating room: Comparison of state-of-the-art methods and a self-supervised approach," International journal of computer assisted radiology and surgery 14 (2019): 1049-1058. Retrieved from an account with "Reprints Desk" [URL: https://www.researchsolutions.com/] in Jul. 2023, 10 pages.

Jia, Y., et al. "Caffe: Convolutional Architecture for Fast Feature Embedding." arXiv preprint arXiv:1408.5093 (2014). Retrieved from [URL: https://arxiv.org/pdf/1408.5093] on Jul. 6, 2023, 04 pages.

"Keras" Application Programming Interface webpage [URL: https://keras.io/], as of Nov. 19, 2020. Retrieved from Internet Archive Wayback Machine [URL: http://web.archive.org/web/20201119075317/https://keras.io/] on May 9, 2023, 02 pages.

Li, J., et al., "A Comprehensive Review of Current Local Features for Computer Vision," indicated as appearing in Neurocomputing, Jun. 2008, vol. 71(10-12), pp. 1771-1787. Retrieved from [URL: https://www.labxing.com/files/lab_publications/4969-1556263566-uDiYizJz.pdf] on Jul. 6, 2023, 17 pages.

"LIBSVM—A Library for Support Vector Machines" library webpage [URL: https://www.csie.nu.edu.tw/~cjlin/libsvm/], as of Nov. 9, 2020. Retrieved from Internet Archive Wayback Machine [URL:

(56) References Cited

OTHER PUBLICATIONS https://web.archive.org/web/20201109215549/https://www.csie.ntu.edu.tw/~cjlin/libsvm/] on May 9, 2023, 02 pages.
Maier-Hein. L., et al., "Surgical data science: enabling next-generation surgery." arXiv preprint arXiv:1701.06482 (2017). Retrieved from [URL: https://arxiv.org/pdf/1701.06482] on Jul. 6, 2023, 10 pages.
Munzer, B., et al., "Content-based Processing and Analysis of Endoscopic Images and Videos: A Survey," Multimedia Tools and Applications, 2018, vol. 77(1), pp. 1323-1362. Retrieved from [URL: https://link.springer.com/content/pdf/10.1007/s11042-016-4219-z.pdf?pdf=button] on Jul. 6, 2023, 40 pages.
Munzer, B., et al., "Relevance Segmentation of Laparoscopic Videos," IEEE International Symposium on Multimedia, 2013, pp. 84-91. Retrieved from an account with "Reprints Desk" [URL: https://www.researchsolutions.com/] in Jul. 2023, 8 pages.
Ren, Y., "Get Started with Using CNN+LSTM for Forecasting," webpage [URL: https://towardsdatascience.com/get-started-with-using-cnn-lstm-for-forecasting-61014dde5826], Mar. 11, 2019. Retrieved, as of Mar. 12, 2019, from Internet Archive Wayback Machine [URL: https://web.archive.org/web/20190312004124/https://towardsdatascience.com/get-started-with-using-cnn-lstm-for-forecasting-61014dde5826] on Jul. 20, 2023, 03 pages.
Ross, D.A., et al., "Incremental Learning for Robust Visual Tracking" indicated as appearing in International Journal of Computer Vision, May 2008, vol. 77(1-3), pp. 125-141. Retrieved from [URL: https://www.cs.ait.ac.th/~mdailey/cvreadings/Ross-Incremental.pdf] on Jul. 23, 2023, 17 pages.
Sandler, M., et al., "MobileNetV2: Inverted Residuals and Linear Bottlenecks." arXiv preprint arXiv:1801.04381 (2019). Retrieved from [URL: https://arxiv.org/pdf/1801.04381] on Jul. 6, 2023, 14 pages.
Simonyan, K., et al., "Very deep convolutional networks for large-scale image recognition." arXiv preprint arXiv:1409.1556 (2015). Indicated as being published as a conference paper at ICLR, 2015. Retrieved from [URL: https://arxiv.org/pdf/1409.1556.pdf] on Jul. 6, 2023, 14 pages.
Stanek, S.R., et al., "Automatic Real-time Detection of Endoscopic Procedures Using Temporal Features," Computer Methods and Programs in Biomedicine, Nov. 2012, vol. 108(2), pp. 524-535. Retrieved from an account with "Reprints Desk" [URL: https:/www.researchhsolutions.com/] in Jul. 2023, 12 pages.
Tao, L., et al., "Surgical Gesture Segmentation and Recognition," Medical Image Computing and Computer-assisted Intervention, 2013, vol. 16 (Part III), pp. 339-346. Retrieved from [URL: https://link.springer.com/content/pdf/10.1007/978-3-642-40760-4_43.pdf?pdf=inline%20link] on Jul. 6, 2023, 08 pages.
"Tensorflow" platform webpage [URL: https://www.tensorflow.org/] as of Nov. 18, 2020. Retrieved from Internet Archive Wayback Machine [URL: https://web.archive.org/web/20201118224711/https://www.tensorflow.org/] on May 9, 2023, 03 pages.
"Torch, A Scientific Computing Framework for LUAJIT" framework webpage [URL: http://torch.ch/] as of Nov. 18, 2020. Retrieved from Internet Archive Wayback Machine [URL: https://web.archive.org/web/20201118030716/ http://torch.ch/] on May 9, 2023, 01 page.
Twinanda, A., "EndoNet: A Deep Architecture for Recognition Tasks on Laparoscopic Videos," in IEEE Transactions on Medical Imaging, vol. 36, No. 1, pp. 86-97, Jan. 2017. Retrieved from an account with "Reprints Desk" [URL: https://www.researchsolutions.com/] in Jul. 2023, 12 pages.
Vedula, S.S., et al., "Objective Assessment of Surgical Technical Skill and Competency in the Operating Room." Annual Review of Biomedical Engineering, Jun. 2017, vol. 19, pp. 301-325. Retrieved from [URL: https://www.ncbi.nlm.nih.gov/pmc/articles/PMC5555216/pdf/nihms889635.pdf] on Jul. 6, 2023, 31 pages.
Vedula, S.S., et al., "Surgical Data Science: the New Knowledge Domain," Innovative Surgical Sciences, Apr. 2017, vol. 2(3), pp. 108-121. Retrieved from https://www.ncbi.nlm.nih.gov/pmo/articles/PMC5602563/pdf/iss-2-20170004.pdf on Jul. 6, 2023, 21 pages.
Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.
Wang, Z., et al., "Automated Video Scrubbing When Endoscopes Are Out of Body during Minimally Invasive Surgery," submitted Feb. 7, 2020 to the 2020 International Symposium on Medical Robotics (ISMR2020), 01 page.
Young, S., et al., "Deep Super Learner: A Deep Ensemble for Classification Problems." arXiv preprint arXiv:1803.02323 (2018). Retrieved from [URL: https://arxiv.org/pdf/1803.02323.pdf] on Jul. 23, 2023, 12 pages.
Zia, A., et al. "Surgical activity recognition in robot-assisted radical prostatectomy using deep learning." Medical Image Computing and Computer Assisted Intervention—MICCAI 2018: 21st International Conference, Granada, Spain, Sep. 16-20, 2018, Proceedings, Part IV 11. Springer International Publishing, 2018. Retrieved from an account with "Reprints Desk" [URL: https://www.researchsolutions.com/] in Jul. 2023, 08 pages.
Zohar, M., et al., "Accurate Detection of Out of Body Segments in Surgical Video using Semi-Supervised Learning." Proceedings of Machine Learning Research, Jul. 2020, vol. 121, pp. 923-936 ("Jul. 6-8, 2020" conference date identified at [URL: https://proceedings.mlr.press/v121/] retrieved Jul. 6, 2023). Retrieved from [URL: http://proceedings.mlr.press/v121/zohar20a/zohar20a.pdf] on Jul. 6, 2023, 14 pages.
International Search Report and Written Opinion for Application No. PCT/US2024/037467, mailed on Oct. 28, 2024, 11 pages.

* cited by examiner

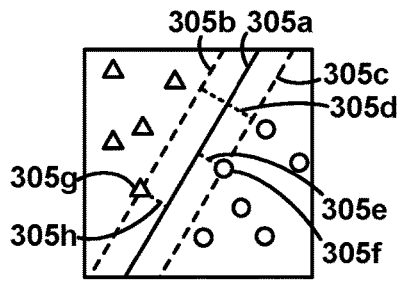
*FIG. 3A*
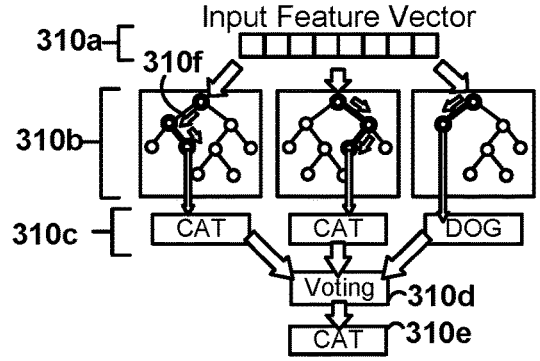
*FIG. 3B*
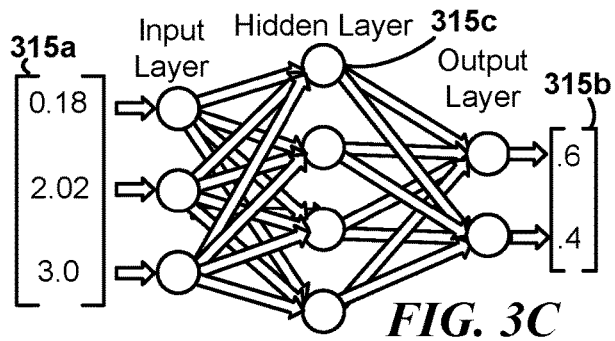
*FIG. 3C*
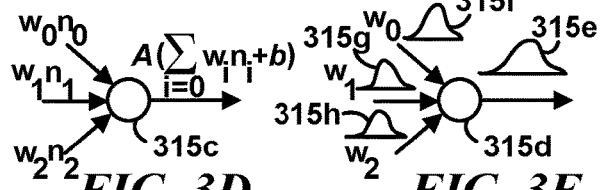
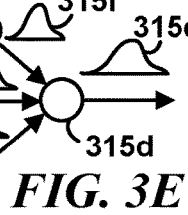
*FIG. 3D*  *FIG. 3E*
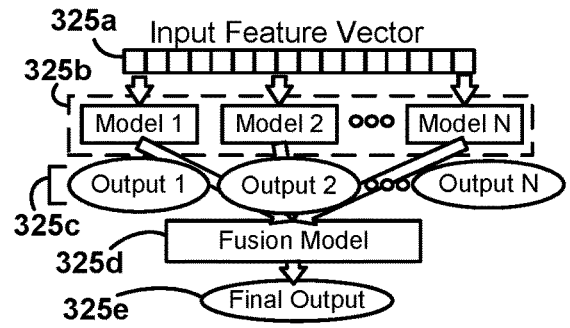
*FIG. 3G*
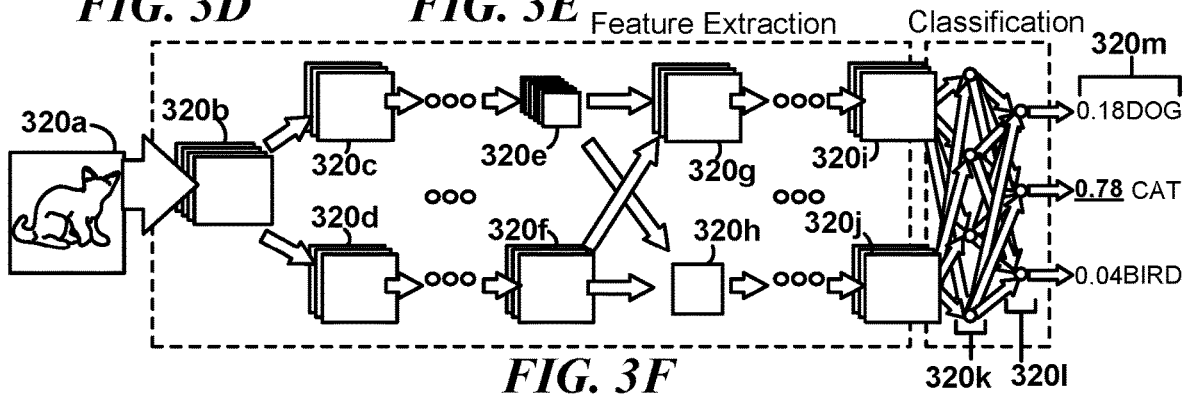
*FIG. 3F*
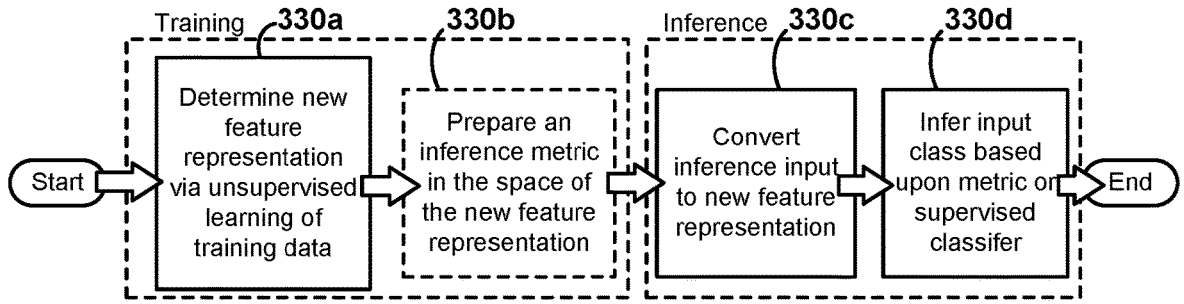
*FIG. 3H*

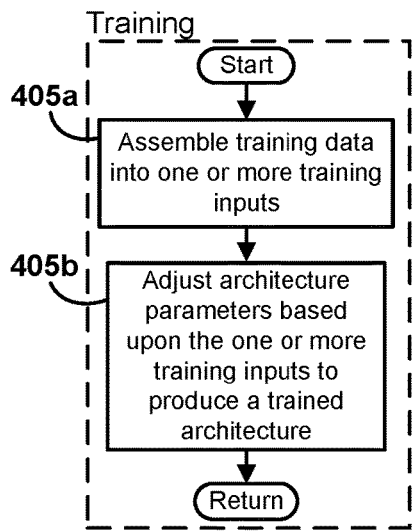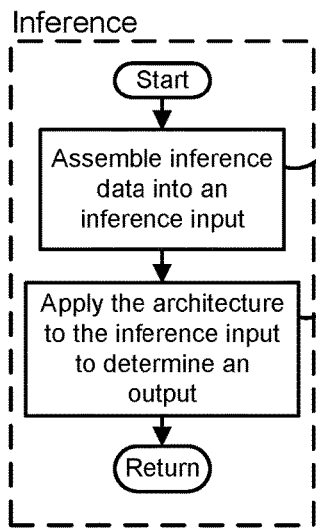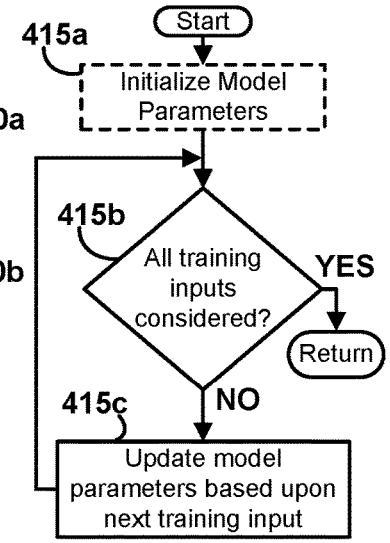
*FIG. 4A*  *FIG. 4B*  *FIG. 4C*
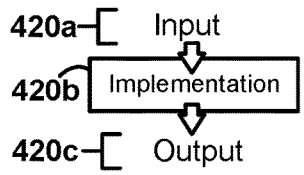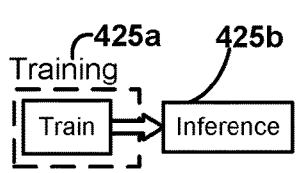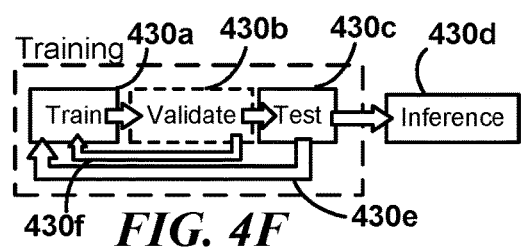
*FIG. 4D*  *FIG. 4E*  *FIG. 4F*
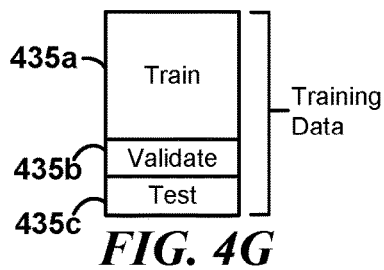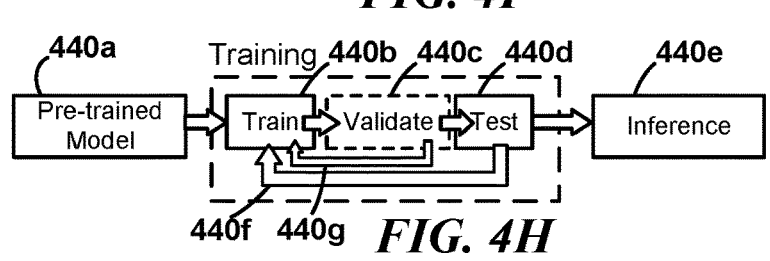
*FIG. 4G*  *FIG. 4H*
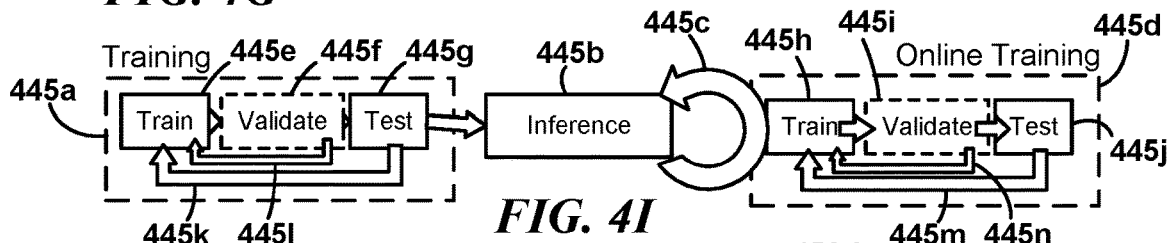
*FIG. 4I*
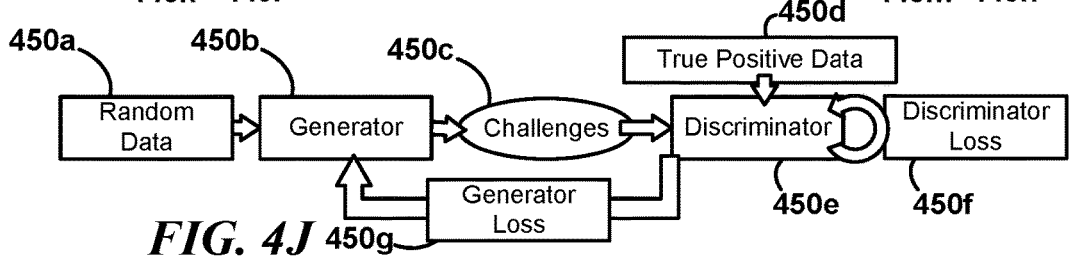
*FIG. 4J*

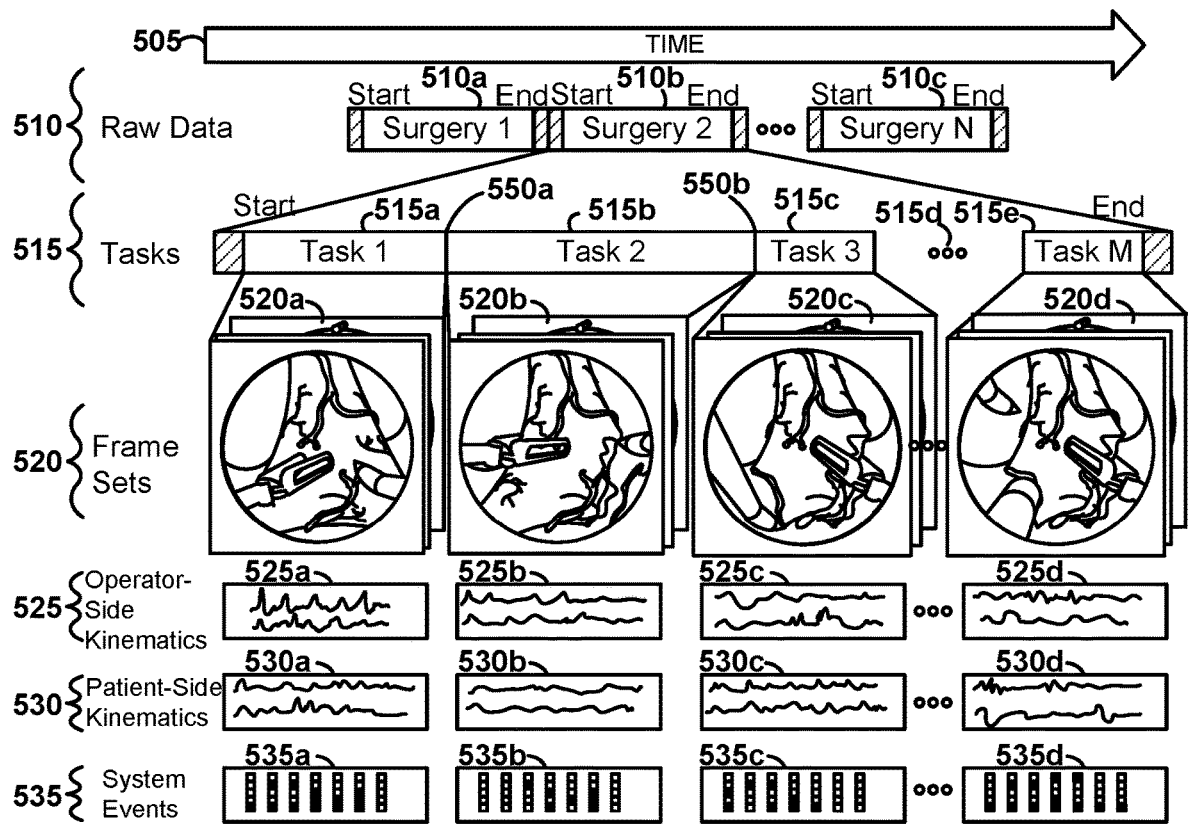

*FIG. 5A*

| Task name | Description | Start point | End point |
|---|---|---|---|
| Mobilize Colon | Exposing the prostate in the retropubic space by mobilizing the colon | First tool interaction with colon or surrounding tissue | Last tool interaction with colon or surrounding tissue |
| Endopelvic Fascia Dissection | Separation of the lateral edges of prostate from the endopelvic fascia (blunt sweeping motions) and exposing apex | First tool-tissue interaction that is directed at the endopelvic fascia (EPF) | Last tissue interaction with the EPF after the prostate is defatted and separated from EPF |
| Apical Dissection | Dissection of the apex of the prostate ultimately results in freed specimen | First tool-tissue interaction, often to orient the prostate for apical dissection | Prostate has been freed from all attachments |

*FIG. 5B*

```
1.  {"recorder_timestamp":1574371901.144726,
2.  ...
3.  "decoded_msg_dict":{
4.  "record_header":{
5.  "servosync_timestamp":61338, ...
6.  "ms_since_boot":3597747,...
7.  "msc_system_state":2,
8.  "msc_procedure_state":1} ...
9.  ...
10. "tool_data":
11. {"SerialNumber_64":1907080129,
12. "Name":"MONOPOLAR CURVED SCISSORS"
13. ...
14. "event_entry": {
15. "event_string":"TOOL_OFFSCREEN",
16. "history_buffer_id":3,
17. "event":8001,
18. "message_type":2}
19. ...
```

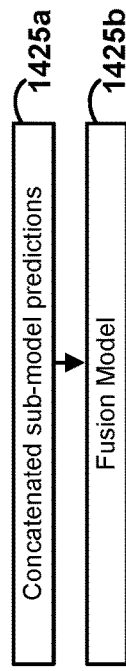
FIG. 14A
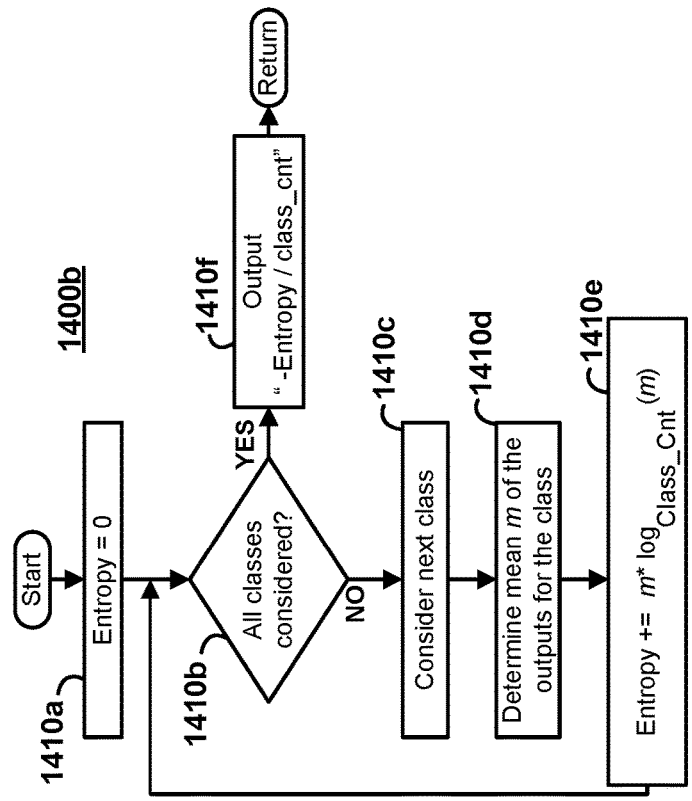
FIG. 14B
FIG. 14C
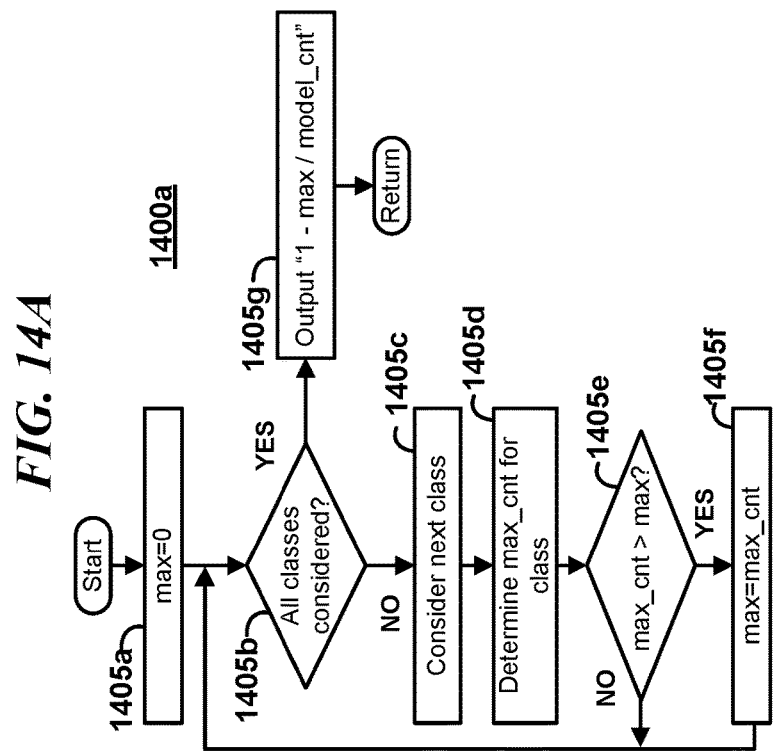
FIG. 14D

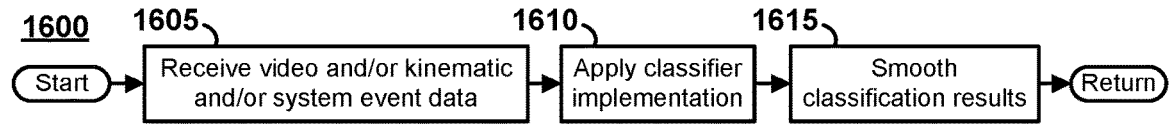
FIG. 16A
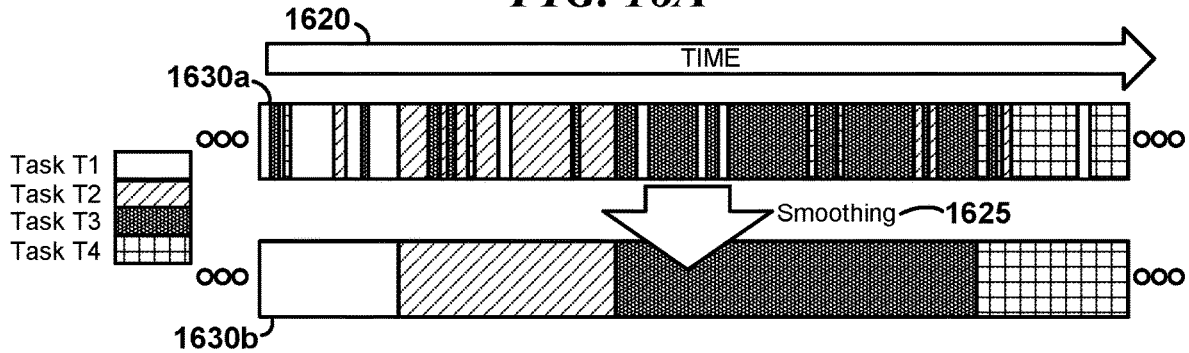
FIG. 16B
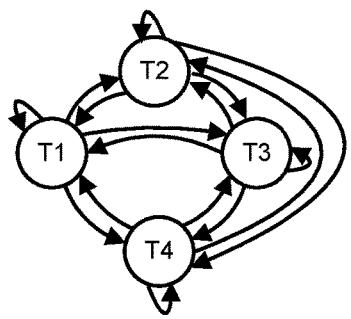
FIG. 16C
Start Task Probability: $P(x_0)$
Transition Probability: $(X_{t+1}|X_t)$
Emission Probability: $P(X_k|e_{1:t})$
|    | T1    | T2    | T3    | T4    |
|----|-------|-------|-------|-------|
| T1 | 0.991 | 0.001 | 0.005 | 0.003 |
| T2 | 0.004 | 0.990 | 0.002 | 0.004 |
| T3 | 0.004 | 0.001 | 0.991 | 0.004 |
| T4 | 0.001 | 0.005 | 0.001 | 0.993 |
Transition Probability: $(X_{t+1}|X_t)$
FIG. 16D
|    | T1   | T2   | T3   | T4   |
|----|------|------|------|------|
| T1 | 0.90 | 0.04 | 0.02 | 0.04 |
| T2 | 0.05 | 0.91 | 0.01 | 0.03 |
| T3 | 0.03 | 0.04 | 0.92 | 0.01 |
| T4 | 0.01 | 0.01 | 0.07 | 0.91 |
Emission Probability: $P(X_k|e_{1:t})$
FIG. 16E
|        | T1   | T2   | T3   | T4   |
|--------|------|------|------|------|
| $P(x_0)$ | 0.80 | 0.16 | 0.02 | 0.02 |
Start Task Probability: $P(x_0)$
FIG. 16F

| | Training cases | Test cases |
|---|---|---|
| Prostatectomy | 300 | 100 |
| Porcine Training Lab | 20 | 10 |
| Inguinal Hernia | 100 | 30 |
| Hysterectomy | 60 | 20 |
| Cholecystectomy | 25 | 10 |
*FIG. 18A*
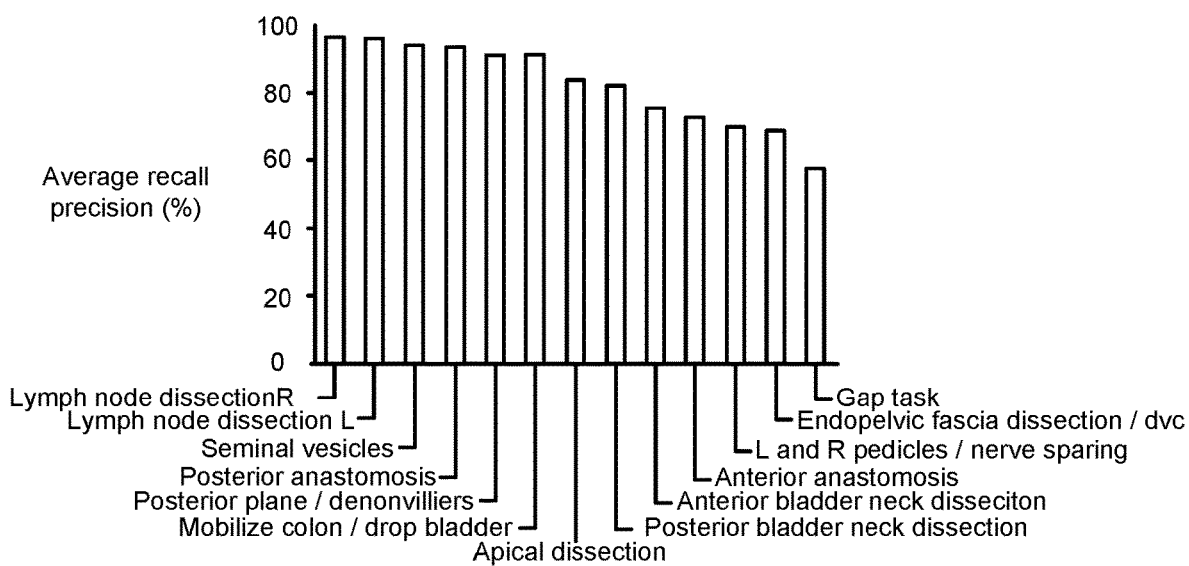
*FIG. 18B*
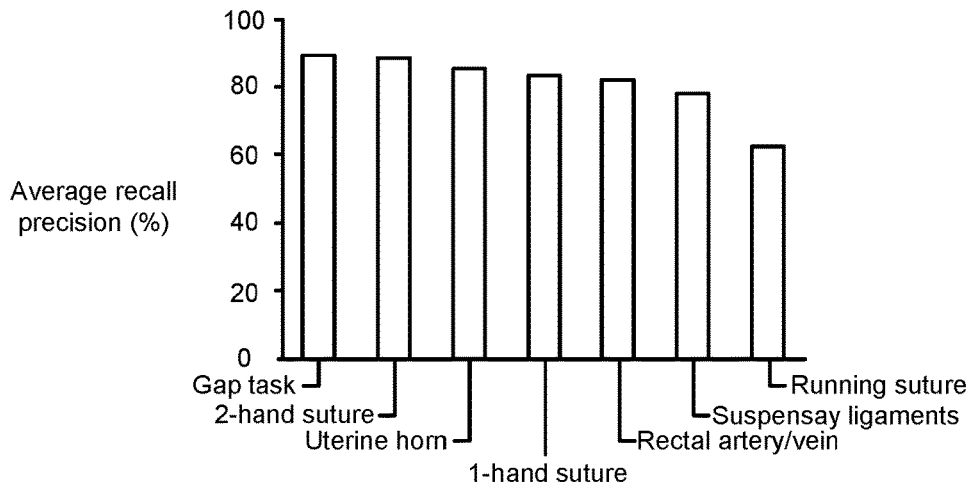
*FIG. 18C*

SYSTEMS AND METHODS FOR SURGICAL DATA CLASSIFICATION

CROSS-REFERENCE TO RELATED APPLICATIONS

This application is a national stage application under 35 U.S.C. § 371 of International Application PCT/US2021/059954, filed upon Nov. 18, 2021, and entitled "SYSTEMS AND METHODS FOR SURGICAL DATA CLASSIFICATION", which claims the benefit of, and priority to, U.S. Provisional Application No. 63/116,907, filed upon Nov. 22, 2020, entitled "SYSTEMS AND METHODS FOR SURGICAL DATA CLASSIFICATION", each of which is incorporated by reference herein in its entirety for all purposes.

TECHNICAL FIELD

Various of the disclosed embodiments relate to computer-implemented systems and methods for recognizing surgical tasks from surgical data.

BACKGROUND

The increasing data-gathering capability of many surgical theaters, both those with and without robotic systems, may potentially enable a wide variety of new improvements and applications. For example, data from surgical robotic systems, endoscopes, and laparoscopic sensors may facilitate the detection of surgical inefficiencies, be used to provide surgeons with more meaningful feedback, recognize common characteristics among patient populations, optimize instrument usage, etc. These applications may include offline applications performed after the surgery (e.g., in a hospital system assessing the performance of several physicians) as well as real-time applications performed during the surgery (e.g., a real-time digital surgeon's assistant or surgical tool optimizer).

Unfortunately, many of these applications' processing pipelines require, or benefit from, the recognition of surgical tasks from the surgical data. For example, a cloud-based digital assistant may be able to provide a surgeon with real-time advice, but only if the assistant can recognize the surgeon's progress through the surgery. While a surgical expert may be adept at manually recognizing tasks within surgical data, relying upon a human expert to provide such annotations risks introducing human error and subjectivity, is not readily scalable, and is impractical in real-time situations such as the real-time assistant described above. However, automated solutions present their own challenges. While potentially more scalable, such systems must contend with disparate sensor availability in different theaters, limited computational resources for real-time applications, and the high standards for correct recognition, as improper recognition may improperly bias downstream machine learning models and risk negative patient outcomes in the surgical theater.

Accordingly, there exist needs for systems and methods able to provide accurate and consistent recognitions of types of surgical operations from surgical data, despite the challenges of data availability, challenges in data consistency, and the requirement that improper recognitions remain exceptionally low.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 3A is a schematic depiction of the operation of various aspects of an example Support Vector Machine (SVM) machine learning model architecture;

FIG. 3B is a schematic depiction of various aspects of the operation of an example random forest machine learning model architecture;

FIG. 3C is a schematic depiction of various aspects of the operation of an example neural network machine learning model architecture;

FIG. 3D is a schematic depiction of a possible relation between inputs and outputs in a node of the example neural network architecture of FIG. 3C;

FIG. 3E is a schematic depiction of an example input-output relation variation as may occur in a Bayesian neural network;

FIG. 3F is a schematic depiction of various aspects of the operation of an example deep learning architecture;

FIG. 3G is a schematic depiction of various aspects of the operation of an example ensemble architecture;

FIG. 3H is a schematic block diagram depicting various operations of an example pipeline architecture;

FIG. 4A is a schematic flow diagram depicting various operations common to a variety of machine learning model training methods;

FIG. 4B is a schematic flow diagram depicting various operations common to a variety of machine learning model inference methods;

FIG. 4C is a schematic flow diagram depicting various iterative training operations occurring at block 405b in some architectures and training methods;

FIG. 4D is a schematic block diagram depicting various machine learning method operations lacking rigid distinctions between training and inference methods;

FIG. 4E is a schematic block diagram depicting an example relationship between architecture training methods and inference methods;

FIG. 4F is a schematic block diagram depicting an example relationship between machine learning model training methods and inference methods, wherein the training methods comprise various data subset operations;

FIG. 4G is a schematic block diagram depicting an example decomposition of training data into a training subset, a validation subset, and a testing subset;

FIG. 4H is a schematic block diagram depicting various operations in a training method incorporating transfer learning;

FIG. 4I is a schematic block diagram depicting various operations in a training method incorporating online learning;

FIG. 4J is a schematic block diagram depicting various components in an example generative adversarial network method;

FIG. 5A is a schematic illustration of surgical data as may be received at a processing system in some embodiments;

FIG. 5B is a table of example tasks as may be used in conjunction with various disclosed embodiments;

FIG. 14A is a table of abstract example classification results as may be considered in the uncertainty calculations of FIGS. 14B and 14C;

FIG. 14B is a flow diagram illustrating various operations in a process for calculating uncertainty with class counts as may be implemented in some embodiments;

FIG. 14C is a flow diagram illustrating various operations in a process for calculating uncertainty with entropy as may be implemented in some embodiments;

FIG. 14D is a schematic depiction of uncertainty results using a generative machine learning model as may be employed in some embodiments;

FIG. 16A is a flow diagram illustrating various operations in a classification with smoothing process as may be applied in some embodiments;

FIG. 16B is a schematic diagram illustrating a classification smoothing operation as may be applied in some embodiments;

FIG. 16C is a state transition diagram illustrating a hypothetical set of task transition operations as may be implemented in some embodiments;

FIG. 16D is an example state transition probability matrix for the transition diagram of FIG. 16C;

FIG. 16E is an example task state emission probability matrix for the transition diagram of FIG. 16C;

FIG. 16F is an example set of task state starting probabilities for the transition diagram of FIG. 16C;

FIG. 18A is a table depicting properties of example datasets used for training and validating an example implementation of an embodiment;

FIG. 18B is a bar plot of average recall precision results for various tasks upon an example implementation model of an embodiment trained upon a prostatectomy dataset;

FIG. 18C is a bar plot of average recall precision results for various tasks upon an example implementation model of an embodiment trained upon a porcine dataset;

Figure 1A:
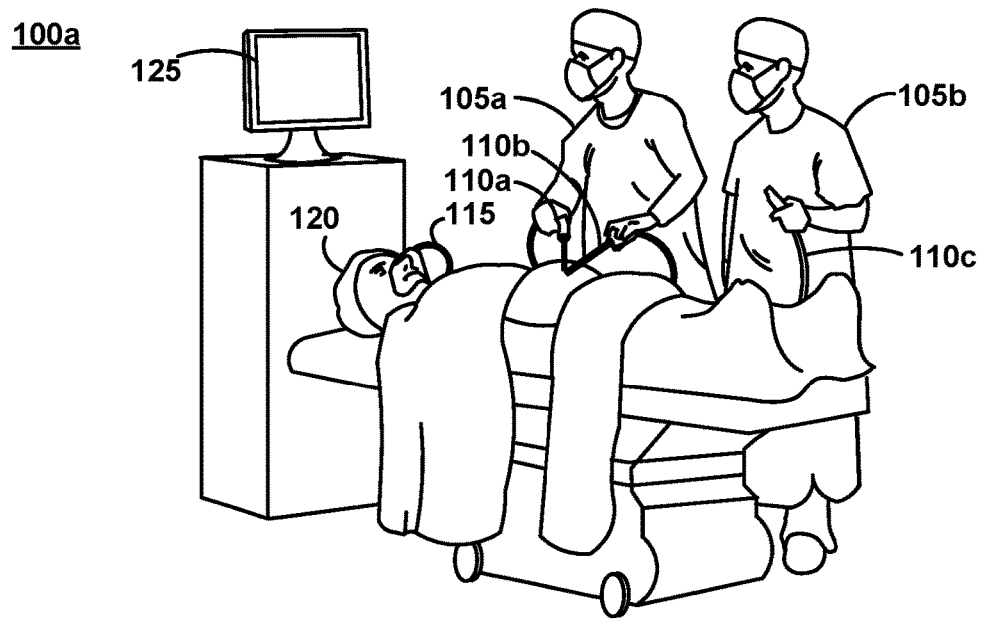
FIG. 1A is a schematic view of various elements appearing in a surgical theater during a surgical operation as may occur in relation to some embodiments.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The embodiments are intended to cover all modifications, equivalents, and alternatives falling within the scope of the disclosed examples, rather than limit the embodiments to the particular examples described or depicted.

DETAILED DESCRIPTION

Example Surgical Theaters Overview

FIG. 1A is a schematic view of various elements appearing in a surgical theater 100a during a surgical operation as may occur in relation to some embodiments. Particularly, FIG. 1A depicts a non-robotic surgical theater 100a, wherein a patient-side surgeon 105a performs an operation upon a patient 120 with the assistance of one or more assisting members 105b, who may themselves be surgeons, physician's assistants, nurses, technicians, etc. The surgeon 105a may perform the operation using a variety of tools, e.g., a visualization tool 110b such as a laparoscopic ultrasound or endoscope, and a mechanical end effector 110a such as scissors, retractors, a dissector, etc.

The visualization tool 110b provides the surgeon 105a with an interior view of the patient 120, e.g., by displaying visualization output from a camera mechanically and electrically coupled with the visualization tool 110b. The surgeon may view the visualization output, e.g., through an eyepiece coupled with visualization tool 110b or upon a display 125 configured to receive the visualization output. For example, where the visualization tool 110b is an endoscope, the visualization output may be a color or grayscale image. Display 125 may allow assisting member 105b to monitor surgeon 105a's progress during the surgery. The visualization output from visualization tool 110b may be recorded and stored for future review, e.g., using hardware or software on the visualization tool 110b itself, capturing the visualization output in parallel as it is provided to display 125, or capturing the output from display 125 once it appears on-screen, etc. While two-dimensional video capture with visualization tool 110b may be discussed extensively herein, as when visualization tool 110b is an endoscope, one will appreciate that, in some embodiments, visualization tool 110b may capture depth data instead of, or in addition to, two-dimensional image data (e.g., with a laser rangefinder, stereoscopy, etc.). Accordingly, one will appreciate that it may be possible to apply the two-dimensional operations discussed herein, mutatis mutandis, to such three-dimensional depth data when such data is available. For example, machine learning model inputs may be expanded or modified to accept features derived from such depth data.

A single surgery may include the performance of several groups of actions, each group of actions forming a discrete unit referred to herein as a task. For example, locating a tumor may constitute a first task, excising the tumor a second task, and closing the surgery site a third task. Each task may include multiple actions, e.g., a tumor excision task may require several cutting actions and several cauterization actions. While some surgeries require that tasks assume a specific order (e.g., excision occurs before closure), the order and presence of some tasks in some surgeries may be allowed to vary (e.g., the elimination of a precautionary task or a reordering of excision tasks where the order has no effect). Transitioning between tasks may require the surgeon 105a to remove tools from the patient, replace tools with different tools, or introduce new tools. Some tasks may require that the visualization tool 110b be removed and repositioned relative to its position in a previous task. While some assisting members 105b may assist with surgery-related tasks, such as administering anesthesia 115 to the patient 120, assisting members 105b may also assist with these task transitions, e.g., anticipating the need for a new tool 110c.

Figure 1B:
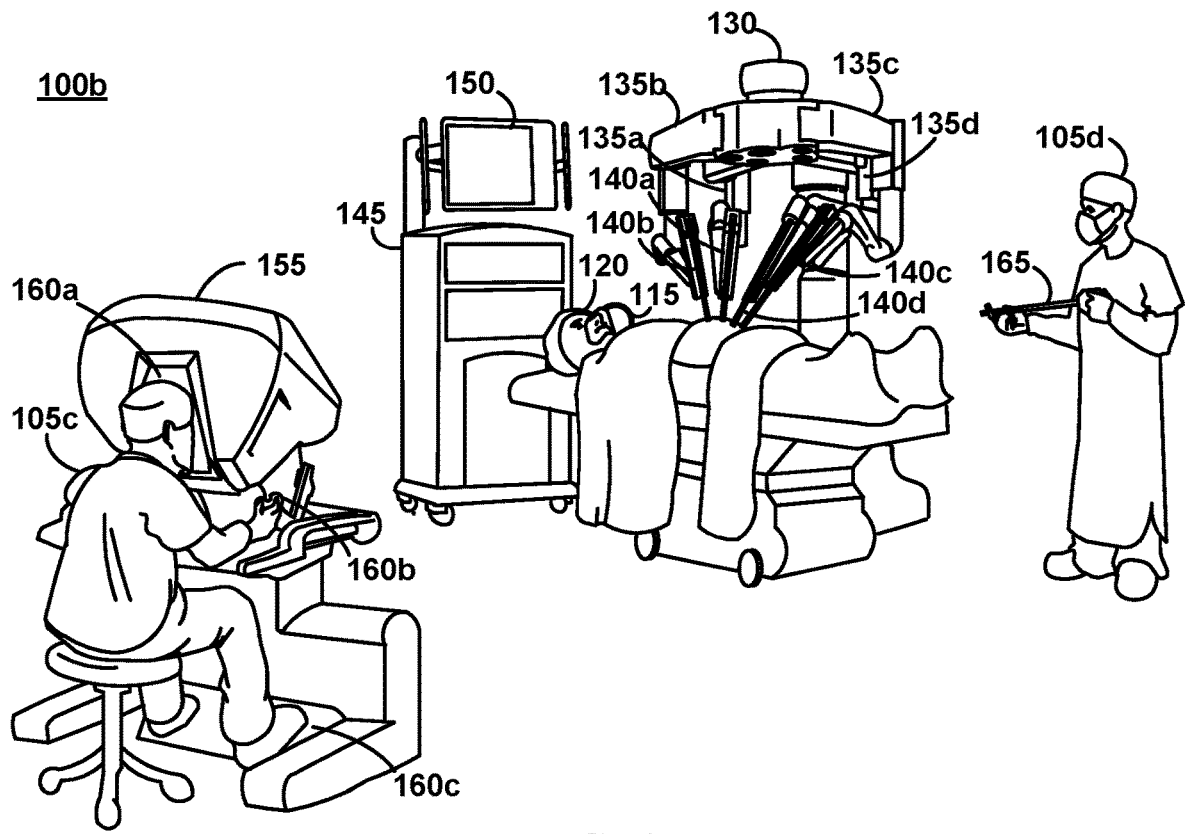
FIG. 1B is a schematic view of various elements appearing in a surgical theater during a surgical operation employing a surgical robot as may occur in relation to some embodiments.

Advances in technology have enabled procedures such as that depicted in FIG. 1A to also be performed with robotic systems, as well as the performance of procedures unable to be performed in non-robotic surgical theater 100a. Specifically, FIG. 1B is a schematic view of various elements appearing in a surgical theater 100b during a surgical operation employing a surgical robot, such as a da Vinci™ surgical system, as may occur in relation to some embodiments. Here, patient side cart 130 having tools 140a, 140b, 140c, and 140d attached to each of a plurality of arms 135a, 135b, 135c, and 135d, respectively, may take the position of patient-side surgeon 105a. As before, the tools 140a, 140b, 140c, and 140d may include a visualization tool 140d, such as an endoscope, laparoscopic ultrasound, etc. An operator 105c, who may be a surgeon, may view the output of visualization tool 140d through a display 160a upon a surgeon console 155. By manipulating a hand-held input mechanism 160b and pedals 160c, the operator 105c may remotely communicate with tools 140a-d on patient side cart 130 so as to perform the surgical procedure on patient 120. Indeed, the operator 105c may or may not be in the same physical location as patient side cart 130 and patient 120 since the communication between surgeon console 155 and patient side cart 130 may occur across a telecommunication network in some embodiments. An electronics/control console 145 may also include a display 150 depicting patient vitals and/or the output of visualization tool 140d.

Similar to the task transitions of non-robotic surgical theater 100a, the surgical operation of theater 100b may require that tools 140a-d, including the visualization tool 140d, be removed or replaced for various tasks as well as new tools, e.g., new tool 165, introduced. As before, one or more assisting members 105d may now anticipate such changes, working with operator 105c to make any necessary adjustments as the surgery progresses.

Also similar to the non-robotic surgical theater 100*a*, the output form the visualization tool 140*d* may here be recorded, e.g., at patient side cart 130, surgeon console 155, from display 150, etc. While some tools 110*a*, 110*b*, 110*c* in non-robotic surgical theater 100*a* may record additional data, such as temperature, motion, conductivity, energy levels, etc. the presence of surgeon console 155 and patient side cart 130 in theater 100*b* may facilitate the recordation of considerably more data than is only output from the visualization tool 140*d*. For example, operator 105*c*'s manipulation of hand-held input mechanism 160*b*, activation of pedals 160*c*, eye movement within display 160*a*, etc. may all be recorded. Similarly, patient side cart 130 may record tool activations (e.g., the application of radiative energy, closing of scissors, etc.), movement of end effectors, etc. throughout the surgery.

Machine Learning Foundational Concepts—Overview

This section provides a foundational description of machine learning model architectures and methods as may be relevant to various of the disclosed embodiments. Machine learning comprises a vast, heterogeneous landscape and has experienced many sudden and overlapping developments. Given this complexity, practitioners have not always used terms consistently or with rigorous clarity. Accordingly, this section seeks to provide a common ground to better ensure the reader's comprehension of the disclosed embodiments' substance. One will appreciate that exhaustively addressing all known machine learning models, as well as all known possible variants of the architectures, tasks, methods, and methodologies thereof herein is not feasible. Instead, one will appreciate that the examples discussed herein are merely representative and that various of the disclosed embodiments may employ many other architectures and methods than those which are explicitly discussed.

Figure 2A:
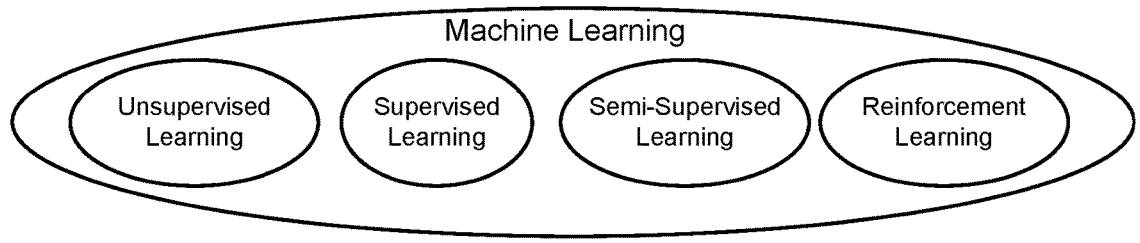
FIG. 2A is a schematic Euler diagram depicting conventional groupings of machine learning models and methodologies.

To orient the reader relative to the existing literature, FIG. 2A depicts conventionally recognized groupings of machine learning models and methodologies, also referred to as techniques, in the form of a schematic Euler diagram. The groupings of FIG. 2A will be described with reference to FIGS. 2B-E in their conventional manner so as to orient the reader, before a more comprehensive description of the machine learning field is provided with respect to FIG. 2F.

Figure 2B:
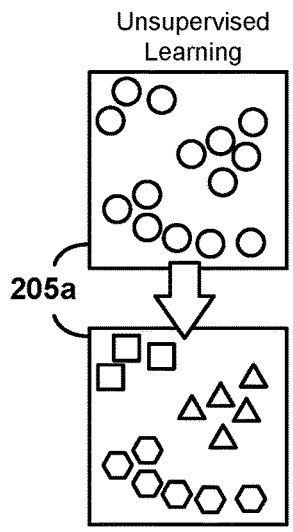
FIG. 2B is a schematic diagram depicting various operations of an example unsupervised learning method in accordance with the conventional groupings of FIG. 2A.

The conventional groupings of FIG. 2A typically distinguish between machine learning models and their methodologies based upon the nature of the input the model is expected to receive or that the methodology is expected to operate upon. Unsupervised learning methodologies draw inferences from input datasets which lack output metadata (also referred to as a "unlabeled data") or by ignoring such metadata if it is present. For example, as shown in FIG. 2B, an unsupervised K-Nearest-Neighbor (KNN) model architecture may receive a plurality of unlabeled inputs, represented by circles in a feature space 205*a*. A feature space is a mathematical space of inputs which a given model architecture is configured to operate upon. For example, if a 128×128 grayscale pixel image were provided as input to the KNN, it may be treated as a linear array of 16,384 "features" (i.e., the raw pixel values). The feature space would then be a 16,384 dimensional space (a space of only two dimensions is show in FIG. 2B to facilitate understanding). If instead, e.g., a Fourier transform were applied to the pixel data, then the resulting frequency magnitudes and phases may serve as the "features" to be input into the model architecture. Though input values in a feature space may sometimes be referred to as feature "vectors," one will appreciate that not all model architectures expect to receive feature inputs in a linear form (e.g., some deep learning networks expect input features as matrices or tensors). Accordingly, mention of a vector of features, matrix of features, etc. should be seen as exemplary of possible forms that may be input to a model architecture absent context indicating otherwise. Similarly, reference to an "input" will be understood to include any possible feature type or form acceptable to the architecture. Continuing with the example of FIG. 2B, the KNN classifier may output associations between the input vectors and various groupings determined by the KNN classifier as represented by the indicated squares, triangles, and hexagons in the figure. Thus, unsupervised methodologies may include, e.g., determining clusters in data as in this example, reducing or changing the feature dimensions used to represent data inputs, etc.

Figure 2C:
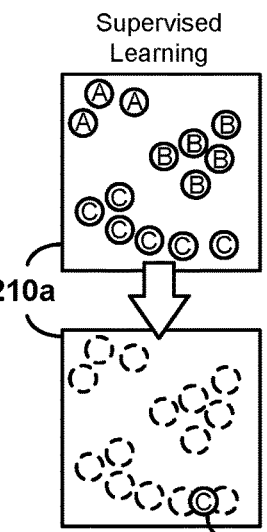
FIG. 2C is a schematic diagram depicting various operations of an example supervised learning method in accordance with the conventional groupings of FIG. 2A.

Supervised learning models receive input datasets accompanied with output metadata (referred to as "labeled data") and modify the model architecture's parameters (such as the biases and weights of a neural network, or the support vectors of an SVM) based upon this input data and metadata so as to better map subsequently received inputs to the desired output. For example, an SVM supervised classifier may operate as shown in FIG. 2C, receiving as training input a plurality of input feature vectors, represented by circles, in a feature space 210*a*, where the feature vectors are accompanied by output labels A, B, or C, e.g., as provided by the practitioner. In accordance with a supervised learning methodology, the SVM uses these label inputs to modify its parameters, such that when the SVM receives a new, previously unseen input 210*c* in the feature vector form of the feature space 210*a*, the SVM may output the desired classification "C" in its output. Thus, supervised learning methodologies may include, e.g., performing classification as in this example, performing a regression, etc.

Figure 2D:
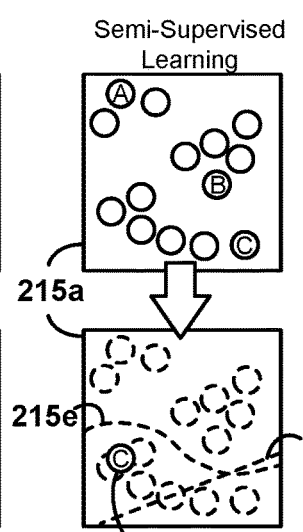
FIG. 2D is a schematic diagram depicting various operations of an example semi-supervised learning method in accordance with the conventional groupings of FIG. 2A.
Figure 2E:
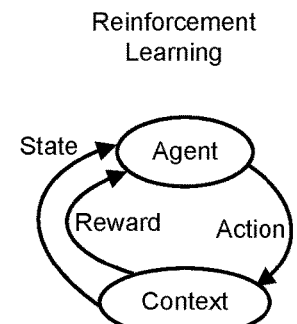
FIG. 2E is a schematic diagram depicting various operations of an example reinforcement learning method in accordance with the conventional division of FIG. 2A.

Semi-supervised learning methodologies inform their model's architecture's parameter adjustment based upon both labeled and unlabeled data. For example, a supervised neural network classifier may operate as shown in FIG. 2D, receiving some training input feature vectors in the feature space 215*a* labeled with a classification A, B, or C and some training input feature vectors without such labels (as depicted with circles lacking letters). Absent consideration of the unlabeled inputs, a naïve supervised classifier may distinguish between inputs in the B and C classes based upon a simple planar separation 215*d* in the feature space between the available labeled inputs. However, a semi-supervised classifier, by considering the unlabeled as well as the labeled input feature vectors, may employ a more nuanced separation 215*e*. Unlike the simple separation 215*d* the nuanced separation 215*e* may correctly classify a new input 215*c* as being in the C class. Thus, semi-supervised learning methods and architectures may include applications in both supervised and unsupervised learning wherein at least some of the available data is labeled.

Finally, the conventional groupings of FIG. 2A distinguish reinforcement learning methodologies as those wherein an agent, e.g., a robot or digital assistant, takes some action (e.g., moving a manipulator, making a suggestion to a user, etc.) which affects the agent's environmental context (e.g., object locations in the environment, the disposition of the user, etc.), precipitating a new environment state and some associated environment-based reward (e.g., a positive reward if environment objects are now closer to a goal state, a negative reward if the user is displeased, etc.). Thus, reinforcement learning may include, e.g., updating a digital assistant based upon a user's behavior and expressed preferences, an autonomous robot maneuvering through a factory, a computer playing chess, etc.

As mentioned, while many practitioners will recognize the conventional taxonomy of FIG. 2A, the groupings of FIG. 2A obscure machine learning's rich diversity, and may inadequately characterize machine learning architectures and techniques which fall in multiple of its groups or which fall entirely outside of those groups (e.g., random forests and neural networks may be used for supervised or for unsupervised learning tasks; similarly, some generative adversarial networks, while employing supervised classifiers, would not themselves easily fall within any one of the groupings of FIG. 2A). Accordingly, though reference may be made herein to various terms from FIG. 2A to facilitate the reader's understanding, this description should not be limited to the procrustean conventions of FIG. 2A. For example, FIG. 2F offers a more flexible machine learning taxonomy.

In particular, FIG. 1F approaches machine learning as comprising models 220a, model architectures 220b, methodologies 220e, methods 220d, and implementations 220c. At a high level, model architectures 220b may be seen as species of their respective genus models 220a (model A having possible architectures A1, A2, etc.; model B having possible architectures B1, B2, etc.). Models 220a refer to descriptions of mathematical structures amenable to implementation as machine learning architectures. For example, KNN, neural networks, SVMs, Bayesian Classifiers, Principal Component Analysis (PCA), etc., represented by the boxes "A", "B", "C", etc. are examples of models (ellipses in the figures indicate the existence of additional items). While models may specify general computational relations, e.g., that an SVM include a hyperplane, that a neural network have layers or neurons, etc., models may not specify an architecture's particular structure, such as the architecture's choice of hyperparameters and dataflow, for performing a specific task, e.g., that the SVM employ a Radial Basis Function (RBF) kernel, that a neural network be configured to receive inputs of dimension 256×256×3, etc. These structural features may, e.g., be chosen by the practitioner or result from a training or configuration process. Note that the universe of models 220a also includes combinations of its members as, for example, when creating an ensemble model (discussed below in relation to FIG. 3G) or when using a pipeline of models (discussed below in relation to FIG. 3H).

For clarity, one will appreciate that many architectures comprise both parameters and hyperparameters. An architecture's parameters refer to configuration values of the architecture, which may be adjusted based directly upon the receipt of input data (such as the adjustment of weights and biases of a neural network during training). Different architectures may have different choices of parameters and relations therebetween, but changes in the parameter's value, e.g., during training, would not be considered a change in architecture. In contrast, an architecture's hyperparameters refer to configuration values of the architecture which are not adjusted based directly upon the receipt of input data (e.g., the K number of neighbors in a KNN implementation, the learning rate in a neural network training implementation, the kernel type of an SVM, etc.). Accordingly, changing a hyperparameter would typically change an architecture. One will appreciate that some method operations, e.g., validation, discussed below, may adjust hyperparameters, and consequently the architecture type, during training. Consequently, some implementations may contemplate multiple architectures, though only some of them may be configured for use or used at a given moment.

In a similar manner to models and architectures, at a high level, methods 220d may be seen as species of their genus methodologies 220e (methodology I having methods I.1, I.2, etc.; methodology II having methods II.1, II.2, etc.). Methodologies 220e refer to algorithms amenable to adaptation as methods for performing tasks using one or more specific machine learning architectures, such as training the architecture, testing the architecture, validating the architecture, performing inference with the architecture, using multiple architectures in a Generative Adversarial Network (GAN), etc. For example, gradient descent is a methodology describing methods for training a neural network, ensemble learning is a methodology describing methods for training groups of architectures, etc. While methodologies may specify general algorithmic operations, e.g., that gradient descent take iterative steps along a cost or error surface, that ensemble learning consider the intermediate results of its architectures, etc., methods specify how a specific architecture should perform the methodology's algorithm, e.g., that the gradient descent employ iterative backpropagation on a neural network and stochastic optimization via Adam with specific hyperparameters, that the ensemble system comprise a collection of random forests applying AdaBoost with specific configuration values, that training data be organized into a specific number of folds, etc. One will appreciate that architectures and methods may themselves have sub-architecture and sub-methods, as when one augments an existing architecture or method with additional or modified functionality (e.g., a GAN architecture and GAN training method may be seen as comprising deep learning architectures and deep learning training methods). One will also appreciate that not all possible methodologies will apply to all possible models (e.g., suggesting that one perform gradient descent upon a PCA architecture, without further explanation, would seem nonsensical). One will appreciate that methods may include some actions by a practitioner or may be entirely automated.

As evidenced by the above examples, as one moves from models to architectures and from methodologies to methods, aspects of the architecture may appear in the method and aspects of the method in the architecture as some methods may only apply to certain architectures and certain architectures may only be amenable to certain methods. Appreciating this interplay, an implementation 220c is a combination of one or more architectures with one or more methods to form a machine learning system configured to perform one or more specified tasks, such as training, inference, generating new data with a GAN, etc. For clarity, an implementation's architecture need not be actively performing its method, but may simply be configured to perform a method (e.g., as when accompanying training control software is configured to pass an input through the architecture). Applying the method will result in performance of the task, such as training or inference. Thus, a hypothetical Implementation A (indicated by "Imp. A") depicted in FIG. 2F comprises a single architecture with a single method. This may correspond, e.g., to an SVM architecture configured to recognize objects in a 128×128 grayscale pixel image by using a hyperplane support vector separation method employing an RBF kernel in a space of 16,384 dimensions. The usage of an RBF kernel and the choice of feature vector input structure reflect both aspects of the choice of architecture and the choice of training and inference methods. Accordingly, one will appreciate that some descriptions of architecture structure may imply aspects of a corresponding method and vice versa. Hypothetical Implementation B (indicated by "Imp. B") may correspond, e.g., to a training method II.1 which may switch between architectures B1 and C1 based upon validation results, before an inference method III.3 is applied.

The close relationship between architectures and methods within implementations precipitates much of the ambiguity in FIG. 2A as the groups do not easily capture the close relation between methods and architectures in a given implementation. For example, very minor changes in a method or architecture may move a model implementation between the groups of FIG. 2A as when a practitioner trains a random forest with a first method incorporating labels (supervised) and then applies a second method with the trained architecture to detect clusters in unlabeled data (unsupervised) rather than perform inference on the data. Similarly, the groups of FIG. 2A may make it difficult to classify aggregate methods and architectures, e.g., as discussed below in relation to FIGS. 3F and 3G, which may apply techniques found in some, none, or all of the groups of FIG. 2A. Thus, the next sections discuss relations between various example model architectures and example methods with reference to FIGS. 3A-G and FIGS. 4A-J to facilitate clarity and reader recognition of the relations between architectures, methods, and implementations. One will appreciate that the discussed tasks are exemplary and reference therefore, e.g., to classification operations so as to facilitate understanding, should not be construed as suggesting that the implementation must be exclusively used for that purpose.

Figure 2F:
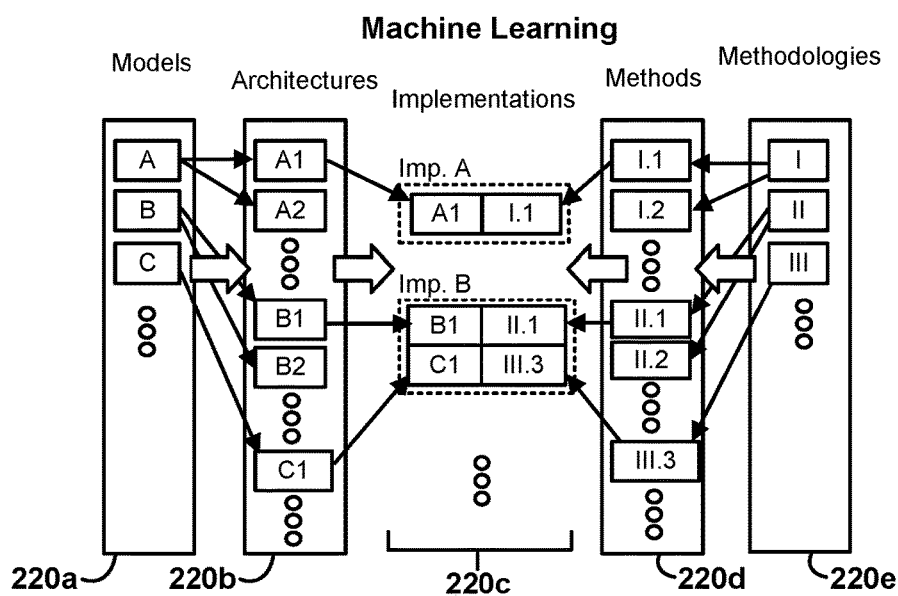
FIG. 2F is a schematic block diagram depicting relations between machine learning models, machine learning model architectures, machine learning methodologies, machine learning methods, and machine learning implementations.

For clarity, one will appreciate that the above explanation with respect to FIG. 2F is provided merely to facilitate reader comprehension and should accordingly not be construed in a limiting manner absent explicit language indicating as much. For example, naturally, one will appreciate that "methods" 220d are computer-implemented methods, but not all computer-implemented methods are methods in the sense of "methods" 220d. Computer-implemented methods may be logic without any machine learning functionality. Similarly, the term "methodologies" is not always used in the sense of "methodologies" 220e, but may refer to approaches without machine learning functionality. Similarly, while the terms "model" and "architecture" and "implementation" have been used above at 220a, 220b and 220c, the terms are not restricted to their distinctions here in FIG. 2F, absent language to that effect, and may be used to refer to the topology of machine learning components generally.

Machine Learning Foundational Concepts—Example Implementations

FIG. 3A is a schematic depiction of the operation of an example SVM machine learning model architecture. At a high level, given data from two classes (e.g. images of dogs and images of cats) as input features, represented by circles and triangles in the schematic of FIG. 3A, SVMs seek to determine a hyperplane separator 305a which maximizes the minimum distance from members of each class to the separator 305a. Here, the training feature vector 305f has the minimum distance 305e of all its peers to the separator 305a. Conversely, training feature vector 305g has the minimum distance 305h among all its peers to the separator 305a. The margin 305d formed between these two training feature vectors is thus the combination of distances 305h and 305e (reference lines 305b and 305c are provided for clarity) and, being the maximum minimum separation, identifies training feature vectors 305f and 305g as support vectors. While this example depicts a linear hyperplane separation, different SVM architectures accommodate different kernels (e.g., an RBF kernel), which may facilitate nonlinear hyperplane separation. The separator may be found during training and subsequent inference may be achieved by considering where a new input in the feature space falls relative to the separator. Similarly, while this example depicts feature vectors of two dimensions for clarity (in the two-dimensional plane of the paper), one will appreciate that may architectures will accept many more dimensions of features (e.g., a 128×128 pixel image may be input as 16,384 dimensions). While the hyperplane in this example only separates two classes, multi-class separation may be achieved in a variety of manners, e.g., using an ensemble architecture of SVM hyperplane separations in one-against-one, one-against-all, etc. configurations. Practitioners often use the LIBSVM™ and Scikit-learn™ libraries when implementing SVMs. One will appreciate that many different machine learning models, e.g., logistic regression classifiers, seek to identify separating hyperplanes.

In the above example SVM implementation, the practitioner determined the feature format as part of the architecture and method of the implementation. For some tasks, architectures and methods which process inputs to determine new or different feature forms themselves may be desirable. Some random forests implementations may, in effect, adjust the feature space representation in this manner. For example, FIG. 3B depicts at a high level, an example random forest model architecture comprising a plurality of decision trees 310b, each of which may receive all, or a portion, of input feature vector 310a at their root node. Though three trees are shown in this example architecture with maximum depths of three levels, one will appreciate that forest architectures with fewer or more trees and different levels (even between trees of the same forest) are possible. As each tree considers its portion of the input, it refers all or a portion of the input to a subsequent node, e.g., path 310f based upon whether the input portion does or does not satisfy the conditions associated with various nodes. For example, when considering an image, a single node in a tree may query whether a pixel value at position in the feature vector is above or below a certain threshold value. In addition to the threshold parameter some trees may include additional parameters and their leaves may include probabilities of correct classification. Each leaf of the tree may be associated with a tentative output value 310c for consideration by a voting mechanism 310d to produce a final output 310e, e.g., by taking a majority vote among the trees or by the probability weighted average of each tree's predictions. This architecture may lend itself to a variety of training methods, e.g., as different data subsets are trained on different trees.

Tree depth in a random forest, as well as different trees, may facilitate the random forest model's consideration of feature relations beyond direct comparisons of those in the initial input. For example, if the original features were pixel values, the trees may recognize relationships between groups of pixel values relevant to the task, such as relations between "nose" and "ear" pixels for cat/dog classification. Binary decision tree relations, however, may impose limits upon the ability to discern these "higher order" features.

Neural networks, as in the example architecture of FIG. 3C may also be able to infer higher order features and relations between the initial input vector. However, each node in the network may be associated with a variety of parameters and connections to other nodes, facilitating more complex decisions and intermediate feature generations than the conventional random forest tree's binary relations. As shown in FIG. 3C, a neural network architecture may comprise an input layer, at least one hidden layer, and an output layer. Each layer comprises a collection of neurons which may receive a number of inputs and provide an output value, also referred to as an activation value, the output values 315b of the final output layer serving as the network's final result. Similarly, the inputs 315a for the input layer may be received form the input data, rather than a previous neuron layer.

FIG. 3D depicts the input and output relations at the node 315c of FIG. 3C. Specifically, the output $n_{out}$ of node 315c may relate to its three (zero-base indexed) inputs as follows:

$$n_{out} = A\left(\sum_{i=0}^{2} w_i n_i + b\right) \quad (1)$$

where $w_i$ is the weight parameter on the output of $i^{th}$ node in the input layer, $n_i$ is the output value from the activation function of the $i^{th}$ node in the input layer, b is a bias value associated with node 315c, and A is the activation function associated with node 315c. Note that in this example the sum is over each of the three input layer node outputs and weight pairs and only a single bias value b is added. The activation function A may determine the node's output based upon the values of the weights, biases, and previous layer's nodes' values. During training, each of the weight and bias parameters may be adjusted depending upon the training method used. For example, many neural networks employ a methodology known as backward propagation, wherein, in some method forms, the weight and bias parameters are randomly initialized, a training input vector is passed through the network, and the difference between the network's output values and the desirable output values for that vector's metadata determined. The difference can then be used as the metric by which the network's parameters are adjusted, "propagating" the error as a correction throughout the network so that the network is more likely to produce the proper output for the input vector in a future encounter. While three nodes are shown in the input layer of the implementation of FIG. 3C for clarity, one will appreciate that there may be more or less nodes in different architectures (e.g., there may be 16,384 such nodes to receive pixel values in the above 128×128 grayscale image examples). Similarly, while each of the layers in this example architecture are shown as being fully connected with the next layer, one will appreciate that other architectures may not connect each of the nodes between layers in this manner. Neither will all the neural network architectures process data exclusively from left to right or consider only a single feature vector at a time. For example, Recurrent Neural Networks (RNNs) include classes of neural network methods and architectures which consider previous input instances when considering a current instance. Architectures may be further distinguished based upon the activation functions used at the various nodes, e.g.: logistic functions, rectified linear unit functions (ReLU), softplus functions, etc. Accordingly, there is considerable diversity between architectures.

One will recognize that many of the example machine learning implementations so far discussed in this overview are "discriminative" machine learning models and methodologies (SVMs, logistic regression classifiers, neural networks with nodes as in FIG. 3D, etc.). Generally, discriminative approaches assume a form which seeks to find the following probability of Equation 2:

$$P(output|input) \quad (2)$$

That is, these models and methodologies seek structures distinguishing classes (e.g., the SVM hyperplane) and estimate parameters associated with that structure (e.g., the support vectors determining the separating hyperplane) based upon the training data. One will appreciate, however, that not all models and methodologies discussed herein may assume this discriminative form, but may instead be one of multiple "generative" machine learning models and corresponding methodologies (e.g., a Naïve Bayes Classifier, a Hidden Markov Model, a Bayesian Network, etc.). These generative models instead assume a form which seeks to find the following probabilities of Equation 3:

$$P(output), P(input|output) \quad (3)$$

That is, these models and methodologies seek structures (e.g., a Bayesian Neural Network, with its initial parameters and prior) reflecting characteristic relations between inputs and outputs, estimate these parameters from the training data and then use Bayes rule to calculate the value of Equation 2. One will appreciate that performing these calculations directly is not always feasible, and so methods of numerical approximation may be employed in some of these generative models and methodologies.

One will appreciate that such generative approaches may be used mutatis mutandis herein to achieve results presented with discriminative implementations and vice versa. For example, FIG. 3E illustrates an example node 315d as may appear in a Bayesian Neural Network. Unlike the node 315c, which receives numerical values simply, one will appreciate that a node in a Bayesian Neural network, such as node 315d, may receive weighted probability distributions 315f, 315g, 315h (e.g., the parameters of such distributions) and may itself output a distribution 315e. Thus, one will recognize that while one may, e.g., determine a classification uncertainty in a discriminative model via various post-processing techniques (e.g., comparing outputs with iterative applications of dropout to a discriminative neural network), one may achieve similar uncertainty measures by employing a generative model outputting a probability distribution, e.g., by considering the variance of distribution 315e. Thus, just as reference to one specific machine learning implementation herein is not intended to exclude substitution with any similarly functioning implementation, neither is reference to a discriminative implementation herein to be construed as excluding substitution with a generative counterpart where applicable, or vice versa.

Returning to a general discussion of machine learning approaches, while FIG. 3C depicts an example neural network architecture with a single hidden layer, many neural network architectures may have more than one hidden layer. Some networks with many hidden layers have produced surprisingly effective results and the term "deep" learning has been applied to these models to reflect the large number of hidden layers. Herein, deep learning refers to architectures and methods employing at least one neural network architecture having more than one hidden layer.

FIG. 3F is a schematic depiction of the operation of an example deep learning model architecture. In this example, the architecture is configured to receive a two-dimensional input 320a, such as a grayscale image of a cat. When used for classification, as in this example, the architecture may generally be broken into two portions: a feature extraction portion comprising a succession of layer operations and a classification portion, which determines output values based upon relations between the extracted features.

Many different feature extraction layers are possible, e.g., convolutional layers, max-pooling layers, dropout layers, cropping layers, etc. and many of these layers are themselves susceptible to variation, e.g., two-dimensional convolutional layers, three-dimensional convolutional layers, convolutional layers with different activation functions, etc. as well as different methods and methodologies for the network's training, inference, etc. As illustrated, these layers may produce multiple intermediate values 320b-j of differing dimensions and these intermediate values may be processed along multiple pathways. For example, the original grayscale image 320a may be represented as a feature input tensor of dimensions 128×128×1 (e.g., a grayscale image of 128 pixel width and 128 pixel height) or as a feature input tensor of dimensions 128×128×3 (e.g., an RGB image of 128 pixel width and 128 pixel height). Multiple convolutions with different kernel functions at a first layer may precipitate multiple intermediate values 320b from this input. These intermediate values 320b may themselves be considered by two different layers to form two new intermediate values 320c and 320d along separate paths (though two paths are shown in this example, one will appreciate that many more paths, or a single path, are possible in different architectures). Additionally, data may be provided in multiple "channels" as when an image has red, green, and blue values for each pixel as, for example, with the "×3" dimension in the 128×128×3 feature tensor (for clarity, this input has three "tensor" dimensions, but 49,152 individual "feature" dimensions). Various architectures may operate on the channels individually or collectively in various layers. The ellipses in the figure indicate the presence of additional layers (e.g., some networks have hundreds of layers). As shown, the intermediate values may change in size and dimensions, e.g., following pooling, as in values 320e. In some networks, intermediate values may be considered at layers between paths as shown between intermediate values 320e, 320f, 320g, 320h. Eventually, a final set of feature values appear at intermediate collection 320i and 320j and are fed to a collection of one or more classification layers 320k and 320l, e.g., via flattened layers, a SoftMax layer, fully connected layers, etc. to produce output values 320m at output nodes of layer 320l. For example, if N classes are to be recognized, there may be N output nodes to reflect the probability of each class being the correct class (e.g., here the network is identifying one of three classes and indicates the class "cat" as being the most likely for the given input), though some architectures many have fewer or have many more outputs. Similarly, some architectures may accept additional inputs (e.g., some flood fill architectures utilize an evolving mask structure, which may be both received as an input in addition to the input feature data and produced in modified form as an output in addition to the classification output values; similarly, some recurrent neural networks may store values from one iteration to be inputted into a subsequent iteration alongside the other inputs), may include feedback loops, etc.

TensorFlow™, Caffe™, and Torch™, are examples of common software library frameworks for implementing deep neural networks, though many architectures may be created "from scratch" simply representing layers as operations upon matrices or tensors of values and data as values within such matrices or tensors. Examples of deep learning network architectures include VGG-19, ResNet, Inception, DenseNet, etc.

While example paradigmatic machine learning architectures have been discussed with respect to FIGS. 3A through 3F, there are many machine learning models and corresponding architectures formed by combining, modifying, or appending operations and structures to other architectures and techniques. For example, FIG. 3G is a schematic depiction of an ensemble machine learning architecture. Ensemble models include a wide variety of architectures, including, e.g., "meta-algorithm" models, which use a plurality of weak learning models to collectively form a stronger model, as in, e.g., AdaBoost. The random forest of FIG. 3A may be seen as another example of such an ensemble model, though a random forest may itself be an intermediate classifier in an ensemble model.

In the example of FIG. 3G, an initial input feature vector 325a may be input, in whole or in part, to a variety of model implementations 325b, which may be from the same or different models (e.g., SVMs, neural networks, random forests, etc.). The outputs from these models 325c may then be received by a "fusion" model architecture 325d to generate a final output 325e. The fusion model implementation 325d may itself be the same or different model type as one of implementations 325b. For example, in some systems fusion model implementation 325d may be a logistic regression classifier and models 325b may be neural networks.

Just as one will appreciate that ensemble model architectures may facilitate greater flexibility over the paradigmatic architectures of FIGS. 3A through 3F, one should appreciate that modifications, sometimes relatively slight, to an architecture or its method may facilitate novel behavior not readily lending itself to the conventional grouping of FIG. 2A. For example, PCA is generally described as an unsupervised learning method and corresponding architecture, as it discerns dimensionality-reduced feature representations of input data which lack labels. However, PCA has often been used with labeled inputs to facilitate classification in a supervised manner, as in the EigenFaces application described in M. Turk and A. Pentland, "Eigenfaces for Recognition", J. Cognitive Neuroscience, vol. 3, no. 1, 1991. FIG. 3H depicts an machine learning pipeline topology exemplary of such modifications. As in EigenFaces, one may determine a feature presentation using an unsupervised method at block 330a (e.g., determining the principal components using PCA for each group of facial images associated with one of several individuals). As an unsupervised method, the conventional grouping of FIG. 2A may not typically construe this PCA operation as "training." However, by converting the input data (e.g., facial images) to the new representation (the principal component feature space) at block 330b one may create a data structure suitable for the application of subsequent inference methods.

For example, at block 330c a new incoming feature vector (a new facial image) may be converted to the unsupervised form (e.g., the principal component feature space) and then a metric (e.g., the distance between each individual's facial image group principal components and the new vector's principal component representation) or other subsequent classifier (e.g., an SVM, etc.) applied at block 330d to classify the new input. Thus, a model architecture (e.g., PCA) not amenable to the methods of certain methodologies (e.g., metric based training and inference) may be made so amenable via method or architecture modifications, such as pipelining. Again, one will appreciate that this pipeline is but one example—the KNN unsupervised architecture and method of FIG. 2B may similarly be used for supervised classification by assigning a new inference input to the class of the group with the closest first moment in the feature space to the inference input. Thus, these pipelining approaches may be considered machine learning models herein, though they may not be conventionally referred to as such.

Some architectures may be used with training methods and some of these trained architectures may then be used with inference methods. However, one will appreciate that not all inference methods perform classification and not all trained models may be used for inference. Similarly, one will appreciate that not all inference methods require that a training method be previously applied to the architecture to process a new input for a given task (e.g., as when KNN produces classes from direct consideration of the input data). With regard to training methods, FIG. 4A is a schematic flow diagram depicting common operations in various training methods. Specifically, at block 405a, either the practitioner directly or the architecture may assemble the training data into one or more training input feature vectors. For example, the user may collect images of dogs and cats with metadata labels for a supervised learning method or unlabeled stock prices over time for unsupervised clustering. As discussed, the raw data may be converted to a feature vector via preprocessing or may be taken directly as features in its raw form.

At block 405b, the training method may adjust the architecture's parameters based upon the training data. For example, the weights and biases of a neural network may be updated via backpropagation, an SVM may select support vectors based on hyperplane calculations, etc. One will appreciate, as was discussed with respect to pipeline architectures in FIG. 3G, however, that not all model architectures may update parameters within the architecture itself during "training." For example, in Eigenfaces the determination of principal components for facial identity groups may be construed as the creation of a new parameter (a principal component feature space), rather than as the adjustment of an existing parameter (e.g., adjusting the weights and biases of a neural network architecture). Accordingly, herein, the Eigenfaces determination of principal components from the training images would still be construed as a training method.

FIG. 4B is a schematic flow diagram depicting various operations common to a variety of machine learning model inference methods. As mentioned not all architectures nor all methods may include inference functionality. Where an inference method is applicable, at block 410a the practitioner or the architecture may assemble the raw inference data, e.g., a new image to be classified, into an inference input feature vector, tensor, etc. (e.g., in the same feature input form as the training data). At block 410b, the system may apply the trained architecture to the input inference feature vector to determine an output, e.g., a classification, a regression result, etc.

When "training," some methods and some architectures may consider the input training feature data in whole, in a single pass, or iteratively. For example, decomposition via PCA may be implemented as a non-iterative matrix operation in some implementations. An SVM, depending upon its implementation, may be trained by a single iteration through the inputs. Finally, some neural network implementations may be trained by multiple iterations over the input vectors during gradient descent.

As regards iterative training methods, FIG. 4C is a schematic flow diagram depicting iterative training operations, e.g., as may occur in block 405b in some architectures and methods. A single iteration may apply the method in the flow diagram once, whereas an implementation performing multiple iterations may apply the method in the diagram multiple times. At block 415a, the architecture's parameters may be initialized to default values. For example, in some neural networks, the weights and biases may be initialized to random values. In some SVM architectures, e.g., in contrast, the operation of block 415a may not apply. As each of the training input feature vectors are considered at block 415b, the system may update the model's parameters at 415c. For example, an SVM training method may or may not select a new hyperplane as new input feature vectors are considered and determined to affect or not to affect support vector selection. Similarly, a neural network method may, e.g., update its weights and biases in accordance with backpropagation and gradient descent. When all the input feature vectors are considered, the model may be considered "trained" if the training method called for only a single iteration to be performed. Methods calling for multiple iterations may apply the operations of FIG. 4C again (naturally, eschewing again initializing at block 415a in favor of the parameter values determined in the previous iteration) and complete training when a condition has been met, e.g., an error rate between predicted labels and metadata labels is reduced below a threshold.

As mentioned, the wide variety of machine learning architectures and methods include those with explicit training and inference steps, as shown in FIG. 4E, and those without, as generalized in FIG. 4D. FIG. 4E depicts, e.g., a method training 425a a neural network architecture to recognize a newly received image at inference 425b, while FIG. 4D depicts, e.g., an implementation reducing data dimensions via PCA or performing KNN clustering, wherein the implementation 420b receives an input 420a and produces an output 420c. For clarity, one will appreciate that while some implementations may receive a data input and produce an output (e.g., an SVM architecture with an inference method), some implementations may only receive a data input (e.g., an SVM architecture with a training method), and some implementations may only produce an output without receiving a data input (e.g., a trained GAN architecture with a random generator method for producing new data instances).

The operations of FIGS. 4D and 4E may be further expanded in some methods. For example, some methods expand training as depicted in the schematic block diagram of FIG. 4F, wherein the training method further comprises various data subset operations. As shown in FIG. 4G, some training methods may divide the training data into a training data subset, 435a, a validation data subset 435b, and a test data subset 435c. When training the network at block 430a as shown in FIG. 4F, the training method may first iteratively adjust the network's parameters using, e.g., backpropagation based upon all or a portion of the training data subset 435a. However, at block 430b, the subset portion of the data reserved for validation 435b, may be used to assess the effectiveness of the training. Not all training methods and architectures are guaranteed to find optimal architecture parameter or configurations for a given task, e.g., they may become stuck in local minima, may employ inefficient learning step size hyperparameter, etc. Methods may validate a current hyperparameter configuration at block 430b with training data 435b different from the training data subset 435a anticipating such defects and adjust the architecture hyperparameters or parameters accordingly. In some methods, the method may iterate between training and validation as shown by the arrow 430f, using the validation feedback to continue training on the remainder of training data subset 435a, restarting training on all or portion of training data subset 435a, adjusting the architecture's hyperparameters or the architecture's topology (as when additional hidden layers may be added to a neural network in meta-learning), etc. Once the architecture has been trained, the method may assess the architecture's effectiveness by applying the architecture to all or a portion of the test data subsets 435c. The use of different data subsets for validation and testing may also help avoid overfitting, wherein the training method tailors the architecture's parameters too closely to the training data, mitigating more optimal generalization once the architecture encounters new inference inputs. If the test results are undesirable, the method may start training again with a different parameter configuration, an architecture with a different hyperparameter configuration, etc., as indicated by arrow 430e. Testing at block 430c may be used to confirm the effectiveness of the trained architecture. Once the model is trained, inference 430d may be performed on a newly received inference input. One will appreciate the existence of variations to this validation method, as when, e.g., a method performs a grid search of a space of possible hyperparameters to determine a most suitable architecture for a task.

Many architectures and methods may be modified to integrate with other architectures and methods. For example, some architectures successfully trained for one task may be more effectively trained for a similar task rather than beginning with, e.g., randomly initialized parameters. Methods and architecture employing parameters from a first architecture in a second architecture (in some instances, the architectures may be the same) are referred to as "transfer learning" methods and architectures. Given a pre-trained architecture 440a (e.g., a deep learning architecture trained to recognize birds in images), transfer learning methods may perform additional training with data from a new task domain (e.g., providing labeled data of images of cars to recognize cars in images) so that inference 440e may be performed in this new task domain. The transfer learning training method may or may not distinguish training 440b, validation 440c, and test 440d sub-methods and data subsets as described above, as well as the iterative operations 440f and 440g. One will appreciate that the pre-trained model 440a may be received as an entire trained architecture, or, e.g., as a list of the trained parameter values to be applied to a parallel instance of the same or similar architecture. In some transfer learning applications, some parameters of the pre-trained architecture may be "frozen" to prevent their adjustment during training, while other parameters are allowed to vary during training with data from the new domain. This approach may retain the general benefits of the architecture's original training, while tailoring the architecture to the new domain.

Combinations of architectures and methods may also be extended in time. For example, "online learning" methods anticipate application of an initial training method 445a to an architecture, the subsequent application of an inference method with that trained architecture 445b, as well as periodic updates 445c by applying another training method 445d, possibly the same method as method 445a, but typically to new training data inputs. Online learning methods may be useful, e.g., where a robot is deployed to a remote environment following the initial training method 445a where it may encounter additional data that may improve application of the inference method at 445b. For example, where several robots are deployed in this manner, as one robot encounters "true positive" recognition (e.g., new core samples with classifications validated by a geologist; new patient characteristics during a surgery validated by the operating surgeon), the robot may transmit that data and result as new training data inputs to its peer robots for use with the method 445d. A neural network may perform a backpropagation adjustment using the true positive data at training method 445d. Similarly, an SVM may consider whether the new data affects its support vector selection, precipitating adjustment of its hyperplane, at training method 445d. While online learning is frequently part of reinforcement learning, online learning may also appear in other methods, such as classification, regression, clustering, etc. Initial training methods may or may not include training 445e, validation 445f, and testing 445g sub-methods, and iterative adjustments 445k, 445l at training method 445a. Similarly, online training may or may not include training 445h, validation 445i, and testing sub-methods, 445j and iterative adjustments 445m and 445n, and if included, may be different from the sub-methods 445e, 445f, 445g and iterative adjustments 445k, 445l. Indeed, the subsets and ratios of the training data allocated for validation and testing may be different at each training method 445a and 445d.

As discussed above, many machine learning architectures and methods need not be used exclusively for any one task, such as training, clustering, inference, etc. FIG. 4J depicts one such example GAN architecture and method. In GAN architectures, a generator sub-architecture 450b may interact competitively with a discriminator sub-architecture 450e. For example, the generator sub-architecture 450b may be trained to produce, synthetic "fake" challenges 450c, such as synthetic portraits of non-existent individuals, in parallel with a discriminator sub-architecture 450e being trained to distinguish the "fake" challenge from real, true positive data 450d, e.g., genuine portraits of real people. Such methods can be used to generate, e.g., synthetic assets resembling real-world data, for use, e.g., as additional training data. Initially, the generator sub-architecture 450b may be initialized with random data 450a and parameter values, precipitating very unconvincing challenges 450c. The discriminator sub-architecture 450e may be initially trained with true positive data 450d and so may initially easily distinguish fake challenges 450c. With each training cycle, however, the generator's loss 450g may be used to improve the generator sub-architecture's 450b training and the discriminator's loss 450f may be used to improve the discriminator sub-architecture's 450e training. Such competitive training may ultimately produce synthetic challenges 450c very difficult to distinguish from true positive data 450d. For clarity, one will appreciate that an "adversarial" network in the context of a GAN refers to the competition of generators and discriminators described above, whereas an "adversarial" input instead refers an input specifically designed to effect a particular output in an implementation, possibly an output unintended by the implementation's designer.

Data Overview

FIG. 5A is a schematic illustration of surgical data as may be received at a processing system in some embodiments. Specifically, a processing system may receive raw data 510, such as video from a visualization tool 110b or 140d comprising a succession of individual frames over time 505. In some embodiments, the raw data 510 may include video and system data from multiple surgical operations 510a, 510b, 510c, or only a single surgical operation.

As mentioned, each surgical operation may include groups of actions, each group forming a discrete unit referred to herein as a task. For example, surgical operation 510b may include tasks 515a, 515b, 515c, and 515e (ellipses 515d indicating that there may be more intervening tasks). Note that some tasks may be repeated in an operation or their order may change. For example, task 515a may involve locating a segment of fascia, task 515b involves dissecting a first portion of the fascia, task 515c involves dissecting a second portion of the fascia, and task 515e involves cleaning and cauterizing regions of the fascia prior to closure.

Each of the tasks 515 may be associated with a corresponding set of frames 520a, 520b, 520c, and 520d and device datasets including operator kinematics data 525a, 525*b*, 525*c*, 525*d*, patient-side device data 530*a*, 530*b*, 530*c*, 530*d*, and system events data 535*a*, 535*b*, 535*c*, 535*d*. For example, for video acquired from visualization tool 140*d* in theater 100*b*, operator-side kinematics data 525 may include translation and rotation values for one or more hand-held input mechanisms 160*b* at surgeon console 155. Similarly, patient-side kinematics data 530 may include data from patient side cart 130, from sensors located on one or more tools 140*a-d*, 110*a*, rotation and translation data from arms 135*a*, 135*b*, 135*c*, and 135*d*, etc. System events data 535 may include data for parameters taking on discrete values, such as activation of one or more of pedals 160*c*, activation of a tool, activation of a system alarm, energy applications, button presses, camera movement, etc. In some situations, task data may include one or more of frame sets 520, operator-side kinematics 525, patient-side kinematics 530, and system events 535, rather than all four.

One will appreciate that while, for clarity and to facilitate comprehension, kinematics data is shown herein as a waveform and system data as successive state vectors, one will appreciate that some kinematics data may assume discrete values over time (e.g., an encoder measuring a continuous component position may be sampled at fixed intervals) and, conversely, some system values may assume continuous values over time (e.g., values may be interpolated, as when a parametric function may be fitted to individually sampled values of a temperature sensor).

In addition, while surgeries 510*a*, 510*b*, 510*c* and tasks 515*a*, 515*b*, 515*c* are shown here as being immediately adjacent so as to facilitate understanding, one will appreciate that there may be gaps between surgeries and tasks in real-world surgical video. Accordingly, some video and data may be unaffiliated with a task. In some embodiments, these non-task regions may themselves be denoted as tasks, e.g., "gap" tasks, wherein no "genuine" task occurs.

The discrete set of frames associated with a task may be determined by the task's start point and end point. Each start point and each endpoint may be itself determined by either a tool action or a tool-effected change of state in the body. Thus, data acquired between these two events may be associated with the task. For example, start and end point actions for task 515*b* may occur at timestamps associated with locations 550*a* and 550*b* respectively.

FIG. 5B is a table depicting example tasks with their corresponding start point and end points as may be used in conjunction with various disclosed embodiments. Specifically, data associated with the task "Mobilize Colon" is the data acquired between the time when a tool first interacts with the colon or surrounding tissue and the time when a tool last interacts with the colon or surrounding tissue. Thus any of frame sets 520, operator-side kinematics 525, patient-side kinematics 530, and system events 535 with timestamps between this start and end point are data associated with the task "Mobilize Colon". Similarly, data associated the task "Endopelvic Fascia Dissection" is the data acquired between the time when a tool first interacts with the endopelvic fascia (EPF) and the timestamp of the last interaction with the EPF after the prostate is defatted and separated. Data associated with the task "Apical Dissection" corresponds to the data acquired between the time when a tool first interacts with tissue at the prostate and ends when the prostate has been freed from all attachments to the patient's body. One will appreciate that task start and end times may be chosen to allow temporal overlap between tasks, or may be chosen to avoid such temporal overlaps. For example, in some embodiments, tasks may be "paused" as when a surgeon engaged in a first task transitions to a second task before completing the first task, completes the second task, then returns to and completes the first task. Accordingly, while start and end points may define task boundaries, one will appreciate that data may be annotated to reflect timestamps affiliated with more than one task.

Additional examples of tasks include a "2-Hand Suture", which involves completing 4 horizontal interrupted sutures using a two-handed technique (i.e., the start time is when the suturing needle first pierces tissue and the stop time is when the suturing needle exits tissue with only two-hand, e.g., no one-hand suturing actions, occurring in-between). A "Uterine Horn" task includes dissecting a broad ligament from the left and right uterine horns, as well as amputation of the uterine body (one will appreciate that some tasks have more than one condition or event determining their start or end time, as here, when the task starts when the dissection tool contacts either the uterine horns or uterine body and ends when both the uterine horns and body are disconnected from the patient). A "1-Hand Suture" task includes completing four vertical interrupted sutures using a one-handed technique (i.e., the start time is when the suturing needle first pierces tissue and the stop time is when the suturing needle exits tissue with only one-hand, e.g., no two-hand suturing actions occurring in-between). The task "Suspensory Ligaments" includes dissecting lateral leaflets of each suspensory ligament so as to expose ureter (i.e., the start time is when dissection of the first leaflet begins and the stop time is when dissection of the last leaflet completes). The task "Running Suture" includes executing a running suture with four bites (i.e., the start time is when the suturing needle first pierces tissue and the stop time is when the needle exits tissue after completing all four bites). As a final example, the task "Rectal Artery/Vein" includes dissecting and ligating a superior rectal artery and vein (i.e. the start time is when dissection begins upon either the artery or the vein and the stop time is when the surgeon ceases contact with the ligature following ligation).

Task Classification Model Topology

Figure 6:
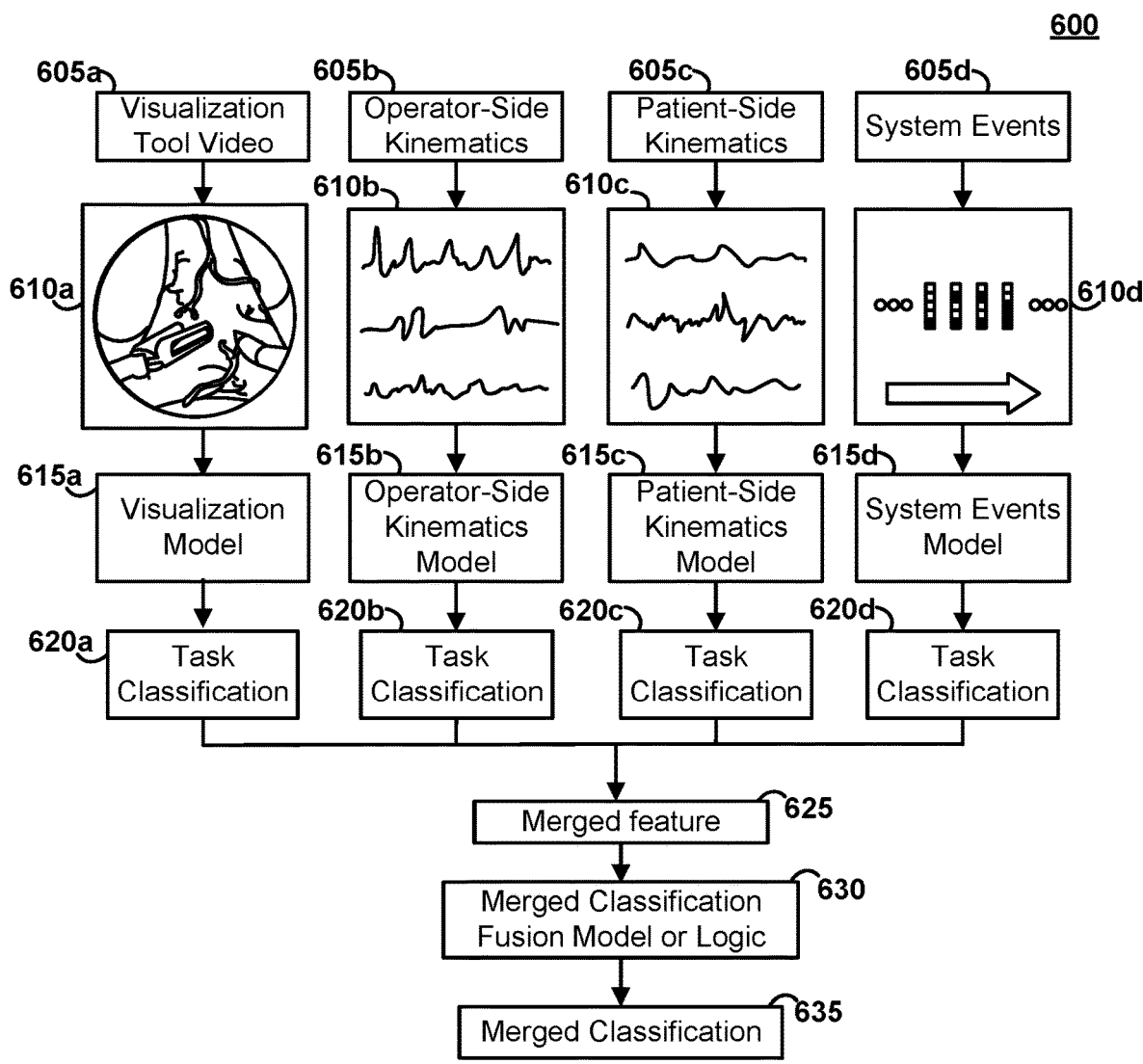
FIG. 6 is a schematic ensemble machine learning model topology diagram illustrating relations between model streams as may be implemented in some embodiments to determine a task classification for a set of data.

Given one or more of video, kinematics, and system data for a surgical procedure, one may wish to identify the tasks depicted, e.g., the tasks 515*a*, 515*b*, 515*c*, and 515*e*. FIG. 6 depicts an example ensemble machine learning model topology 600 which may be used to determine such a task classification when given a set of data, such as a set 510*b* of raw data 510 associated with a particular surgical procedure. For example, the system may receive visualization tool data 605*a*, such as one or more frames of video 610*a*, operator-side kinematic data 605*b*, such as subset of kinematic waveforms 610*b* within a time range of a time when frame of video 610*a* was acquired, patient-side kinematic data 605*c*, such as subset of kinematic waveforms 610*c* also within a time range of the time when frame of video 610*a* was acquired, and system event data 605*d*, such as a subset of state vectors 610*d* which may also be within a time range of the time when frame of video 610*a* was acquired.

Data of one or more of these types may be received at the processing system by a corresponding machine learning model, specifically, a visualization machine learning model 615*a*, an operator-side kinematics machine learning model 615*b*, a patient-side kinematics machine learning model 615*c*, and a system events machine learning model 615*d*. Each of the models may produce a respective task classification output 620*a*, 620*b*, 620*c*, and 620*d*. For example, where the models are selecting from among 50 task classification possibilities (one will appreciate that some values may correspond to "no task," "unknown," or "failure to detect" in some embodiments) each output 620*a*, 620*b*, 620c, and 620d may comprise a vector of 50 probability values for each of the possible task classifications (though this need not be the case, e.g., where the models output fewer than 50 values to facilitate a compressed representation as in an autoencoder).

The process system may then merge the outputs 620a, 620b, 620c, and 620d to form a merged vector 625. For example, where each output is a vector of 50 probability values, the vectors may be concatenated with one another to form a 200 value vector (or concatenated in the other dimension to form a matrix of 4×50 values). The processing system may then input this merged vector 625 to a merged classification fusion machine learning model or logic 630 (e.g., a logistic regression classifier, a random forest, software taking a majority vote of the previous models' predictions, etc.) to produce a final merged classification output 635 (which may, e.g., again be a vector of 50 probability values).

One will appreciate that the data 605a, 605b, 605c, and 605d may be down sampled from its original rate of capture. Such down sampling may precipitate a need for realignment, which may be performed on a per second basis after down sampling using the timestamps for each stream in some embodiments (such realignment may introduce an acceptable error on the order of tens of milliseconds). In some instances, the data from the different streams may not be in the same time range or at the same sampling frequency. For example, the video based model may use, e.g., 32 seconds of past data, the kinematics models may use 128 seconds of previous kinematics data, and the systems model may use 196 seconds of previous events data. One will appreciate that all of these inputs may be used to make a prediction for the final second under consideration, despite their individually disparate ranges. Thus, in some embodiments, video may be originally sampled at 60 frames per second, kinematics data at 50 samples per second, and events recorded upon occurrence (i.e., not sampled). In some embodiments, the video data may be down sampled to 1 frame per second (and resized to dimensions of 224×224×3, i.e., 224 pixel width and height for red, green, blue pixels) and the kinematics data may be down sampled to 4 samples per second.

As will be discussed herein, data may not always be available for all four of the streams, and the models 615a, 615b, 615c, and 615d and/or the model or logic 630 may be trained to accept "dummy" values in their stead, so that processing may remain resilient to such lacunae.

Task Classification Model Topology—Example Video Data Model

Figure 7A:
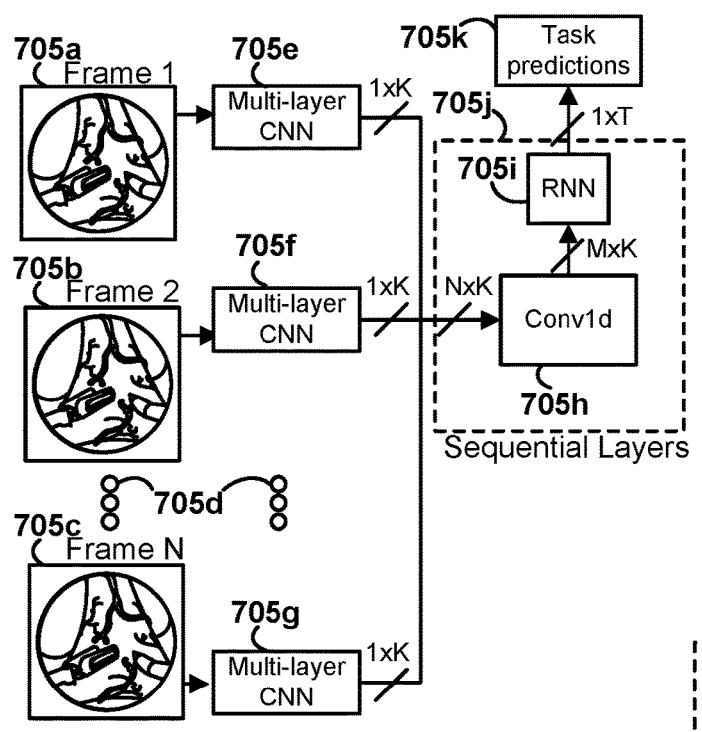
FIG. 7A is a schematic ensemble machine learning model topology diagram of an example machine learning model as may be used in the visualization machine learning model 615a of the machine learning model topology of FIG. 6 in some embodiments.

FIG. 7A is a schematic ensemble machine learning model topology diagram of an example machine learning model as may be used in the visualization machine learning model 615a of the machine learning model topology of FIG. 6 in some embodiments. Specifically, the model may receive a plurality of frames 705a, 705b, 705c at a plurality of multi-layer convolutional neural networks 705e, 705f, 705g (ellipses 705d indicating the potential for more intervening networks). For example, frame 705a may be of dimension 256×256×3 (red, green, and blue pixel values for an image of width and height 256 pixels each). Network 705e may process the frame 705a to produce a linear vector output of 1×K values (in some embodiments, K being the number of tasks to be predicted), which may be appended to one another. As there are N frames and N corresponding outputs from the multi-layer convolutional neural networks 705e, 705f, 705g, the resulting structure may have dimensions N×K. This N×K structure may then be considered by one or more layers configured to process a sequence of temporal inputs. For example, some embodiments may then submit this N×K structure directly one or more layers to consider the results in sequence, referred to herein as one or more Sequential Layers 705j. For example, the results may be submitted to a RNN 705i to produce 1×T task predictions 705k (e.g., a probability assigned to each of the possible task classifications via, e.g., a final dense and/or SoftMax layer). Some embodiments, may instead send the N×K structure to a one-dimensional convolutional neural network (Conv1D) 705h (which may again followed by a final dense and/or SoftMax layer to produce final prediction probabilities). Some embodiments, as shown here, may employ both an RNN 705i and Conv1D layer 705h. For example, a one-dimensional convolutional layer 705h may receive the N×K set of values to produce an M×K set of values, where M<N before providing these results to the RNN 705i (effectively allowing the RNN 705i to operate upon a smaller, down sampled version of the results). In some embodiments, one-dimensional convolutional layer 705h may include kernels of size of 3-8, with 96-480 filters, and 1-3 successive convolutional layers.

Figure 7C:
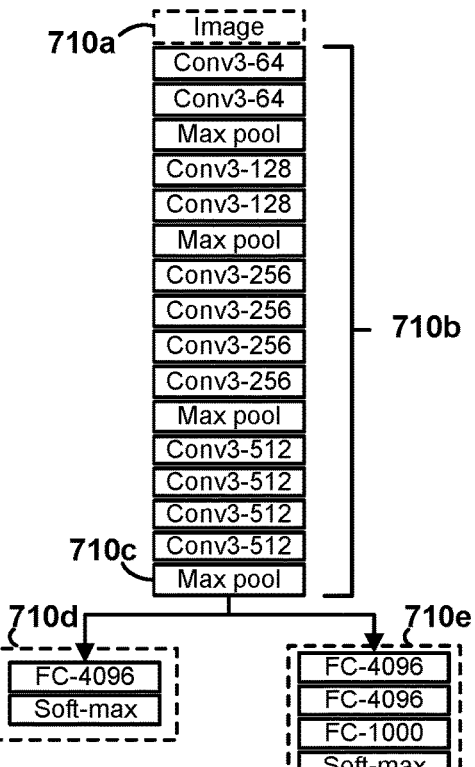
FIG. 7C is a schematic machine learning model topology diagram of an example Convolutional Neural Network (CNN) machine learning model as may be employed in the ensemble machine learning model of FIG. 7A in some embodiments.
Figure 7B:
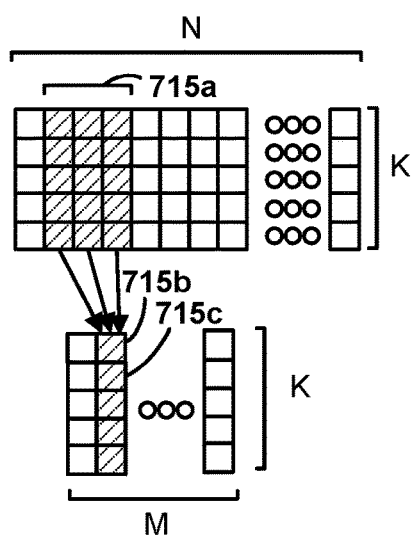
FIG. 7B is a schematic diagram illustrating the operation of a one-dimensional convolutional neural network as may be applied in some embodiments.

To facilitate clarity when discussing one dimensional convolution upon a two dimensional structure, FIG. 7B provides a schematic representation of the contemplated operation. Specifically, a convolutional kernel, or window 715a, shown here as encompassing three successive frames, may slide from left to right from the first of the N multi-layer CNN outputs. Thus, where the window is 3, M is simply N−3. Each of the newly created vectors may be determined by combining the vectors within the kernel window in accordance with the learned weights of the kernel. For example, the first value 715b in the new vector may be the weighted sum of the first of the K values in the vectors appearing in the window 715a in its illustrated position, the second value 715c in the new vector may be the weighted sum of the second of the K values in the vectors appearing in the window 715a in its illustrated position, etc.

Returning to FIG. 7A, one will appreciate that in some embodiments, K may be the same number as the number of T task classes to be predicted (i.e., K=T), as when the multi-layer CNNs 705e, 705f, 705g are themselves trained on the same training data to recognize tasks. However, in some embodiments K may not equal T, as when multi-layer convolutional neural networks 705e, 705f, 705g are trained end-to-end with the entire model. Enabling K>T may provide greater intermediate feature flexibility, while K<T may improve feature selection, analogous, e.g., to the operation of an autoencoder, PCA, etc.

One will appreciate that in an alternative embodiment, the processing system may input each of the frames 705a, 705b, 705c through a single multilayer CNN successively, rather than feeding the frames through a parallel set of CNNs simultaneously. Indeed, training a single multilayer CNN may be considerably more time and resource efficient, though parallel processing frames through multiple instances may provide time efficiencies for real-time recognition applications during inference. Similarly, an intermediate approach applying subsets of frames to one of several CNN instances less than the total number of frames (i.e., the number of multilayer CNNs is less than N) may be employed.

One will appreciate that a plurality of multi-layer CNN architectures may be suitable for use as multi-layer CNNs 705e, 705f, 705g so long as they provide adequate power for recognizing the tasks to be classified. For example, FIG. 7C is a schematic machine learning model topology diagram for a multi-layer CNN variation of the VGG19 architecture (again, one will appreciate corresponding variations mutatis mutandis for analogous architectures, such as ResNet 50, InceptionV3, etc.). One will appreciate that pretrained implementations of these models are readily available (e.g., the Keras™ library provides versions of VGG19 pre-trained upon the ImageNet library).

In some embodiments, one may create the one or more multi-layer CNNs shown in FIG. 7A by transfer learning from such a pretrained version of the model. Specifically, one may retain the pre-trained layers receiving the input image 710a until the final layer (here max pool layer 710c) prior to the model's fully connected output. Thus, each of the layers 710b may contain preexisting hyperparameters from the pretraining (one will recognize the layers correspond to the "feature extraction" layers discussed above with respect to FIG. 3F). These layers' hyperparameters may remain fixed, or "frozen", and not allowed to vary during future training directed specifically to the task recognition context. In contrast, the layers following max pool layer 710c (referred to as "head layers", corresponding to the "classification" layers of FIG. 3F) may either be retained and their weights allowed to vary or replaced with layers with weights allowed to vary. For example, some embodiments replace these layers with a layer structure 710d having a single fully connected layer followed by a SoftMax layer. Other embodiments may include multiple fully connected layers, as shown in the layer structure 710e, which may facilitate greater recognition power. Thus, when distinguishing a small number of very different tasks, a layer structure 710d may be more suitable than layer structure 710e. Conversely, when distinguishing many tasks with subtle differences, layer structure 710e may be more suitable than layer structure 710d. One will appreciate that in some embodiments, not every one of the multilayer CNNs 705e, 705f, 705g may have the same choice of head structure (variable choice of head structures may facilitate more robust recognition in some contexts).

Figure 7D:
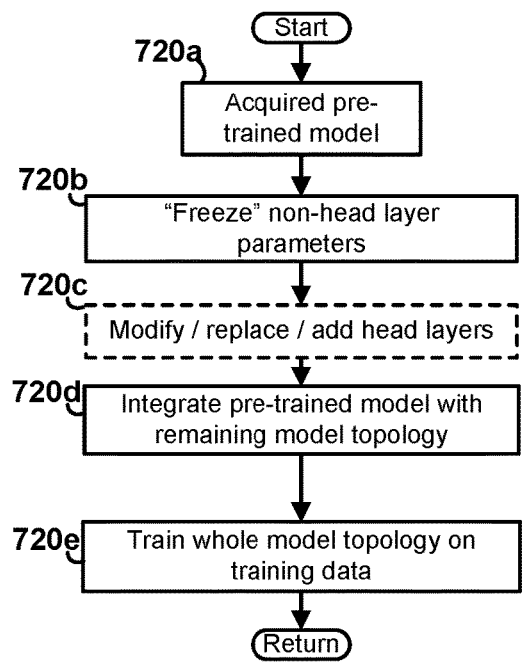
FIG. 7D is a flow diagram illustrating various operations in a process for training a model topology as depicted in FIG. 7C as may be implemented in some embodiments.

Thus, in some embodiments, one may train a transfer model such as the example shown in FIG. 7C with a process as shown in FIG. 7D. Specifically at block 720a the training system may acquire the pre-trained model (e.g., the VGG19 model discussed above pretrained upon the ImageNet dataset) and freeze the non-head parameters at block 720b, e.g., freeze the layers 710b. One will appreciate that block 720b may not reflect an affirmative step, but instead, e.g., simply a training configuration to ignore updating the weights of the frozen layers. At block 720c, one may modify or replace the preexisting non-frozen layers (e.g., replace with layer structure 710e or layer structure 710d), though some embodiments omit block 720c in favor of modifying the existing head layers from the original model.

As will be discussed in greater detail, one may now train the multi-layer CNN to recognize tasks directly or may integrate with the remainder of the model (e.g., train separately or when integrated with one-dimensional convolutional layer 705h and RNN 705i). Here, at block 720d the multi-layer CNN model is integrated with the remainder of the ensemble model and the ensemble trained as a whole at block 720e. Again, for clarity, one will appreciate that in some embodiments one may instead train the multilayer CNN models (i.e., adjust their non-frozen weights) upon annotated frame training data and then afterward train the CNN and/or RNN using the one or more trained multilayer CNN's outputs upon the same or different training data.

Task Classification Model Topology—Example Video Data Model—Recursive Networks

The RNN 705i may assume a form suitable for discerning patterns over time associated with each task from the refined features of the multi-layer CNNs 705e, 705f, 705g. In general, such an RNN 705i may be structured in accordance with the topology of FIG. 8A. Here, a network 805b of neurons may be arranged so as to receive an input 805c and produce an output 805a, as was discussed with respect to FIGS. 3C, 3D, and 3F. However, one or more of the outputs from network 805b may be fed back into the network 805b as recurrent hidden output(s) 805d, preserved over operation of the network 805b in time.

Figure 8A:
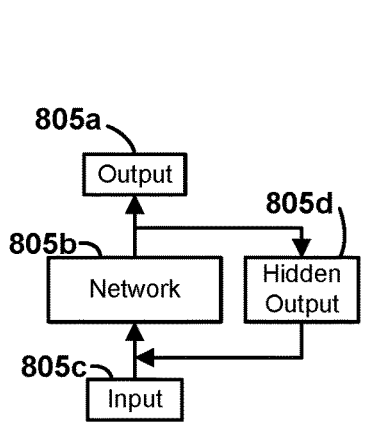
FIG. 8A is a schematic block diagram of a Recurrent Neural Network (RNN) model as may be employed in the ensemble machine learning model of FIG. 7A in some embodiments.
Figure 8C:
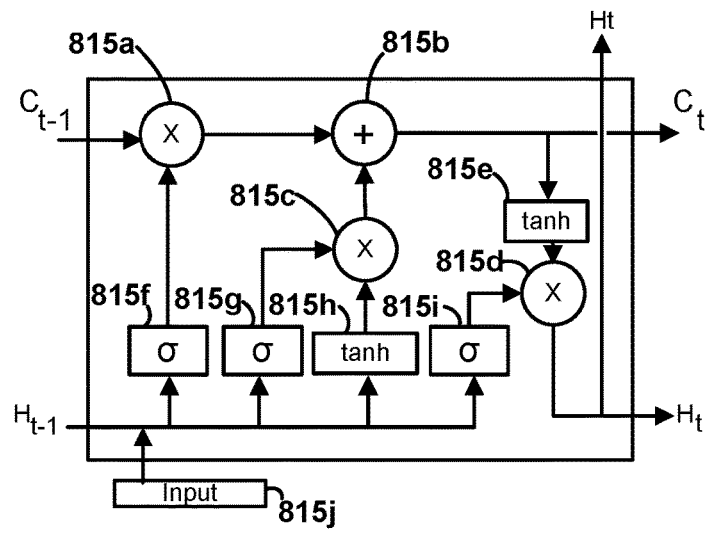
FIG. 8C is a schematic block diagram of a Long Short Term Memory (LSTM) cell as may be used in some embodiments.
Figure 8B:
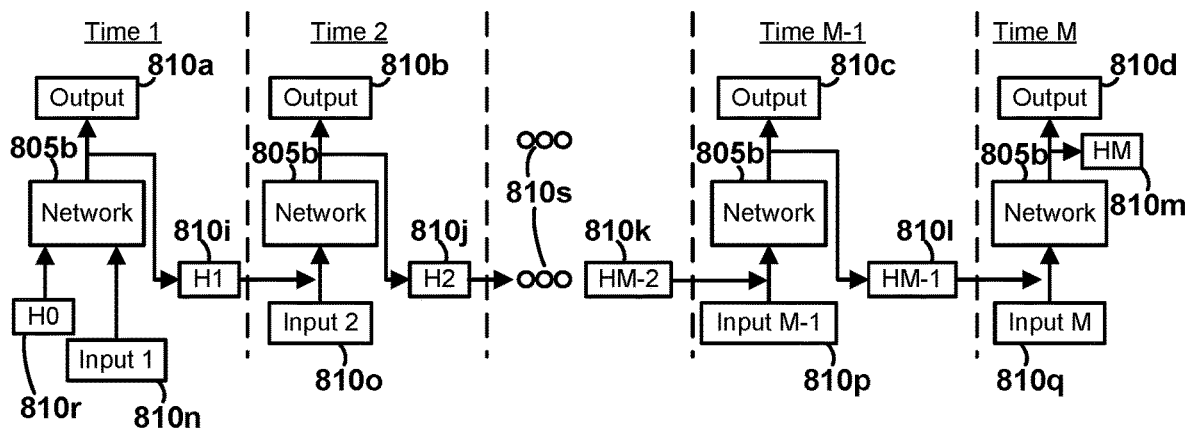
FIG. 8B is a schematic block diagram of the RNN model of FIG. 8A unrolled over time.

For example, FIG. 8B shows the same RNN as in FIG. 8A, but at each time step input during inference. At a first iteration at Time 1, applying network 805b upon a first input 810n may produce an output 810a as well as a first hidden recurrent output 810i. At a Time 2, the network may receive the first hidden recurrent output 810i as well as a new input 810o and produce a new output 810b. One will appreciate that during the first iteration at Time 1, the network may be fed an initial, default hidden recurrent value 810r.

In this manner, the output 810i and the subsequent generated output 810j may depend upon the previous inputs, e.g.:

$$h_t = f(h_{t-1}, x_t) \qquad (4)$$

As shown by ellipses 810s these iterations may continue for number of time steps until all the input data is considered. For example, one-dimensional convolutional layer 705h may produce an M×K output, and so over the course of M iterations, K-sized vectors of data may be considered at each iteration.

As the penultimate input 810p and final input 810q are submitted to the network 805b (as well as previously generated hidden output 810k), the system may produce corresponding penultimate output 810c, final output 810d, penultimate hidden output 810l and final (possibly unused) hidden output 810m. As the outputs preceding 810d were generated without consideration of all the data inputs, in some embodiments, they may be discarded and only the final output 810d taken as the RNN's prediction. However in other embodiments, each of the outputs may be considered, as when a fusion model is trained to recognize predictions from the iterative nature of the output. One will appreciate various approaches for such "many-to-one" RNN topologies (receiving many inputs but producing a single prediction output).

In some embodiments, the network 805b may include one or more Long Short Term Memory (LSTM) cells as indicated in FIG. 8C. In addition to hidden output H (corresponding to a portion of hidden output 805d), LSTM cells may output a cell state C (also corresponding to a portion of hidden output 805d), modified by multiplication operation 815a and addition operation 815b. Sigmoid neural layers 815f, 815g, and 815i and tan h layers 815e and 815h may also operate upon the input 815j and intermediate results, also using multiplication operations 815c and 815d as shown.

While an RNN layer (e.g., an LSTM layer) or Conv1D layer alone may suffice in some embodiments, some embodiments contemplate combining the two approaches.

Figure 8D:
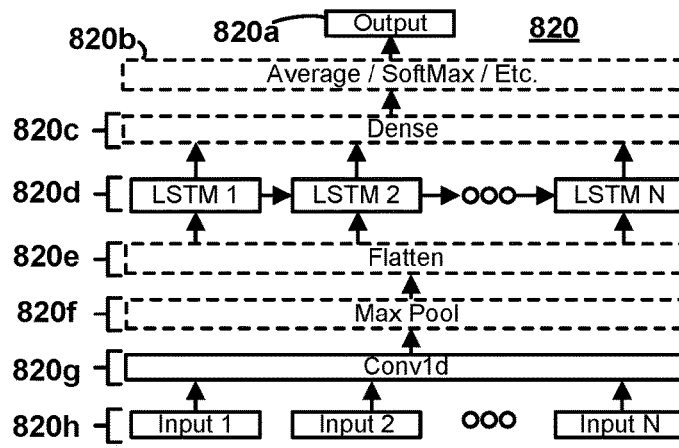
FIG. 8D is a schematic block diagram of a model topology variation combining convolution and LSTM layers as may be used in some embodiments.

For example, FIG. 8D illustrates model topology 820 combining RNN 705i and one-dimensional convolution 705h.

Here, an initial one dimensional convolution layer 820g may receive the N×K merged output (here, the concatenated inputs 820h) of the multi-layer CNNs 705e, 705f, 705g. In some embodiments, convolution layer 820g may be followed by a max pooling layer 820f, calculating the maximum value for intervals of the feature map, which may facilitate the selection of the most salient features. Similarly, in some embodiments, max pooling layer 820f may be followed by a flattening layer 820e. The result may then be supplied as in input to the LSTM layer 820d. In some embodiments, the topology may conclude with the LSTM layer 820d. Where the LSTM layer 820d is not already in a many-to-one configuration, however, subsequent layers, such as a following dense layer 820c and consolidation layer 820b, performing averaging, a SoftMax, etc., may be employed to produce output 820a. Again, as mentioned, one will appreciate that one or more of the dashed layers of FIG. 8D may be removed in various embodiments implementing a combined LSTM and Conv1D.

When using LSTM (whether alone or, e.g., as in FIG. 8D), some embodiments employ a single layer LSTM model with a number of layers ranging from 64 to 1024. Similarly, a dropout layer between the LSTM and final dense layer may also be used with the proportion of dropout ranging from 0-0.5 (again, whether alone or, e.g., as in FIG. 8D).

Task Classification Model Topology—Example Video Data Model—Training

Figure 9A:
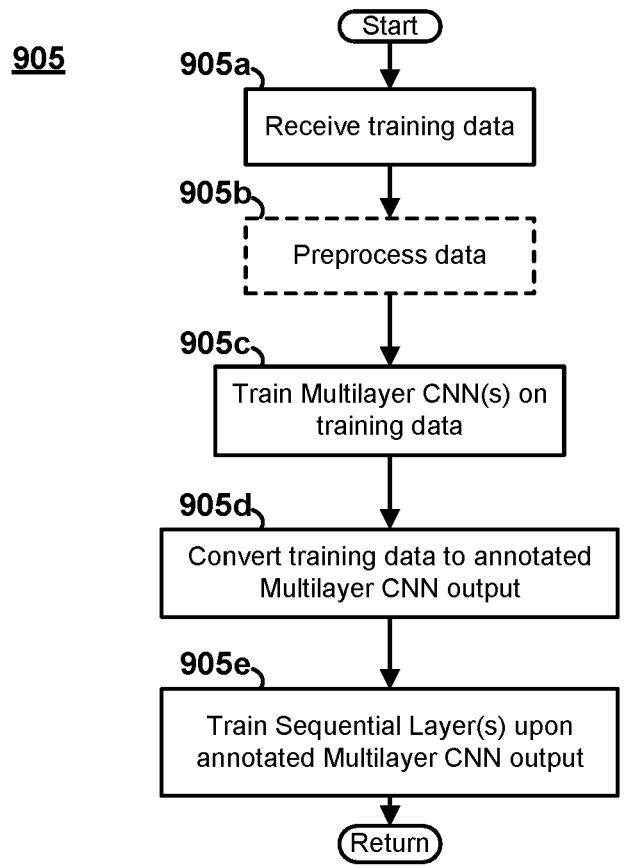
FIG. 9A is a flow diagram illustrating various operations in a process for training a video frame recognition model.

The video-based models described above may be trained in a plurality of manners. For example, FIG. 9A illustrates various operations in a training process (performed, e.g., by a training system, human trainer, meta-learning system, etc.) which considers the one or more multilayer CNNs 705e, 705f, 705g separately from the one-dimensional convolutional layer 705h and RNN 705i. Specifically, at block 905a, the training system may receive the training data, e.g., video data whose frames have been annotated with the corresponding tasks. At block 905b, this data may be processed to a form suitable for performing training. For example, underrepresented tasks may be synthetically up sampled, via algorithms such as the Synthetic Minority Oversampling Technique (SMOTE) (e.g., using the Imblearn™ library function imblearn.over_sampling.SMOTE), though this may not be necessary if the original training data is adequately distributed (rather than apply up sampling to all the data, such up sampling may only be performed in folds of training found to have underrepresented classes). Block 905b may also include such operations as selecting the number of fully connected layers, e.g., groups 710d or 710e based upon the number of task classifications to be distinguished (as well as the desired variety of configurations of desired multilayer CNNs). Where the model is to be trained via transfer learning (e.g., as described above with respect to FIG. 7B), preprocessing at block 905b may involve setting the frozen and non-frozen weights of the model.

In contrast to block 720e of FIG. 7D, which trained the model within the entire ensemble, in the example process 905, at block 905c, the system may train the one or more multilayer CNNs individually (e.g., to recognize tasks). Naturally, pretrained models may still be used via transfer learning as described above at block 905c. Once trained, at block 905d, the one or more multilayer CNNs may convert the training data to their respective prediction outputs. These prediction results may then be used to train the one or more Sequential Layers 705j, e.g., the Conv1d and/or RNN structure (e.g., the structure of FIG. 8D) at block 905e. One will appreciate that methods such as Backpropagation Through Time (BPTT) may allow a temporal RNN structure to be trained via normal backpropagation and stochastic gradient descent approaches with the one dimensional and other backward propagated trained layers. Thus, in some embodiments the RNN may be an LSTM layer loaded with random weights, the learning rate for a stochastic gradient descent optimizer may be variable, but generally 0.0005, and the LSTM may be evaluated after each epoch upon a validation portion of the training data. Training may conclude when validation accuracy ceases to improve above a threshold for successive iterations.

Figure 9B:
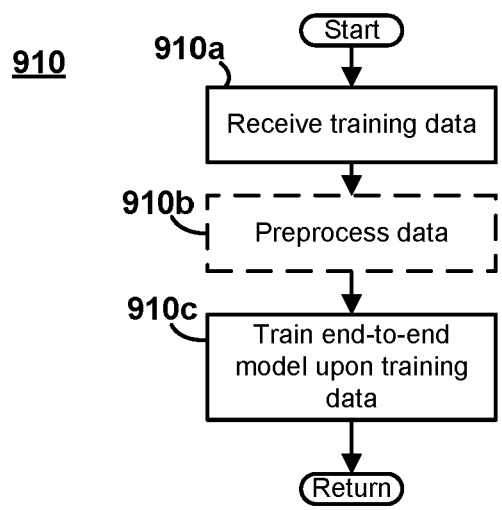
FIG. 9B is a flow diagram illustrating various operations in a process for training a video frame recognition model.

In contrast to the approach of FIG. 9A, some embodiments may instead train the ensemble model from "end-to-end" process 910 as shown in FIG. 9B (e.g., in agreement with the example of FIG. 7D). That is, after receiving the training data at block 910a and preprocessing the data as before at block 910b, the entire ensemble model of FIG. 8B may be trained as a group at block 910c. While the model length in this approach may risk a vanishing gradient, such training may be suitable where the output of the one or more multilayer CNNs is more or less than the number of task classifications. This may be useful, e.g., where the ensemble model is to behave like an autoencoder (the multilayer CNN outputs less than the number of classes), identifying a most salient set of features from each image for consideration by the one-dimensional convolutional layer and RNN models.

Task Classification Model Topology—Example Kinematics Data Model

Figure 10A:
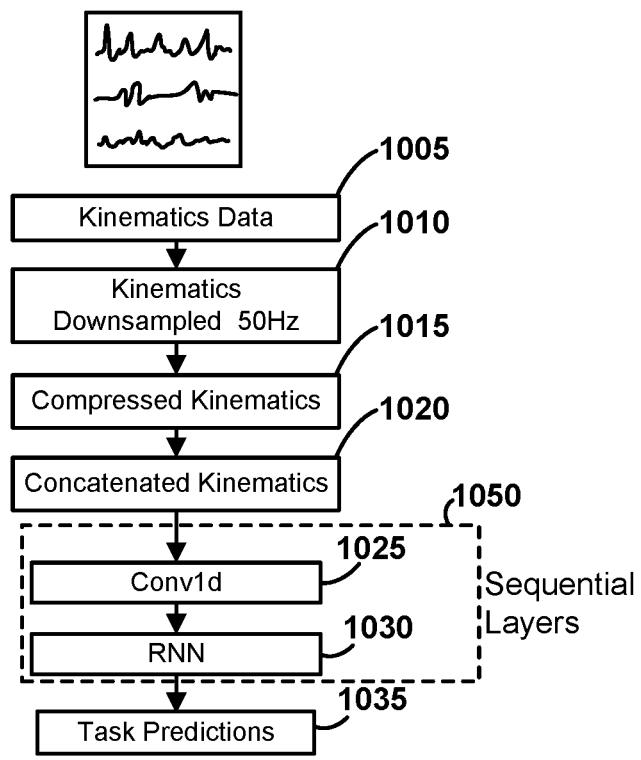
FIG. 10A is a schematic machine learning model topology diagram of an example machine learning model as may be used in the operator-side kinematics machine learning model 615b or patient-side kinematics machine learning model 615c of the machine learning model topology of FIG. 6 in some embodiments.

A FIG. 10A is a schematic ensemble machine learning model topology diagram of an example machine learning model as may be used in the operator-side kinematics machine learning model 615b or patient-side kinematics machine learning model 615c of the machine learning model topology of FIG. 6 in some embodiments. Specifically, a processing system may receive the raw kinematics data 1005 and down sample the data 1010 to produce compressed kinematics data 1015 which the processing system may then concatenate to produce concatenated kinematics data 1020. Again, raw kinematics data 1005 may be a timeseries of multiple system sensor components sampled, e.g., at 50 samples per second. Thus, the values may include, e.g., robot joint angular positions, robot joints relative translations, toll position in three dimensional space related to the camera-centered reference frame, etc. Down sampling the data 1010 may also include dimensionality reduction by applying PCA, e.g., to normalize the data. In some embodiments, the processing system may whiten the data such that the standard deviation for all the data is forced to be one. In some embodiments, the PCA algorithm may be the Incremental PCA algorithm (e.g., using the Scikit-learn™ library sklearn.decomposition.IncrementalPCA function) used to convert the data to a lower dimensional representation, e.g., 64 or 96 dimensions. In some embodiments, however, down sampling of the kinematics data can be achieved by instead under sampling existing datapoints in time (e.g., sampling every other available point). In still other embodiments, the two approaches may be combined, e.g., applying PCA and under sampling the data.

The processing system may then provide the concatenated kinematics data 1020 (e.g., for each time point, a concatenated set of values from each of the kinematics data sources) to one or more Sequential Layers 1050, which may be structured per one of the approaches described above with respect to Sequential Layers 705*j* (including the description with respect to FIG. 8D). For example, one or both of a Conv1d layer 1025 and RNN layer 1030 (such as an LSTM layer) may be used to produce the task identification output 1035. In some embodiments, only one dimensional CNN model 1025 may be used and RNN model 1030 removed for kinematics, as this was found to sometimes provide adequate results, particularly where the kinematics data was to be considered in combination with system or visualization tool data.

Conversely, in those embodiments where RNN model 1030 is retained and includes an LSTM layer, some embodiments may employ a bidirectional LSTM with 32 to 1024 units. Such an architecture may be suited to situations where task recognition is performed without system or visualization tool data or where such data is expected to be regularly absent.

Task Classification Model Topology—Example Kinematics Data Model—Training

Figure 10B:
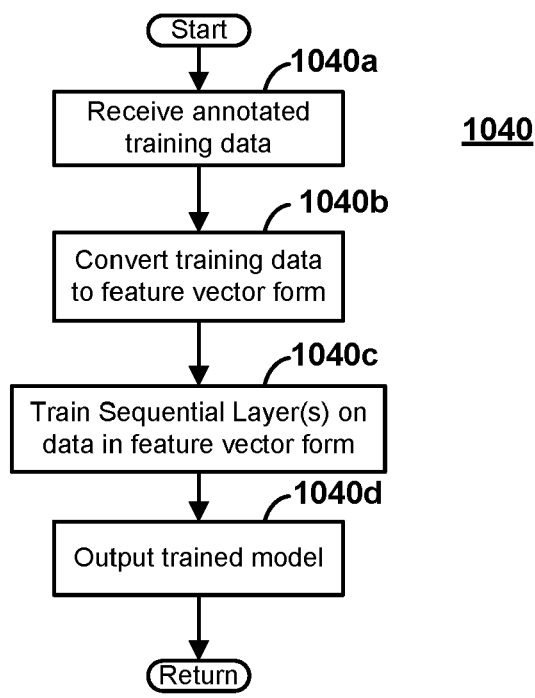
FIG. 10B is a flow diagram illustrating various operations in a process for training the model of FIG. 10A as may be applied in some embodiments.

FIG. 10B is a flow diagram illustrating various operations in a process 1040 for training the model of FIG. 10A as may be applied in some embodiments. Specifically, at block 1040*a* the system may receive the annotated training data (e.g., one or more tool positions over time, operator input positions over time, etc.). This data may be converted to feature vector form at block 1040*b* in accordance with operations 1010, 1015, 1020 described above. At block 1040*c*, the one or more Sequential Layers 1050 may be trained with these annotated feature vectors to produce the trained model at block 1040*d*.

Task Classification Model Topology—Example System Events Data Model

Figure 11A:
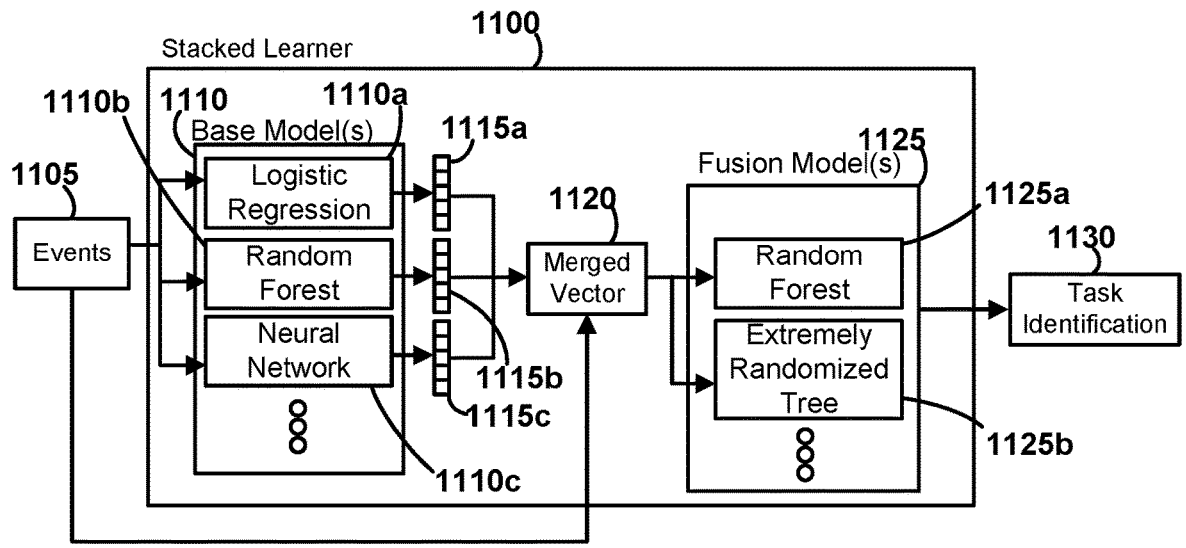
FIG. 11A is a schematic machine learning model topology diagram of a machine learning model as may be used in the event classification model 615d of the machine learning model topology of FIG. 6 in some embodiments.

Unlike kinematics data, which may often be regularly sampled over time at frequent intervals, many events may occur at single instances in time or over irregular intervals. Accordingly, system event recognition may benefit from topologies different from those previously described. For example, FIG. 11A is a schematic machine learning model topology diagram of a machine learning model as may be used in the system event classification model 615*d* of the machine learning model topology of FIG. 6 in some embodiments.

Specifically, system events machine learning model 615*d* may assume the form of a stacked ensemble learning model 1100 in some embodiments. A processing system may provide system events data 1105 to one or more base models 1110. In some embodiments, the base models may include a logistic regression model 1110*a*, a random forest model 1110*b*, and a neural network model 1110*c* (though more or fewer models than these may be considered in some embodiments).

Base models 1110 may produce a plurality of classification outputs 1115*a*, 1115*b*, and 1115*c* (e.g., vectors, as shown, of probability values for the tasks under consideration). In some embodiments, each of outputs 1115*a*, 1115*b*, and 1115*c* is the size of the number of potential task classifications, though as discussed previously, this need not be the case in other embodiments (e.g. those seeking to perform feature reduction analogous to an autoencoder). The processing system may then concatenate the outputs 1115*a*, 1115*b*, and 1115*c* to form a merged vector 1120.

The processing system may then provide the merged vector 1120 to one or more fusion models 1125. While an ensemble of models may be used for the fusion model, as may be done for the base models, in many embodiments a single fusion model which is either a random forest 1125*a* or an extremely randomized tree 1125*b* (or, as shown here, both in some embodiments), may be used in combination with the ensemble of base models to produce good results.

Outputs from the one or more fusion models 1125 may then be used to determine a final task identification 1130 (which may be used as task classification output 620*d* in some embodiments). One will appreciate that where there is more than one fusion model 1125, the final task identification 1130 may be selected using accompanying logic (.g., a majority vote of each fusion model's result).

For clarity, one will appreciate that the fusion model may be implemented with the Scikit-learn™ library using the function calls shown in either code line listing C1 or C2:

```
RandomForestClassifier(n_estimators=200,
    class_weight='balanced')                    (C1)

ExtraTreesClassifier(n_estimators=200,
    class_weight='balanced')                    (C2)
```

Similarly, the base models may be implemented with one or more of the calls shown in code line listings C3 though C7:

```
LogisticRegression(solver='lbfgs',
    multi_class='multinomial',max_iter=1000,
    class_weight='balanced')                    (C3)

KNeighborsClassifier(n_neighbors=10)            (C4)

MLPClassifier(hidden_layer_sizes=(100,50),
    max_iter=512,alpha=1e-3,solver='adam',
    activation='relu')                          (C5)

RandomForestClassifier(n_estimators=200,
    class_weight='balanced')                    (C6)

ExtraTreesClassifier(n_estimators=200,
    class_weight='balanced')                    (C7)
```

That is, regarding lines C6 and C7, separate instances of the same model topologies used for the fusion model may be also appear among the base models.

Figure 11B:
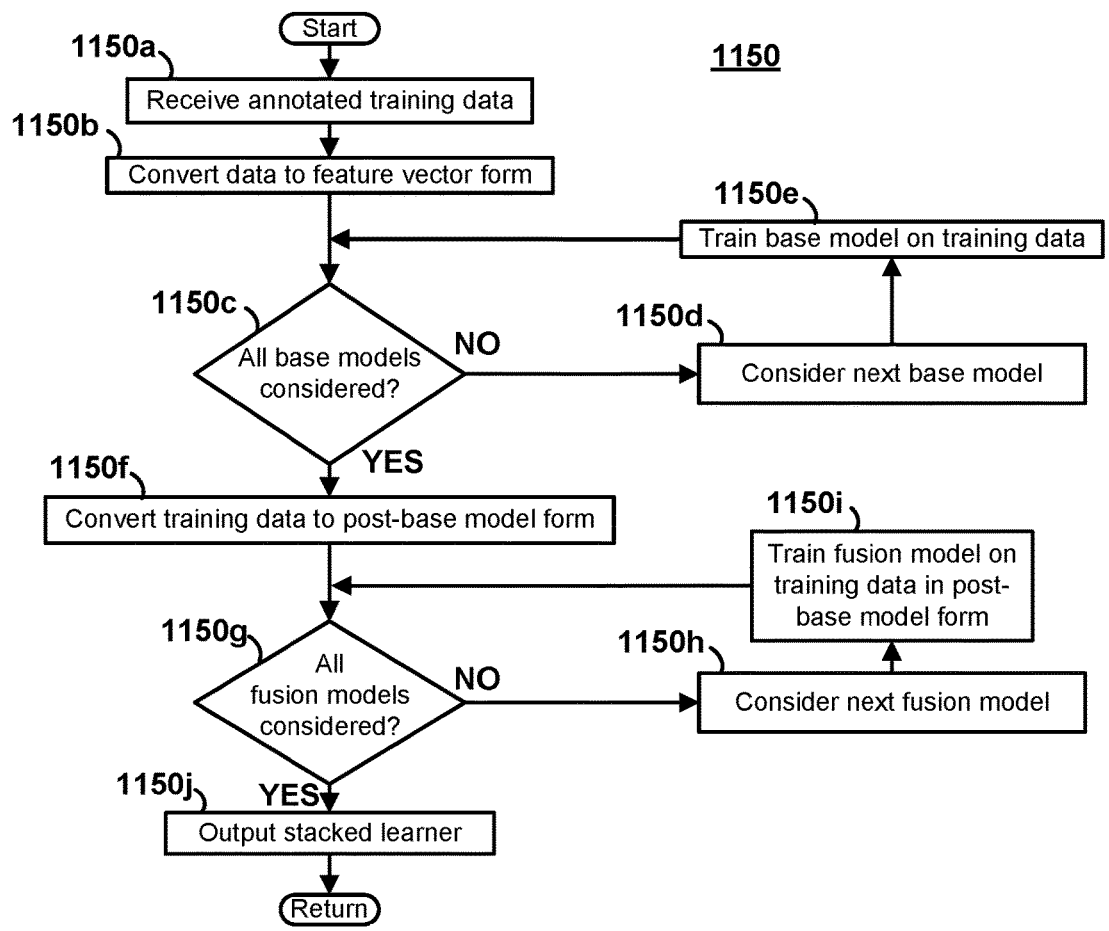
FIG. 11B is a flow diagram illustrating various operations in a process for training the model of FIG. 11A as may be applied in some embodiments.

Task Classification Model Topology—Example System Events Data Model—Training FIG. 11B is a flow diagram illustrating various operations in a process 1150 for training the model of FIG. 11A as may be applied in some embodiments. At block 1150*a*, the training system may receive the annotated system event training data and may convert this data to feature vectors at block 1150*b*. While one could use these features to train the model in an "end-to-end" form as discussed in FIG. 9B with respect to the visual model in some embodiments, here, the base and fusion models are trained separately. Specifically, at blocks 1150*c* and 1150*d* the training system may iterate through the base models and train them at block 1150*e* based upon the feature vectors. Once the based models are trained, the training feature vectors may be converted to their counterpart outputs from the base models at block 1150*f*. With the original training data annotations, the data in this form may likewise be used to train the fusion model(s) at blocks 1150*g*, 1150*h*, and 1150*i*. Following the training of the fusion model(s), the system may produce the finalized stack learner at block 1150*j* for future inference.

Example System and Event Data Generation

Both kinematics data 1005 and events data 1105 may have been reformatted from raw sensor outputs. In some situations, the kinematics data may appear in a readily distinguishable form from the events data, as when the kinematics data is provided as a time series of encoder sensor values. In some situations, however, it may be desirable to infer events and kinematics behavior from the raw system output.

Figures 12A, 12B:
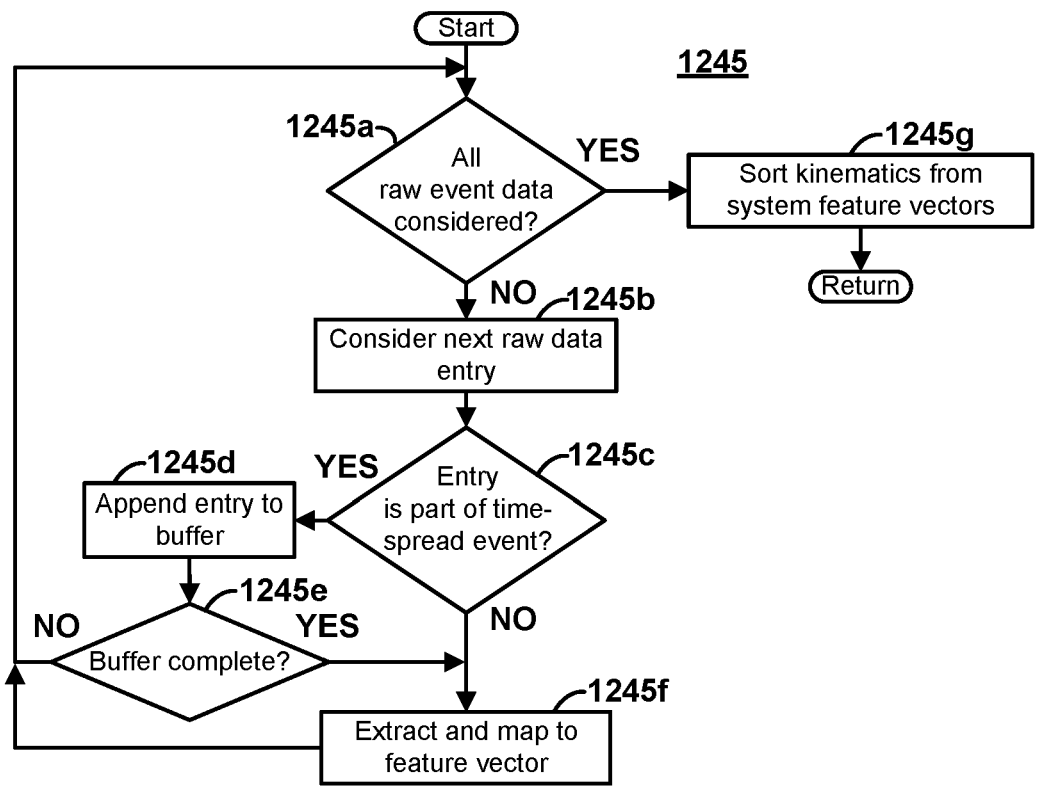
FIG. 12A is an example text listing of JSON excerpts depicted in various portions of raw surgical data as may be processed in some embodiments.
FIG. 12B is a flow diagram illustrating various operations in a process for converting raw data, such as the data depicted in FIG. 12A, to a feature vector form.

For example FIG. 12A is an example text listing of JSON excerpts from sensor data on a robotic system. This data may, e.g., be converted to a Numpy™ array in accordance with the process of FIG. 12B for processing by the system of FIG. 10A and FIG. 11A. In this example, the robotics system may output an array of data entries, each entry having a variety of attributes. A "recorded timestamp" attribute as shown in line 1 may indicate the time at which the data was acquired relative to a system clock. Portions of the data may be encrypted to satisfy privacy and regulatory obligations and the contents of the entry may require decryption at indicated by "decoded_msg_dict" at line 3. A header at line 4 in the decoded data may include a plurality or parameters providing metadata regarding the event. The decoded data may also include attributes specific to a tool, as indicated by "tool data" at line (10), providing the name (line 12) and device specifics (e.g., the serial number at line 11). An "event_entry" parameter may then indicate the data precipitating the entry's creation. Here, the tool has moved offscreen, as indicated by the event name at line 13 and id at line 17. Other parameters, such as message type (line 18) may help determine context for the event (e.g., the tool appears offscreen in response to camera movement rather than being removed from the patient). Some parameters, such as history buffer (line 16), may indicate the entry's relation to other entries.

One will appreciate that system data parameters need not be binary, as when a tool's position is represented by an array of float values over time. This JSON may be parsed to create a binary Numpy™ array feature vector for consumption by the respective models. For example, FIG. 12B is a flow diagram illustrating various operations in a process 1245 for converting raw data, such as the data depicted in FIG. 12A, to a feature vector form. At block 1245*a*, the conversion system may consider whether all the event data (e.g., the JSON entries) have been considered, and if not, consider the next entry at block 1245*b*.

Some entries may be recognized as being representative of a portion of a larger kinematic operation or system event. For example, the JSON may not include an "energy saturation" event, but consideration of a succession of "energy application" events in the JSON may allow one to infer when such an event occurs. Thus, where the event under consideration is believed to be such a partial indication of an event at block 1245*c*, the system may append the entry to a buffer for later consideration at block 1245*d*. Once the buffer is complete at block 1245*e* (e.g., enough data is collected to infer the complete time-spread event), the system may convert the buffered data to an appropriate feature vector item at block 1245*f* for consideration by the machine learning models (either for training or during inference). For example, a plurality of stored energy application events in the buffer may be reviewed, and if they occur close enough in time to saturate a component, then the system may generate a saturation feature at block 1245*f* timestamped at the time the system determined the saturation to occur.

Once all the JSON entries have been considered, the system may distinguish between feature vectors to be used for kinematics model (e.g., the model of FIG. 10A) and the system events model (e.g. model of FIG. 11A) at block 1245*g*. For example, an "arm swap" system event may occur when the operator reassigns a handheld input from one robotic arm to another. Raw JSON entries for each arm's movement may be converted directly to kinematics data values. However, the "arm swap" system event may need to be inferred by recognizing that each arm can be associated with the same input, that one arm's static/active kinematic values complement those of the other arm, and a time where the static/active relation becomes inverted (i.e., the time where the swap event occurs). This will accordingly be a "system event" feature vector for use with the system event model. Thus, JSON entries, and events derived therefrom, associated with kinematics or system data may be mapped to their proper feature vector form and provided to the appropriate corresponding machine learning model.

Example Fusion Model

Figure 13A:
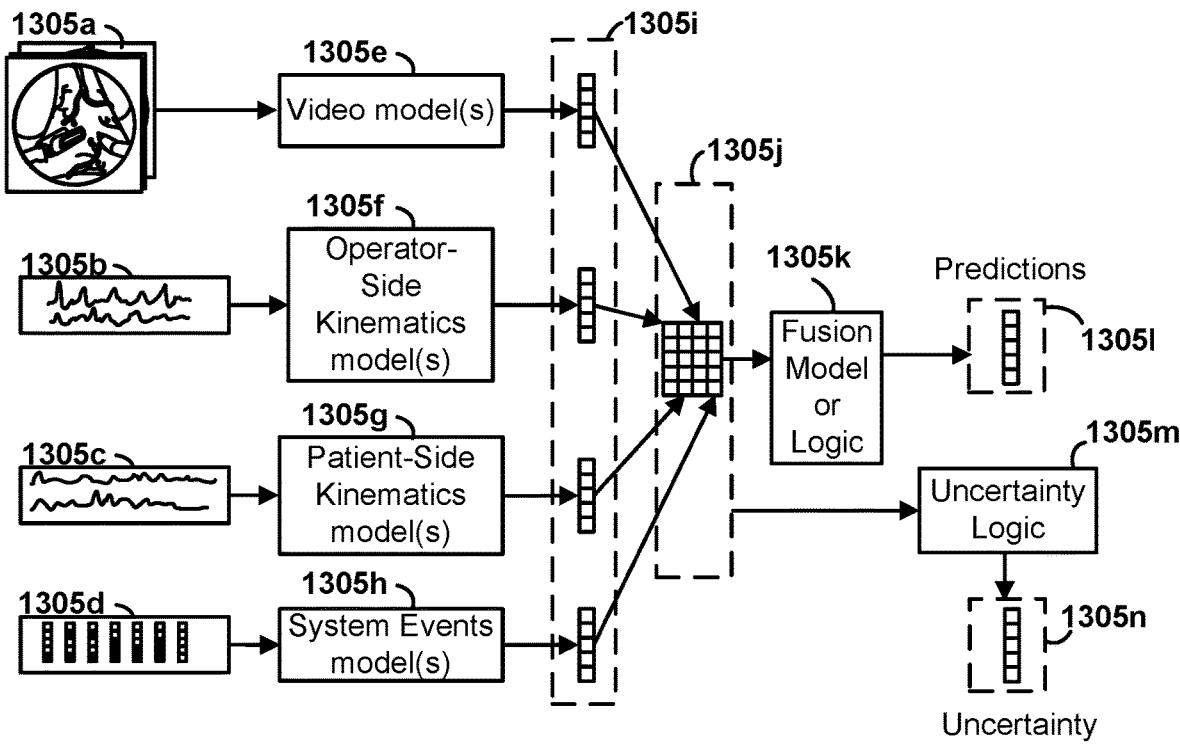
FIG. 13A is a schematic machine learning model topology diagram incorporating a fusion classification model or logic as may be implemented in some embodiments.

FIG. 13A is a schematic machine learning model topology diagram incorporating a fusion classification model or logic as may be implemented in some embodiments. One will appreciate that model or logic (e.g., software taking a majority vote of the previous models' predictions) 1305*k* may be the same as model or logic 630. In some embodiments, the model 1305*k* may output task classifications for each successive time point from the data. In some embodiments, the model 1305*k* may only output the start/stop times of tasks and the task names within the recording of video.

As discussed, during inference, one or more of video 1305*a*, operator-side kinematics data 1305*b*, surgeon-side kinematics data 1305*c*, and system events data 1305*d* may be respectively supplied to a video model 1305*e* (as discussed with respect to FIG. 7A), operator-side kinematics model 1305*f* (as discussed with respect to FIG. 10A), surgeon-side kinematics data model 1305*g* (also as discussed with respect to FIG. 10A), and system events model 1305*h* (as discussed with respect to FIG. 11A). These models may produce predictions 1305*i* for their respective data corpuses. However, in some embodiments, the "predictions" for video model 1305*e* may be the concatenated outputs from multilayer CNNs 705*e*, 705*f*, 705*g* rather than a final output 705*k*, i.e., the Sequential Layers 705*j* may be removed or ignored in these embodiments. Sequential Layers 1050 and fusion models 1125 may likewise be removed in some embodiments, in favor of the outputs from concatenated kinematics 1020 and merged vector 1120 respectively for predictions 1305*i*. However, in most embodiments, as shown here in FIG. 13A, the final predicted output of each stream may be considered for each of predictions 1305*i*. A merged structure 1305*j* from these predictions may be provided to a fusion model 1305*k* to produce predictions 1305*l*.

In some embodiments, fusion model 1305*k* is random forest or an extremely randomized tree, e.g., created using code line listings lines C1 or C2 above. In some embodiments, the fusion model may be a logistic regression model (e.g., in accordance with code line listing C3). Similarly, one will appreciate that in embodiments where only a single one of the models 1305*e*, 1305*f*, 1305*g*, 1305*h* is used, prediction by the fusion model 1305*k* may not be applied.

In some embodiments, uncertainty logic 1305*m* may also be present, which may determine uncertainty values 1305*n* based upon the predictions 1305*i*. In some embodiments where the fusion model is a generative model, e.g., a Bayesian neural network, uncertainties may be discernible from the inherent character of the prediction distributions 1305*l* (e.g., from the variance of the distribution of the most probable prediction result).

Example Fusion Model—Training

Figure 13B:
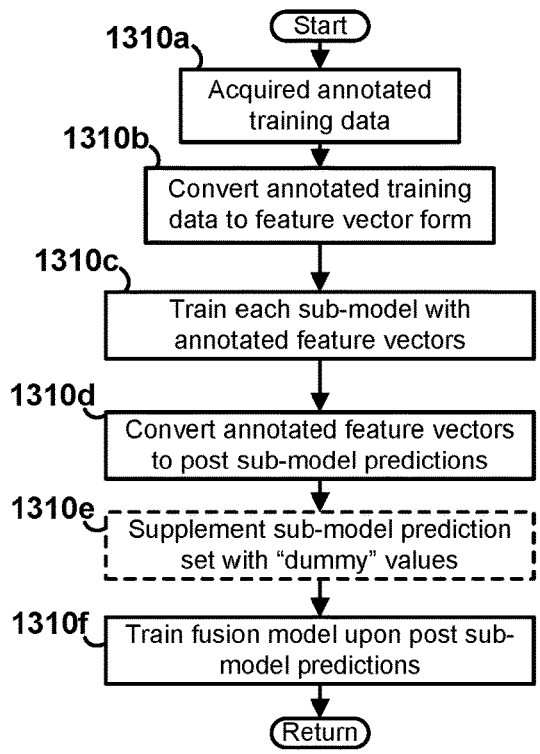
FIG. 13B is a flow diagram illustrating various operations in a process for training the model of FIG. 13A as may be applied in some embodiments.

Training fusion model 1305*k* may proceed in a fashion generally analogous to the other models described herein. Specifically, FIG. 13B is a flow diagram illustrating various operations in a process for training the model of FIG. 13A as may be applied in some embodiments. After receiving annotated training data at block 1310*a* and converting the data to appropriate feature vector form at block 1310*b*, each of the models 1305*e*, 1305*f*, 1305*g*, 1305*h*, may be trained in accordance with the methods described previously herein at block 1310*c*. Once trained, these models may be used to convert the training feature vectors to predictions 1305*i* at block 1310*d*. These predictions and the corresponding annotations from their respective training feature vectors may then be used to train the fusion model 1305*k* at block 1310*f*.

The modular structure of four distinct models described herein followed by a fusion prediction model may provide more accurate predictions than any single model on a single data stream. By training distinct models 1305*e*, 1305*f*, 1305*g*, 1305*h*, there may also be fewer issues synchronizing data over time since each data stream may be processed separately to produce a task prediction for every second (or other desired suitable interval) of the surgery. This may overcome the challenge of sub-second data alignment between the streams, particularly where the streams have different sampling rates.

The approach disclosed herein may also facilitate robust recognition models even when encountering missing data. For example, each of the data types may not always be available, as when surgical theater 100*a* provides only video data, or robotics events data from surgical theater 100*b* cannot be synchronized with corresponding video data from the surgery. Accordingly, at block 1310*e*, the training system may include "dummy" feature vectors which will also be submitted during inference when a given data stream is unavailable. For example, with training data for all four streams, combinations of between one and three of the streams may be substituted with the dummy feature vectors, to simulate the availability of only the remaining streams. In this manner, model 1305*k* may be made resilient to data unavailability when deployed for inference.

Example Uncertainty Algorithms

In those embodiments calculating uncertainty, there may be various viable approaches available for such calculations, depending upon whether the models involved are discriminative of generative. For example, each of FIGS. 14B and 14C depict example processes for measuring uncertainty with reference to a hypothetical set of results in the table of FIG. 14A. In the example process 1400*a* of FIG. 14B, a computer system may initialize a holder "max" for the maximum count among all the classification classes, whether a specialty or a procedure, at block 1405*a*. The system may the iterate, as indicated by block 1405*b*, through all the classes (i.e., all the tasks being considered). As each task class is considered at block 1405*c*, its maximum count "max_cnt" may be determined at block 1405*d* and compared with the current value of the holder "max" at block 1405*e*. If max_cnt is larger, then the holder max may be reassigned to the value of max_cnt at block 1405*f*.

For example, with reference to the hypothetical values in table of FIG. 14A, for Classes Task A, Task B, Task C, and Task D and given four prediction results for each of the streams from models 1305*e*, 1305*f*, 1305*g*, and 1305*h*, fusion model or logic 1305*k* may have concluded that the prediction should be Task A, as three of the models predicted Task A as the most likely class or at least as likely as another class.

For example, for Prediction Stream 1, a model produced a 30% probability of the frame set belonging to Task A, a 20% probability of belonging to Task B, a 20% probability of belonging to Task C, and a 30% probability of the Prediction Stream belonging to Task D. During the first iteration through block 1405*c*, the system may consider Task A's value for each stream. Here, Task A was a most-predicted class (ties being each counted as most-predicted results) in Prediction Stream 1, Prediction Stream 2, and Prediction Stream 3. As Task A was the most predicted class for these three streams, max_cnt is 3 for this class. Since 3 is greater than 0, the system would assign the holder "max" to 3 at block 1405*f*. A similar procedure for subsequent iterations may determine max_cnt values of 0 for Task B, 0 for Task C and 2 for Task D. As each subsequent max_cnt determination was less than 3, the max holder will remain at 3 when the process transitions to block 1405*g* after considering all the classes. At this block 1405*g*, the uncertainty may be output as:

$$1 - \frac{\max}{\text{model\_cnt}} \qquad (5)$$

Continuing the example with respect to the table of FIG. 14A, there are four prediction streams and so the uncertainty is 1¾, or 0.25.

FIG. 14C depicts another example process 1400*b* for calculating uncertainty. Here, at block 1410*a*, the system may set an Entropy holder variable to 0. At blocks 1410*b* and 1410*c* the system may again consider each of the classes, determining the mean for the class at block 1410*d* and appending the log value of the mean at block 1410*e*, where the log is taken to the base of the number of classes. For example, with reference to the table of FIG. 14A, one will appreciate that the mean value for the class "Task A" is $$\frac{0.3 + 0.7 + 0.5 + 0.2}{4} = 0.425 \qquad (6)$$

With corresponding mean calculation shown for the other tasks. Once all the classes have been considered, the final uncertainty may be output at block 1410*f* as the negative of the entropy value divided by the number of classes. Thus, for the example means of the table in FIG. 14A may result in a final uncertainty value of approximately 0.227.

One will recognize the process of FIG. 14C as calculating the Shannon entropy of the results. Specifically, where $y_{c,n}$ represents the SoftMax prediction output for the $c^{th}$ class of the $n^{th}$ prediction stream $$\hat{y}_c = \frac{1}{N}\left(\sum_{n=1}^{N} y_{c,n}\right) \qquad (7)$$

Which as indicated above, may then be consolidated into a calculation of the Shannon entropy H $$H = -\frac{1}{\text{Class\_Cnt}}\left(\sum_{c=1}^{\text{Class\_Cnt}} \hat{y}_c \log(\hat{y}_c)\right) \quad (8)$$

where Class_Cnt is the total number of classes (e.g., in the table of FIG. 14A, Class_Cnt is 4). One will appreciate that, by convention, that "0 $\log_{\text{Class\_Cnt}}$ 0" is 0 in these calculations.

One will appreciate that the approaches of FIGS. 14B and 14C may be complementary. Thus, in some embodiments, both may be performed and uncertainty determined as an average of their results.

For completeness, as discussed, where the model 1305$k$ is a generative model, uncertainty may be measured from the predictions 1305$l$ rather than by considering multiple model outputs as described above. For example, in FIG. 14D, the fusion model is a generative model 1425$b$ configured to receive the concatenated feature results 1425$a$ and output predictions 1425$c$, 1425$d$, 1425$e$ (in this example there are only three tasks being predicted). For example, a Bayesian neural network may output a distribution, selecting the highest probability distribution as the prediction (here, prediction 1425$d$). Uncertainty logic 1305$m$ may here assess uncertainty from the variance of the prediction distribution 1425$d$.

One will appreciate additional methods for assessing uncertainty. For example, where fusion model 1305$k$ is a neural network, iterative application during inference with dropout of various nodes in the neural network may likewise produce a distribution analogous to prediction distribution 1425$d$ from whose variance an uncertainty may be calculated by uncertainty logic 1305$m$. Where dummy values have been inserted into a stream, one will appreciate that the stream may be omitted from the above uncertainty analysis (e.g., uncertainty logic 1305$m$ may consider only the non-dummy streams).

Example Real-Time Processing

Figure 15:
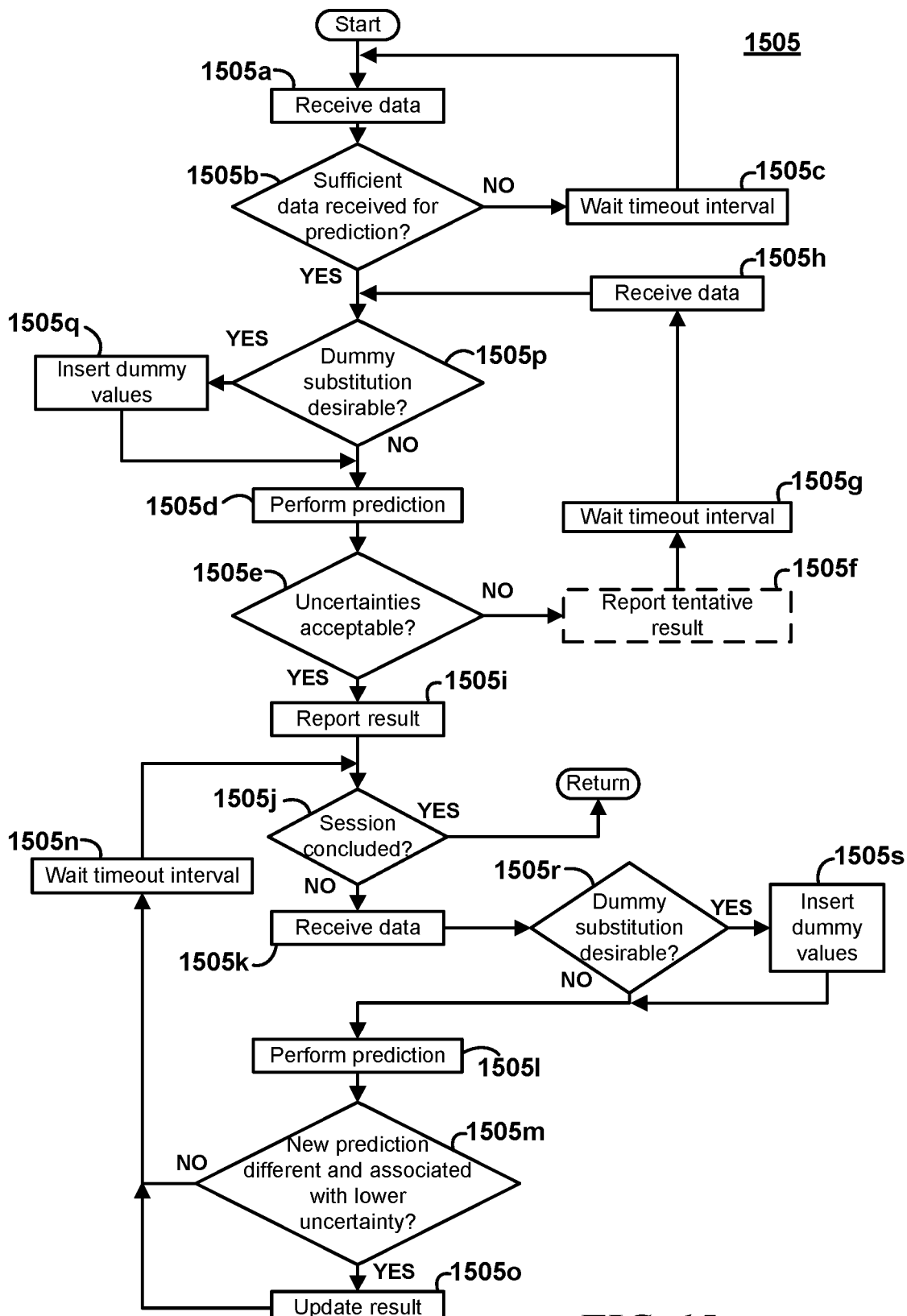
FIG. 15 is a flow diagram illustrating various operations of a process for incorporating uncertainty into ongoing task prediction as may be implemented in some embodiments.

As discussed herein, various of the disclosed embodiments may be applied in real-time during surgery, e.g., on patient side cart 130 or surgeon console 155 or a computer system located in the surgical theater. FIG. 15 is a flow diagram illustrating various operations in an example process 1505 for real-time application of various of the systems and methods described herein. Specifically, at block 1505$a$, the computer system may receive frames from the ongoing surgery. Until a sufficient amount of data has been received to perform a prediction (e.g., enough frames to generate down sampled data sets for at least one of the streams) at block 1505$b$, the system may defer for a timeout interval at block 1505$c$ (e.g., enough data for each of the available models to process each corresponding stream).

Once a sufficient number of frames have been received at block 1505$b$ the system may consider whether dummy substitution variables would be appropriate at block 1505$p$ (e.g., if there is enough data to perform a prediction, but for less than all of the streams or if a data source is offline or otherwise unavailable). If so, dummy values may be inserted as described herein at block 1505$q$. Prediction may then be performed upon the prediction results for the available data streams (substituting dummy values for those which are unavailable) at block 1505$d$. If the uncertainties corresponding to the prediction results are not yet acceptable, e.g., below a threshold (e.g., the entropy more than half a maximum possible entropy, each of the mean values in FIG. 14A is less than 0.5, etc.), at block 1505$e$, the system may again wait another timeout interval at block 1505$g$, receive additional frames of the ongoing surgery at block 1505$h$ and perform a new prediction with the available frames at block 1505$d$. In some embodiments, a tentative prediction result may be reported at block 1505$f$ even if the uncertainties aren't acceptable. One will appreciate that uncertainty calculations may be adjusted where dummy values are inserted (e.g., to ignore the stream or introduce a nonce or median value in the uncertainty calculation).

Once acceptable uncertainties have been achieved, the system may report the prediction result at block 1505$i$ to any consuming downstream applications (e.g., a cloud-based surgical assistant). Prediction may then be confirmed periodically to determine if the task has changed (or if the original prediction was incorrect) until the session concludes at block 1505$j$. Thus, at block 1505$k$ the system may receive additional data from the ongoing surgery, again considering if dummy substitution is suitable at block 1505$r$ and inserting such dummy values if so at block 1505$s$ before incorporating the new data into a new prediction at block 15051. If the new prediction is the same as the previous most certain prediction, or if the new prediction's uncertainty is sufficiently high at block 1505$m$, then the system may wait an additional timeout interval at block 1505$n$. However, where the prediction at block 1505$l$ produces uncertainties lower than those achieved with previous predictions and where the predictions are different, the system may update the result at block 1505$o$ (e.g., in accordance with the surgery transitioning to the next task). Outputting prediction results may facilitate, e.g., operations in a real-time digital assistant, tool optimization algorithm, providing alerts to surgical staff, etc.

Smoothing, as discussed below, may be applied in real time with every new prediction or after accumulated predictions for a period of time, e.g. 2 minutes, as determined by the needs of the application under consideration.

Smoothing—Overview

While the systems and methods described above may suffice in some contexts, experimentation has demonstrated that in some contexts, smoothing prediction outputs from the fusion model(s) 1305$k$ may produce more viable results. Specifically, FIG. 16A is a flow diagram illustrating various operation in a classification with smoothing process 1600 as may be applied in some embodiments. As previously described, the system may receive one or more of video, kinematic, or system event data at block 1605 and apply the classifiers (and possibly dummy variables) described herein to acquire predictions at block 1610. However, predictions acquired over time (e.g., as in the real-time example of FIG. 15) may benefit from post-processing, such as smoothing operations at block 1615.

As shown in FIG. 16B, initial task predictions 1630$a$ by the fusion model 1305$k$ over time 1620 may include a number of false recognitions. In this example, there are only four tasks, but one will appreciate that such false recognitions may increase as more tasks are considered. Applying a smoothing operation 1625 may help reduce such false positives, providing more continuous, realistic, outputs 1630$b$.

Smoothing may be achieved in some embodiments by moving a window over the task predictions 1630$a$ in time, and assigning a majority vote within the window as a corresponding value in the final output 1630$b$. However, experimentation demonstrates that improved results may sometimes be achieved by using a Hidden Markov Model (HMM) approach. FIG. 16C is a state transition diagram illustrating a hypothetical set of task transition operations as may be implemented in some embodiments. Specifically, for four tasks T1, T2, T3, T4, the model may assume the possibility, given a current interval task classification, of transitioning to any of the other tasks in a next interval's prediction (e.g., when predicting on a second by second basis) or back to the task (as when the same task is predicted for successive intervals). For example, where data is acquired at one second intervals, the model may indicate the likelihood of the next second interval being a given task, based upon the current interval's classification.

HMMs applied for smoothing may depend upon several probabilities for their operation. Specifically, a "Start Task Probability" may be assigned to each task, indicating the likelihood that the first interval's prediction is for that task. For example, FIG. 16E is an example set of task state starting probabilities for the transition diagram of FIG. 16C.

A "transition probability" may indicate the probability of remaining in a task state in the following interval or transitioning to another given task in the next interval. For example, FIG. 16D is an example state transition probability matrix for the transition diagram of FIG. 16C. Thus, the cell referenced, e.g., by the T2 row and T4 column indicates there is a 0.002 probability of transitioning from a task T2 in a first interval to a task T4 in the next successive second.

An "emission probability" may indicate how likely the prediction of a given task is to be the genuine task for the interval. Such probabilities may also be referenced in a matrix. For example, FIG. 16E is an example task state emission probability matrix for the transition diagram of FIG. 16C. Thus, if the prediction was T2 (i.e., row T2), there is a 0.05 probability to surgery is actually in T1, a 0.91 probability the surgery in genuinely in T2, a 0.01 probability of task T3, and a 0.03 probability of task T4.

Using the HMM and these probabilities, the system may iterate along the initial predictions 1630a and adjust the output 1630b to the most probable task classifications based upon the HMM where the HMM disagrees with the original prediction. For example, one will appreciate that the HMM may be used with the forward-backward algorithm to smooth initial predictions 1630a.

Smoothing—HMM Probability Determination Methods

Figure 17A:
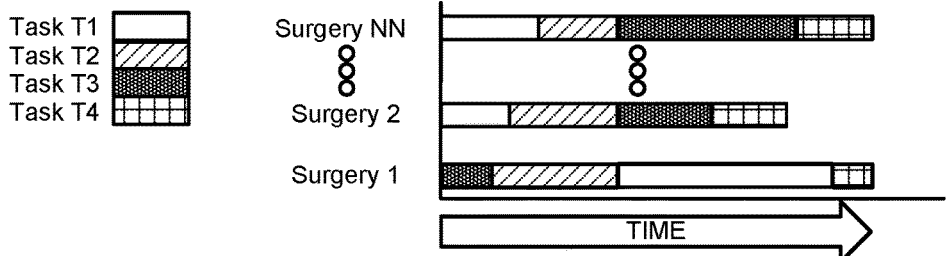
FIG. 17A is a schematic plot of annotated surgical training data as may be used for determining task probabilities in the processes of FIGS. 17B, 17C, and 17E.
Figure 17B:
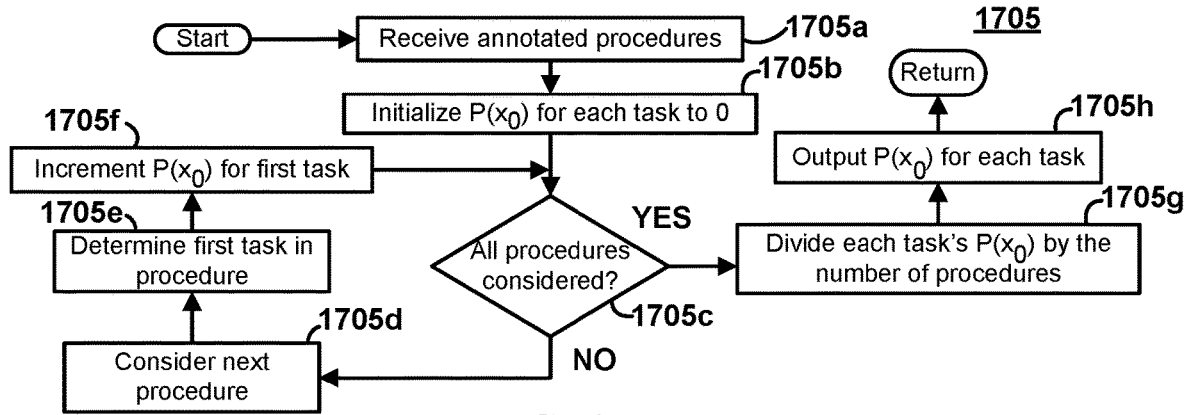
FIG. 17B is a flow diagram illustrating various operations of a process for determining task start probabilities as may be implemented in some embodiments.
Figure 17C:
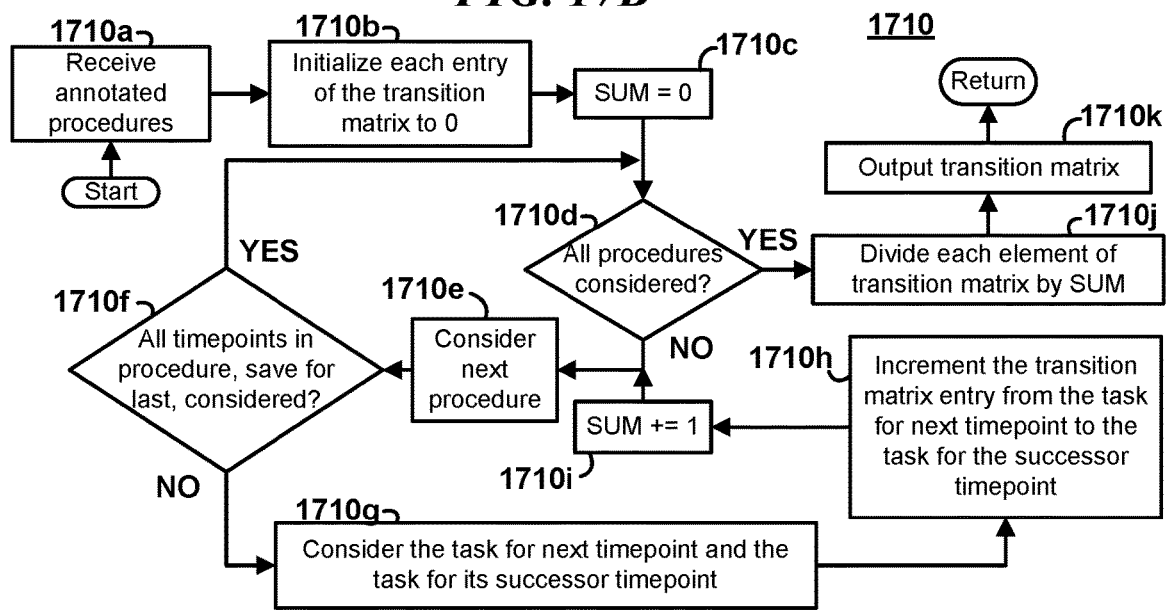
FIG. 17C is a flow diagram illustrating various operations of a process for determining a task transition probability matrix as may be implemented in some embodiments.
Figure 17D:
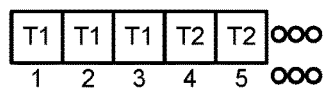
FIG. 17D is a schematic diagram illustrating transitions between tasks over time as may be considered in relation to the process of FIG. 17C.
Figure 17E:
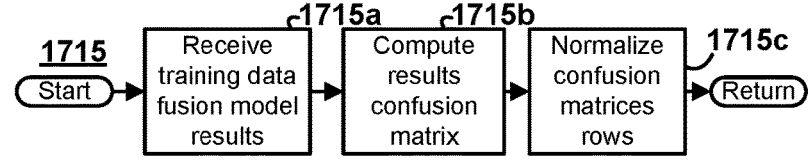
FIG. 17E is a flow diagram illustrating various operations of a process for determining a task emission probability matrix as may be implemented in some embodiment.

In some embodiments, the probabilities of the model in FIG. 16C may be determined in accordance with the processes FIGS. 17B, 17C, and 17E. Each of these methods may consider a plurality of task annotated surgeries ordered in time as shown in the example of FIG. 17A. Generally, by considering the occurrence of tasks over time, the system may infer the frequency of task occurrences, transitions, and corresponding probabilities.

For example, FIG. 17B illustrates a process 1705 for determining the start probabilities (e.g., those in FIG. 16F). At block 1705a, the system may receive the task-annotated data, e.g., that shown in FIG. 17A. At block 1705b, the system may initialize the starting probability for each task to 0. The system may then consider each of the surgeries in FIG. 17A at blocks 1705c and 1705d. The system may consider the first task in the surgeries at block 1705e and increment the corresponding starting probability at block 1705f. Thus, the starting probability for Task T3 may be incremented for Surgery 1, the probability for task T1 incremented for Surgery 2, etc. After all the surgeries have been considered, each of the probability values may be divided by the total number of surgeries (here, NN total surgeries) at block 1705g and output at block 1705h. The procedure 1705 thus determines the starting probabilities based upon the occurrence of the task as the starting task in the corpus of FIG. 17A.

Similarly, FIG. 17C depicts a process 1710 for determining the transition matrix probabilities, e.g., the matrix of FIG. 16D. Again, the system may receive the task annotated surgeries at block 1710a (e.g., the annotated surgeries of FIG. 17A). Each entry of the matrix may be initialized to zero at block 1710b and a sum counter set to 0 at block 1710c. The system may then iterate through each of the surgeries at blocks 1710d and 1710e. For each of these surgeries, all the intervals (e.g., the same sized intervals used during training and inference in the model 600) may be considered in the surgery at blocks 1710f and 1710g. Specifically, block 1710g considers pairs of intervals in the procedure. For example, with reference to the surgical task classification of FIG. 17D, at time intervals 1 and 2, the surgery may be performing Task 1, while at times 3, 4, and 5, the surgeon may be performing Task 2. Thus, the first iteration of block 1710g may consider the tasks at time intervals 1 and 2, the second iteration of block 1710g may consider the tasks at times 2 and 3, etc. At each of these pairs, the system may increment the corresponding transition matrix entry at block 1710h based upon this ground truth data and increment the SUM counter at block 1710i. After considering all the surgeries in the corpus and each surgery's pairs of task assignments to successive time intervals, the system may divide each entry of the matrix by the value of the SUM counter at block 1710j and output the result at block 1710k. Thus, the matrix again reflects the frequency of each transition occurrence in the corpus.

One will appreciate that often, particularly where the interval between the times of FIG. 17D are short, that the self-transitions of many tasks will be quite high. Indeed, as shown in FIG. 16D, the on-diagonal values are orders of magnitude larger than the off diagonal values. Still, these small differences may produce accurate results for overall sequences of tasks. For example, where tasks are frequently performed in a particular order, the order may be captured in these values, despite their relatively small size, facilitating smoothing using the HMM.

Finally, some embodiments may infer emission probabilities (e.g., in the matrix in FIG. 16E) using the process 1715 of FIG. 17E. Here, the system may rely upon results from the fusion model 1305k during training rather than the surgeries of FIG. 17A (though the model 1305k may have been trained with the data of FIG. 17A). Specifically, at block 1715a the system may receive the prediction results from the fusion model and compute the resulting confusion matrix at block 1715b (by comparing the fusion model's predictions with the true positive values from the training data annotations). Normalizing this confusion matrix at block 1715c may then provide the emission probability matrix which may be used in the HMM.

One will appreciate that the Hmmlearn™ library may be used to perform various of these operations. The parameters described may be learned from data using Expectation-Maximization, such as the Baum-Welch algorithm. Some embodiments may modify the probabilities determined in this manner with subject matter knowledge about the tasks from experts.

Example Embodiment Implementation Results

Figure 19A:
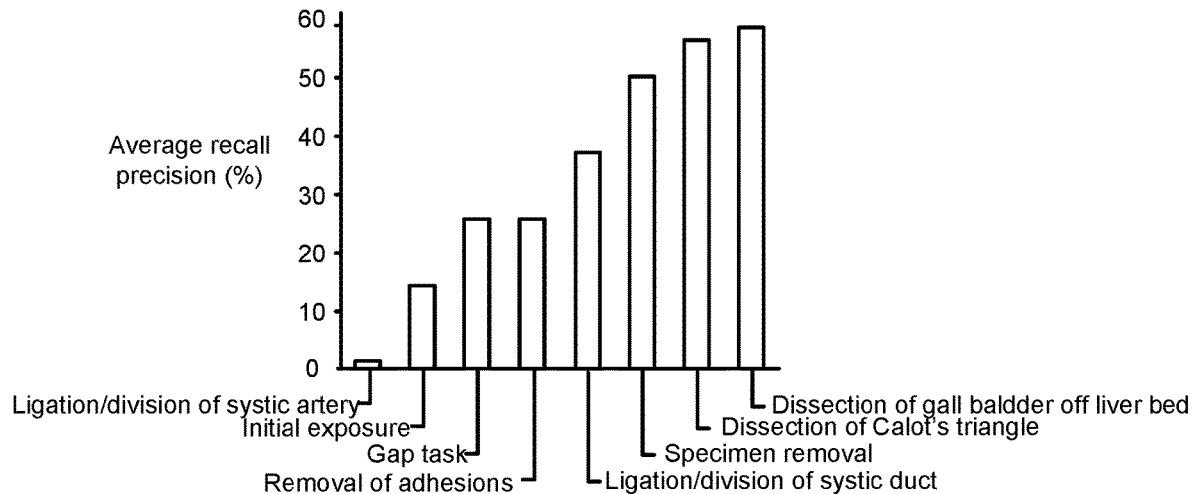
FIG. 19A is a bar plot of average recall precision results for various tasks upon an example implementation model of an embodiment trained upon a cholecystectomy dataset.
Figure 19B:
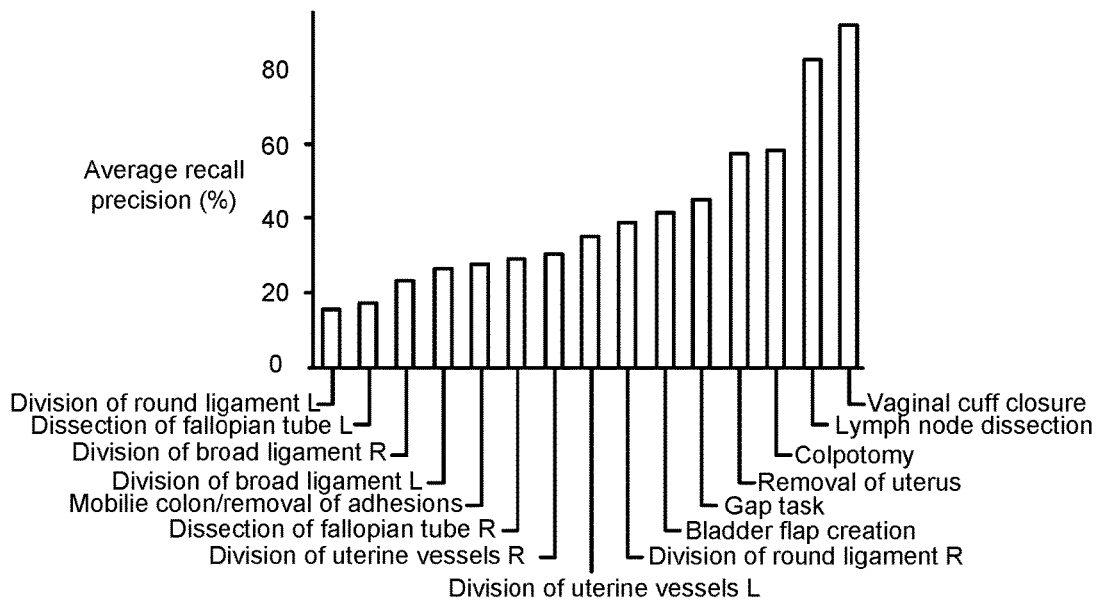
FIG. 19B is a bar plot of average recall precision results for various tasks upon an example implementation model of an embodiment trained upon a hysterectomy dataset.
Figure 19C:
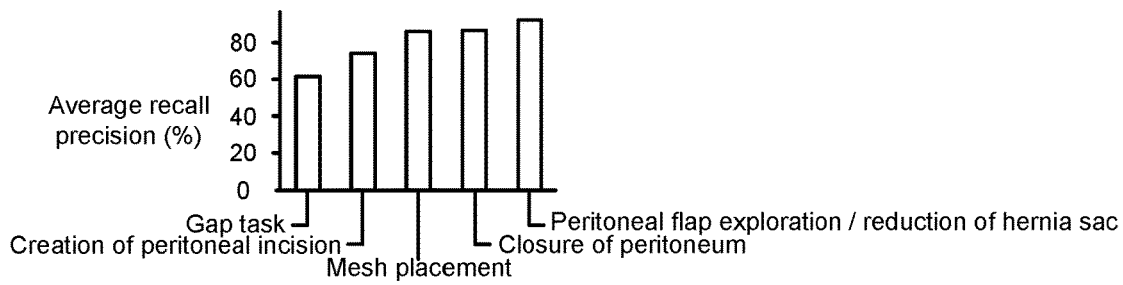
FIG. 19C is a bar plot of average recall precision results for various tasks upon an example implementation model of an embodiment trained upon a inguinal hernia dataset.

FIG. 18A is a table of example datasets used for training and validating an example implementation of an embodiment. Human annotators identified tasks in each portion of the case (i.e., each case could be represented by a time series of per-second task annotation identifiers, such as [0, 0, 0, 1, 1, 1, 1, 1, 1, . . . , 2, 2, 2, 2, 2, 2, . . . , 0, 0, 0, . . . , 3, 3, 3]). Each of the datasets may have its own corresponding tasks. Following training and inference testing, the recall and precision values were calculated for each dataset between human annotations and ML predictions for each task and averaged to produce the average precision-recall in the bar plots of FIGS. 18B, 18C, 19A, 19B, and 19C. Specifically, FIG. 18B is a bar plot of average recall precision results for various tasks upon an example implementation model of an embodiment trained upon a "Prostatectomy" dataset. FIG. 18C is a bar plot of average recall precision results for various tasks upon an example implementation model of an embodiment trained upon the "Porcine Training Lab" dataset. FIG. 19A is a bar plot of average recall precision results for various tasks upon an example implementation model of an embodiment trained upon the "Cholecystectomy" dataset. FIG. 19B is a bar plot of average recall precision results for various tasks upon an example implementation model of an embodiment trained upon the "Hysterectomy" dataset. FIG. 19C is a bar plot of average recall precision results for various tasks upon an example implementation model of an embodiment trained upon the "Inguinal Hernia" dataset.

Values near 100 for average precision-recall imply perfect performance of the machine learning model for identifying a specific task in a procedure type. Conversely, values near 0 imply poorer performance. As indicated in the figures, performance depended upon the procedure type, task, and on the amount of training data available.

Computer System

Figure 20:
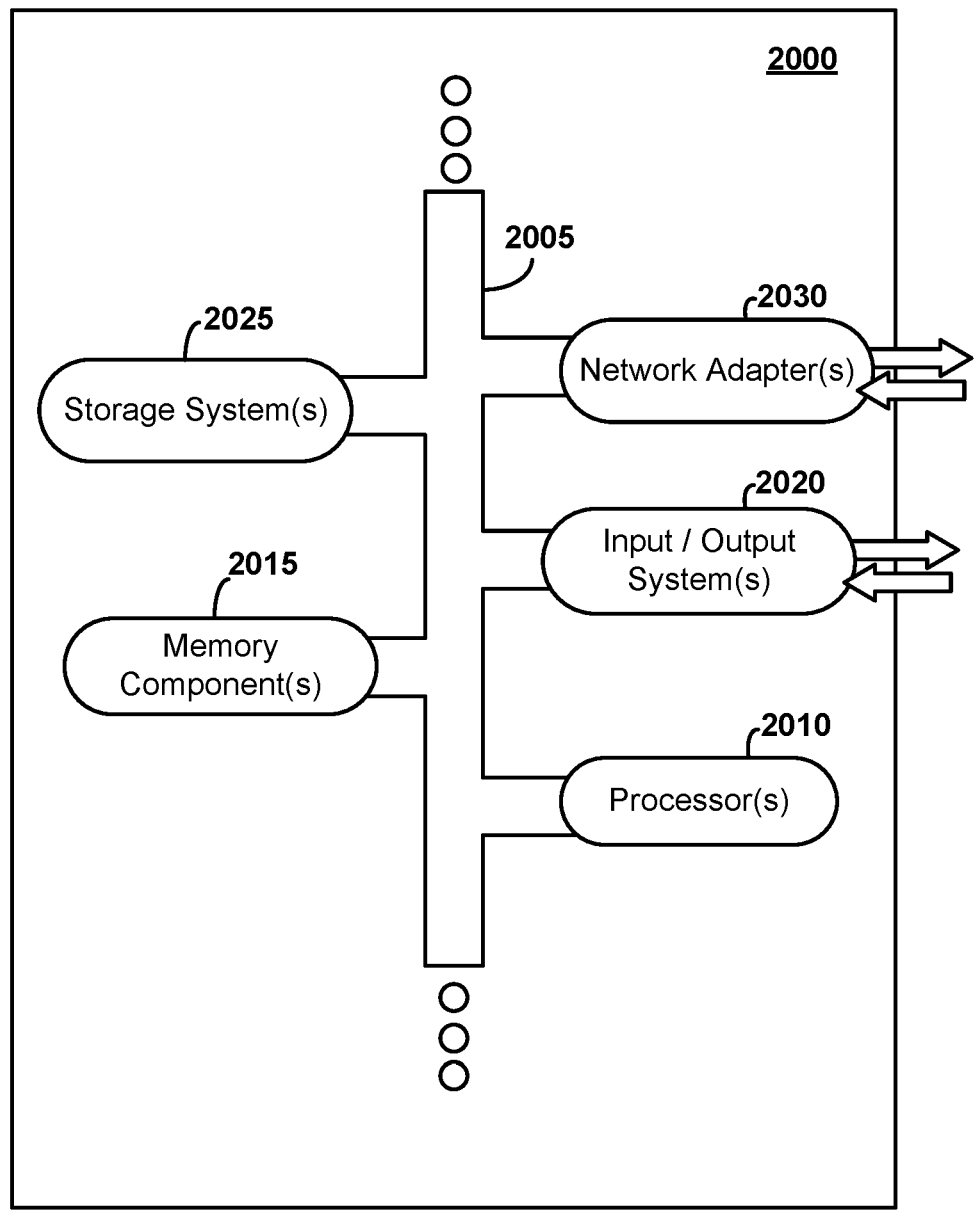
FIG. 20 is a block diagram of an example computer system as may be used in conjunction with some of the embodiments.

FIG. 20 is a block diagram of an example computer system as may be used in conjunction with some of the embodiments. The computing system 2000 may include an interconnect 2005, connecting several components, such as, e.g., one or more processors 2010, one or more memory components 2015, one or more input/output systems 2020, one or more storage systems 2025, one or more network adaptors 2030, etc. The interconnect 2005 may be, e.g., one or more bridges, traces, busses (e.g., an ISA, SCSI, PCI, I2C, Firewire bus, etc.), wires, adapters, or controllers.

The one or more processors 2010 may include, e.g., an Intel™ processor chip, a math coprocessor, a graphics processor, etc. The one or more memory components 2015 may include, e.g., a volatile memory (RAM, SRAM, DRAM, etc.), a non-volatile memory (EPROM, ROM, Flash memory, etc.), or similar devices. The one or more input/output devices 2020 may include, e.g., display devices, keyboards, pointing devices, touchscreen devices, etc. The one or more storage devices 2025 may include, e.g., cloud based storages, removable USB storage, disk drives, etc. In some systems memory components 2015 and storage devices 2025 may be the same components. Network adapters 2030 may include, e.g., wired network interfaces, wireless interfaces, Bluetooth™ adapters, line-of-sight interfaces, etc.

One will recognize that only some of the components, alternative components, or additional components than those depicted in FIG. 20 may be present in some embodiments. Similarly, the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 2030. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 2015 and one or more storage devices 2025 may be computer-readable storage media. In some embodiments, the one or more memory components 2015 or one or more storage devices 2025 may store instructions, which may perform or cause to be performed various of the operations discussed herein. In some embodiments, the instructions stored in memory 2015 can be implemented as software and/or firmware. These instructions may be used to perform operations on the one or more processors 2010 to carry out processes described herein. In some embodiments, such instructions may be provided to the one or more processors 2010 by downloading the instructions from another system, e.g., via network adapter 2030.

Remarks

The drawings and description herein are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference herein to "an embodiment" or "one embodiment" means that at least one embodiment of the disclosure includes a particular feature, structure, or characteristic described in connection with the embodiment. Thus, the

We claim:

1. A computer-implemented method for determining a surgical task classification for surgical data, the method comprising:
   determining a first task classification using a first machine learning model implementation to classify kinematics from the surgical data of a surgical procedure, the first task classification comprising one or more first possible task classifications and one or more corresponding first probability values;
   determining a second task classification using a second machine learning model implementation to classify video data from the surgical data of the surgical procedure, the second task classification comprising one or more second possible task classifications and one or more corresponding second probability values;
   generating, using the first task classification and the second task classification, a merged vector comprising the one or more first possible task classifications, the one or more corresponding first probability values, the one or more second possible task classifications, and the one or more corresponding second probability values; and
   determining, using the merged vector as input to a merged task classification model, a prediction for the surgical task classification of the surgical procedure.

2. The computer-implemented method of claim 1, wherein the kinematics from the surgical data is first kinematics, the method further comprising:
   determining a third task classification using a third machine learning model implementation to classify second kinematics from the surgical data for the surgical procedure, the third task classification comprising one or more third possible task classifications and one or more corresponding third probability values; and
   determining a fourth task classification using a fourth machine learning model implementation to classify system events from the surgical data for the surgical procedure, the fourth task classification comprising one or more fourth possible task classifications and one or more corresponding fourth probability values;
   generating, using the first task classification, the second task classification, third task classification, and the fourth task classification, the merged vector comprising the one or more first possible task classifications, the one or more corresponding first probability values, the one or more second possible task classifications, the one or more corresponding second probability values, the one or more third possible task classifications, the one or more corresponding third probability values, the one or more fourth possible task classifications, and the one or more corresponding fourth probability values; and
   determining, using the merged vector as input to the merged task classification model, the prediction for the surgical task classification of the surgical procedure.

3. The computer-implemented method of claim 2, wherein,
   the first machine learning model implementation comprises one or more neural networks,
   the third machine learning model implementation comprises one or more neural networks, and wherein
   each of the one or more neural networks of the first machine learning model implementation and of the third machine learning model implementation comprises:
     a one-dimensional convolutional layer; and
     a recurrent neural network layer.

4. The computer-implemented method of claim 2, wherein the first kinematics include operator-side kinematics data and the second kinematics include patient-side kinematics data.

5. The computer-implemented method of claim 1, wherein the second machine learning model implementation comprises:
   a multilayer convolutional neural network, an input of the multilayer convolutional neural network configured to be in communication with at least one video frame feature input;
   a one-dimensional convolutional neural network, an input of the one-dimensional convolutional neural network configured to be in communication with an output from the multilayer convolutional neural network; and
   a recurrent neural network, an input of the recurrent neural network configured to be in communication with an output from the one-dimensional convolutional neural network.

6. The computer-implemented method of claim 5, wherein the input of the one-dimensional convolutional neural network is configured to receive a concatenation of outputs from two or more multilayer convolutional neural networks.

7. The computer-implemented method of claim 1, wherein, the prediction is further based upon at least one dummy value input.

8. A non-transitory computer-readable medium comprising instructions configured to cause a computer system to perform a method, the method comprising:
   determining a first task classification using a first machine learning model implementation to classify kinematics from surgical data of a surgical procedure, the first task classification comprising one or more first possible task classifications and one or more corresponding first probability values;
   determining a second task classification using a second machine learning model implementation to classify video data from the surgical data of the surgical procedure, the second task classification comprising one or more second possible task classifications and one or more corresponding second probability values;
   generating, using the first task classification and the second task classification, a merged vector comprising the one or more first possible task classifications, the one or more corresponding first probability values, the one or more second possible task classifications, and the one or more corresponding second probability values; and
   determining, using the merged vector as input to a merged task classification model, a prediction for a surgical task classification of the surgical procedure.

9. The non-transitory computer-readable medium of claim 8, wherein the kinematics from the surgical data is first kinematics, the method further comprising:
   determining a third task classification using a third machine learning model implementation to classify second kinematics from the surgical data for the surgical procedure, the third task classification comprising one or more third possible task classifications and one or more corresponding third probability values; and determining a fourth task classification using a fourth machine learning model implementation to classify system events from the surgical data for the surgical procedure, the fourth task classification comprising one or more fourth possible task classifications and one or more corresponding fourth probability values;

generating, using the first task classification, the second task classification, third task classification, and the fourth task classification, the merged vector comprising the one or more first possible task classifications, the one or more corresponding first probability values, the one or more second possible task classifications, the one or more corresponding second probability values, the one or more third possible task classifications, the one or more corresponding third probability values, the one or more fourth possible task classifications, and the one or more corresponding fourth probability values; and determining, using the merged vector as input to the merged task classification model, the prediction for the surgical task classification of the surgical procedure.

10. The non-transitory computer-readable medium of claim 9, wherein,
the first machine learning model implementation comprises one or more neural networks,
the third machine learning model implementation comprises one or more neural networks, and wherein
each of the one or more neural networks of the first machine learning model implementation and of the third machine learning model implementation comprises:
a one-dimensional convolutional layer; and
a recurrent neural network layer.

11. The non-transitory computer-readable medium of claim 9, wherein the first kinematics include operator-side kinematics data and the second kinematics include patient-side kinematics data.

12. The non-transitory computer-readable medium of claim 8, wherein the second machine learning model implementation comprises:
a multilayer convolutional neural network, an input of the multilayer convolutional neural network configured to be in communication with at least one video frame feature input;
a one-dimensional convolutional neural network, an input of the one-dimensional convolutional neural network configured to be in communication with an output from the multilayer convolutional neural network; and
a recurrent neural network, an input of the recurrent neural network configured to be in communication with an output from the one-dimensional convolutional neural network.

13. The non-transitory computer-readable medium of claim 12, wherein the input of the one-dimensional convolutional neural network is configured to receive a concatenation of outputs from two or more multilayer convolutional neural networks.

14. The non-transitory computer-readable medium of claim 8, wherein, the prediction is further based upon at least one dummy value input.

15. A computer system, the computer system comprising:
at least one processor; and
at least one memory, the at least one memory comprising instructions configured to cause the computer system to perform a method, the method comprising:
determining a first task classification using a first machine learning model implementation to classify kinematics from surgical data of a surgical procedure, the first task classification comprising one or more first possible task classifications and one or more corresponding first probability values;

determining a second task classification using a second machine learning model implementation to classify video data from the surgical data of the surgical procedure, the second task classification comprising one or more second possible task classifications and one or more corresponding second probability values;

generating, using the first task classification and the second task classification, a merged vector comprising the one or more first possible task classifications, the one or more corresponding first probability values, the one or more second possible task classifications, and the one or more corresponding second probability values; and determining, using the merged vector as input to a merged task classification model, a prediction for a surgical task classification of the surgical procedure.

16. The computer system of claim 15, wherein the kinematics from the surgical data is first kinematics, the method further comprising:
determining a third task classification using a third machine learning model implementation to classify second kinematics from the surgical data for the surgical procedure, the third task classification comprising one or more third possible task classifications and one or more corresponding third probability values; and determining a fourth task classification using a fourth machine learning model implementation to classify system events from the surgical data for the surgical procedure, the fourth task classification comprising one or more fourth possible task classifications and one or more corresponding fourth probability values;

generating, using the first task classification, the second task classification, third task classification, and the fourth task classification, the merged vector comprising the one or more first possible task classifications, the one or more corresponding first probability values, the one or more second possible task classifications, the one or more corresponding second probability values, the one or more third possible task classifications, the one or more corresponding third probability values, the one or more fourth possible task classifications, and the one or more corresponding fourth probability values; and determining, using the merged vector as input to the merged task classification model, the prediction for the surgical task classification of the surgical procedure.

17. The computer system of claim 16, wherein,
the first machine learning model implementation comprises one or more neural networks,
the third machine learning model implementation comprises one or more neural networks, and wherein
each of the one or more neural networks of the first machine learning model implementation and of the third machine learning model implementation comprises:
a one-dimensional convolutional layer; and
a recurrent neural network layer.

18. The computer system of claim 16, wherein the first kinematics include operator-side kinematics data and the second kinematics include patient-side kinematics data.

19. The computer system of claim 15, wherein the second machine learning model implementation comprises:
- a multilayer convolutional neural network, an input of the multilayer convolutional neural network configured to be in communication with at least one video frame feature input;
- a one-dimensional convolutional neural network, an input of the one-dimensional convolutional neural network configured to be in communication with an output from the multilayer convolutional neural network; and
- a recurrent neural network, an input of the recurrent neural network configured to be in communication with an output from the one-dimensional convolutional neural network.

20. The computer system of claim 15, wherein, the prediction is further based upon at least one dummy value input.

* * * * *